United States Patent
Block et al.

(10) Patent No.: US 9,773,233 B2
(45) Date of Patent: *Sep. 26, 2017

(54) CHECK CASHING AUTOMATED BANKING MACHINE

(71) Applicant: Diebold Self-Service Systems, Division of Diebold, Incorporated, North Canton, OH (US)

(72) Inventors: James Block, North Lawrence, OH (US); H. Thomas Graef, Bolivar, OH (US); Paul D. Magee, Troy, OH (US); Donald S. Nelson, Jr., Akron, OH (US); James Meek, North Canton, OH (US); Daniel S. McIntyre, Uniontown, OH (US); Mark A. Depietro, Canton, OH (US); Natarajan Ramachandran, Monroe Township, NJ (US)

(73) Assignee: Diebold Nixdorf, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/366,290

(22) Filed: Dec. 1, 2016

(65) Prior Publication Data

US 2017/0098205 A1 Apr. 6, 2017

Related U.S. Application Data

(63) Continuation of application No. 14/684,084, filed on Apr. 10, 2015, now Pat. No. 9,519,896, which is a (Continued)

(51) Int. Cl.
*G06Q 20/10* (2012.01)
*G07D 11/00* (2006.01)
(Continued)

(52) U.S. Cl.
CPC ....... *G06Q 20/1085* (2013.01); *G06Q 20/042* (2013.01); *G06Q 20/409* (2013.01); *G07F 19/202* (2013.01)

(58) Field of Classification Search
CPC  G06C 20/042; G06C 20/108; G06C 20/1085; G07F 19/20; G07F 19/203; G06K 2017/0038
(Continued)

(56) References Cited

U.S. PATENT DOCUMENTS 7,533,805 B1 * 5/2009 Enright ................. G06Q 20/10
 235/379
9,004,353 B1 * 4/2015 Block ................ G06Q 20/1085
 235/379
9,519,896 B2 * 12/2016 Block ................ G06Q 20/1085

* cited by examiner

*Primary Examiner* — Suezu Ellis
(74) *Attorney, Agent, or Firm* — Black, McCuskey, Souers & Arbaugh, LPA

(57) ABSTRACT

An automated banking machine is operated at least in part to data read from data bearing records. The machine is operative to carry out a financial transfer responsive at least in part to a determination that data read through a card reader of the machine corresponds to a financial account that is authorized to conduct a transaction through operation of the machine. The machine also includes a check acceptor operative to receive checks from machine users. The check acceptor is operative image checks and data resolved from check images is used in operation of the machine to cause financial transfers.

19 Claims, 27 Drawing Sheets

Related U.S. Application Data continuation of application No. 13/793,246, filed on Mar. 11, 2013, now Pat. No. 9,004,353.

(60) Provisional application No. 61/743,941, filed on Sep. 14, 2012.

(51) Int. Cl.
 *G07F 19/00* (2006.01)
 *G06Q 20/04* (2012.01)
 *G06Q 20/40* (2012.01)

(58) Field of Classification Search
 USPC ............... 235/379; 705/39, 43–45; 194/210
 See application file for complete search history.

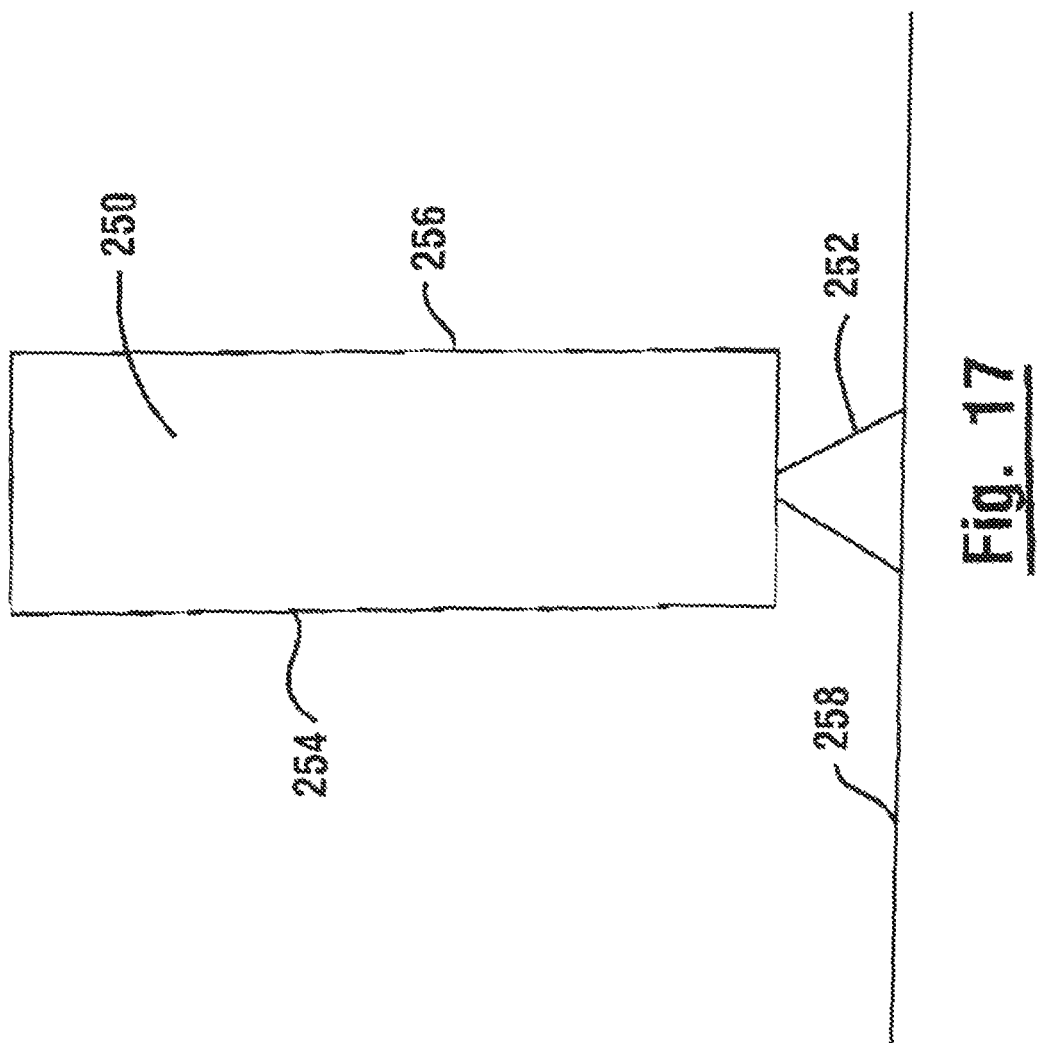

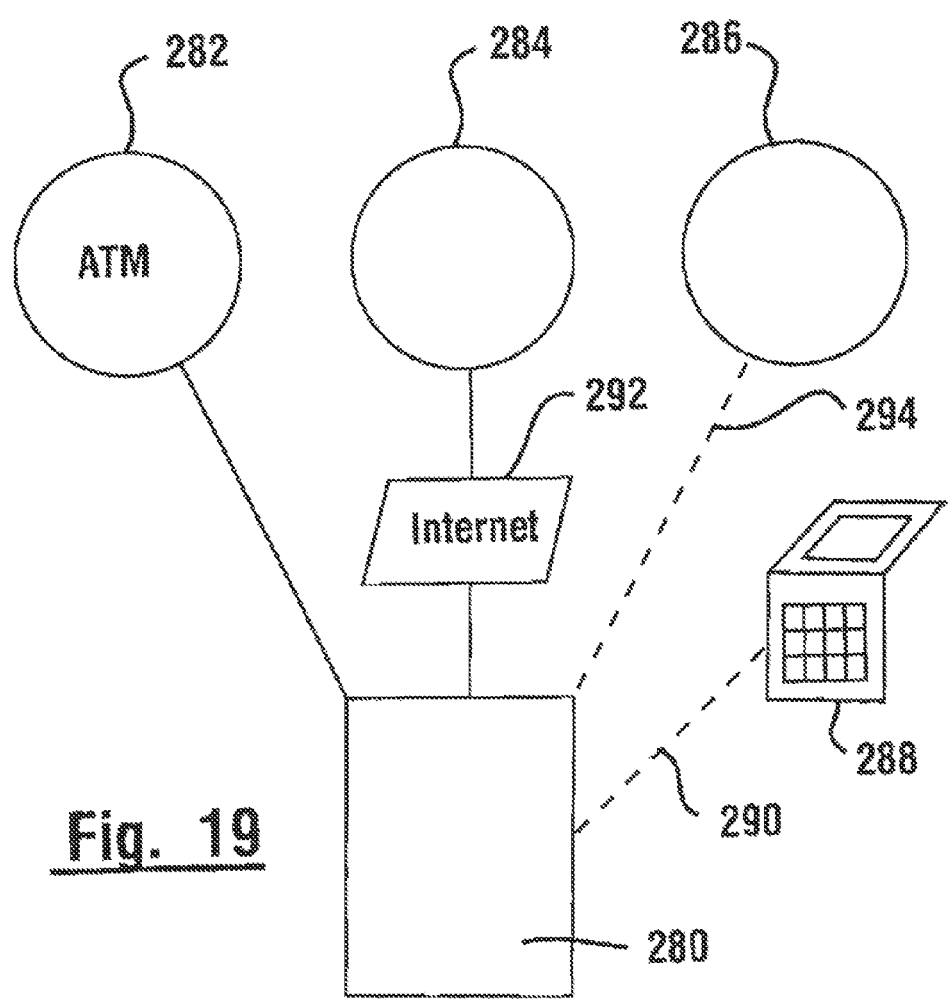

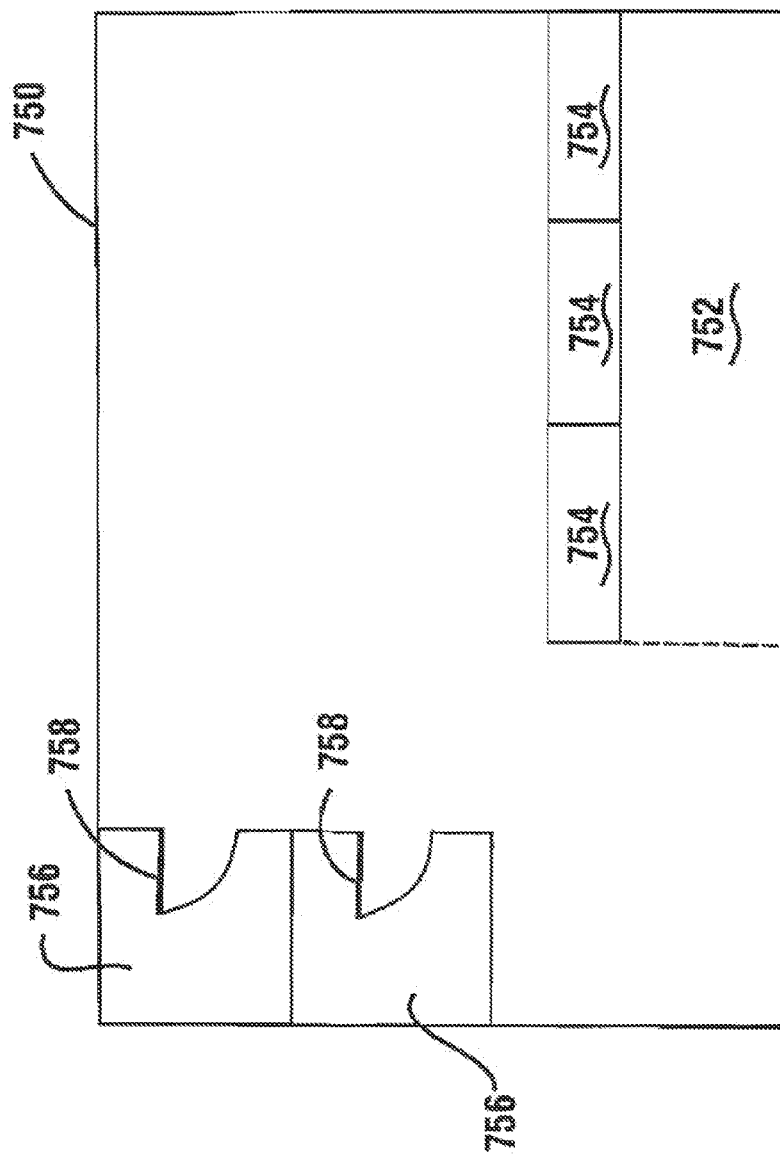

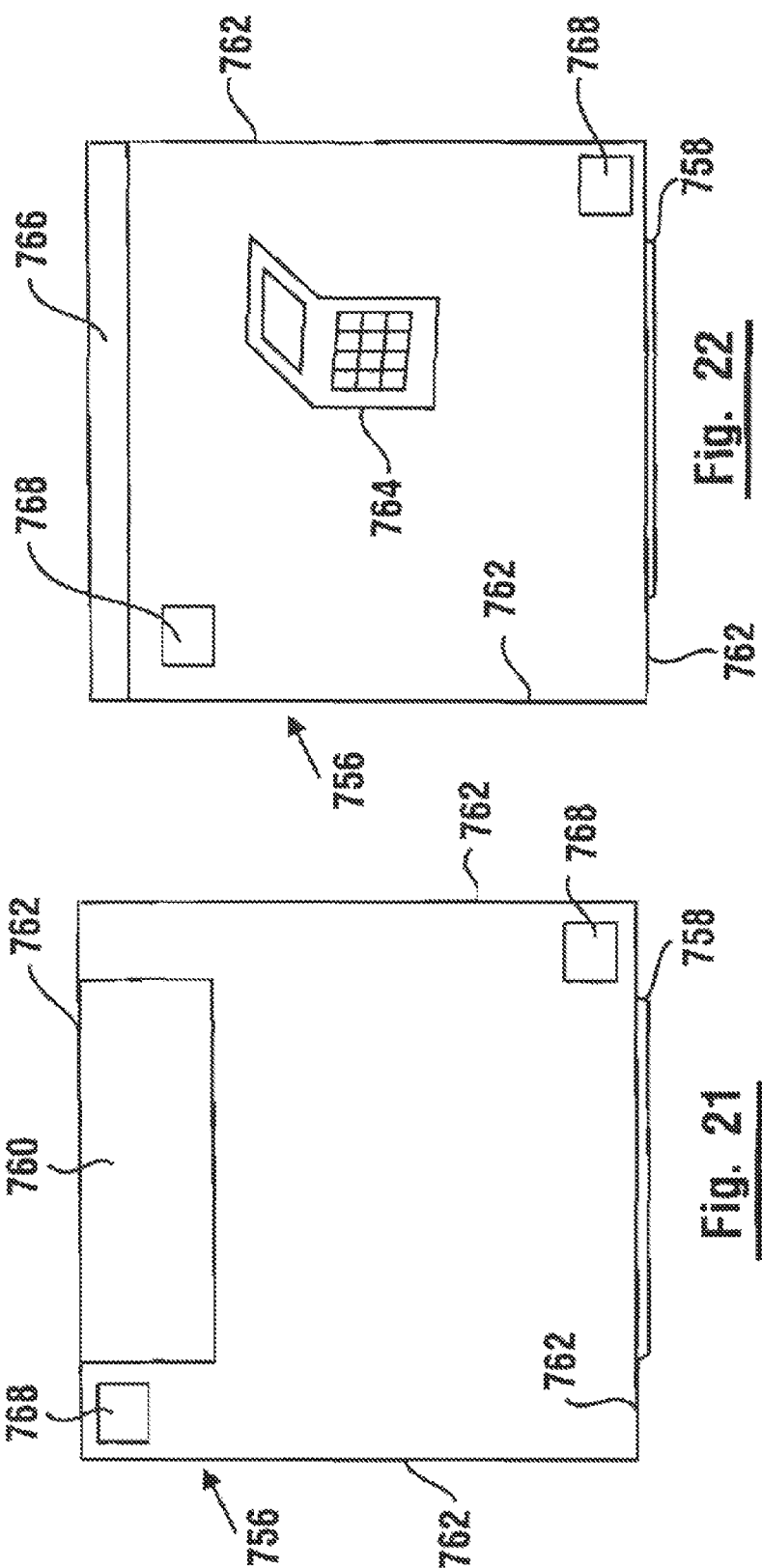

CHECK CASHING AUTOMATED BANKING MACHINE

CROSS REFERENCE TO RELATED APPLICATIONS

This application is a continuation of U.S. application Ser. No. 14/684,084 filed on Apr. 10, 2015 that is a continuation of U.S. application Ser. No. 13/793,246 filed on Mar. 11, 2013 that claims the benefit of U.S. Provisional Applications 61/743,941 filed Sep. 14, 2012. The disclosures of all of the above mentioned applications are herein incorporated by reference in their entirety.

TECHNICAL FIELD

This invention relates to banking systems controlled by data bearing records.

BACKGROUND OF INVENTION

Automated banking machines may include a card reader that operates to read data from a data bearing record such as a user card. Automated banking machines may operate to cause the data read from the card to be compared with other computer stored data related to the card bearer or the bearer's financial accounts. The machine operates in response to the comparison determining that the bearer record corresponds to an authorized user, to carry out at least one transaction which may be operative to transfer value to or from at least one account. A record of the transaction is also often printed through operation of the automated banking machine and provided to the user. Automated banking machines may be used to carry out transactions such as dispensing cash, the making of deposits, the transfer of funds between accounts, and account balance inquiries. The types of banking transactions that may be carried out are determined by the capabilities of the particular banking machine and system, as well as the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin, or other transactions required by merchants. Still other types of automated banking machines may be used by service providers in a transaction environment such as a bank to carry out financial transactions. Such transactions may include for example, the counting and storage of currency notes or other financial instrument sheets, the dispensing of notes or other sheets, the imaging of checks or other financial instruments, and other types of transactions. For purposes of this disclosure an automated banking machine shall be deemed to include any machine that may be used to carry out transactions involving automated transfers of value.

When banks are open for business, customers begin to enter the bank. The bank usually has no advance notice when a banking customer is going to enter the bank or how many customers will enter the bank for any given time period. At the time a banking customer enters a bank the bank has no way of knowing which type of transaction the banking customer is going to request, or if the banking customer will be requesting multiple transactions. If all customers currently in a bank approach the teller or any other human or machine resource of the bank at the same time, that banking resource may become overburdened and unable to process all the banking customer requests in a timely matter. Long wait times may occur and the banking customers at the end of a line for a particular banking service may have a negative banking experience.

When a banking customer enters a bank, he may not know where to proceed to conduct a particular banking transaction. The banking customer may need to resort to looking for signs pointing him to the area of the bank to conduct the particular transaction he desires to conduct. Alternatively, the banking customer may need to resort to looking for a map of the banking branch or facility so he may determine from a map where to conduct his transaction.

When a banking customer enters a bank branch, he often will want to conduct multiple transactions. The banking customer may have no way of knowing which bank resources are busy and which are available. The banking customer may just have to guess or just pick the transaction to conduct first by random thought process. If the banking customer guesses in a way that directs him to a resource for which there is a long wait, he will spend more time to complete his transactions.

Often when the banking customer needs to personally speak with a person who has more than just clerical authority, such as a banking officer, that officer may be busy. The banking customer may need to wait in a waiting area. The banking customer may leave the waiting area to talk with a friend, use the restroom, or simply get tired and leave the bank. Also, when the busy banking officer becomes free, the officer may go to the waiting area to greet the banking customer waiting to see them. However, because the bank officer often does not know what the waiting banking customer looks like, the bank officer needs to resort to calling the customer's name near the waiting area. The banking officer often may not have any way of knowing if the banking customer has left the waiting area or the bank.

For many banking transactions such as opening a new account, banking customers need to provide the bank information about themselves. Typically, a banking officer may call the banking customer to the banking officer's desk and then begin to ask the banking customer a lot of questions. For example, the bank officer may ask the banking customer for the customer's name, address, phone numbers, place of employment, who in the family may access the account, and then a series of questions about what type of account the customer is interested in opening. Sometimes as the banking customer provides the information to a banking officer, mistakes are made when the banking officer enters the banking customer information into the banking computer systems. The officer may hit the wrong keyboard key, and because the banking customer may not be looking at the computer screen the officer is looking at, the error goes undetected. Other banking customers may speak with an accent that is hard for the banking officer to understand, so errors may be entered into the banking computer system because of a misunderstanding between the banking customer and banking officer.

Bank tellers and officers often need to follow a precise sequence of events to properly process a banking customer banking request. There may be a certain sequence of steps to authenticating checks and a different sequence of steps to issue a certificate of deposit. Because banking employees need to follow many different sequences for many different types of banking transactions, sometimes steps are omitted or performed incorrectly. Often several different forms are filled out for each of a variety of banking transactions. Because banking employees need to know which of several forms correspond with each transaction, mistakes are made by forgetting to fill out a form, filling out the wrong form or making a mistake while filling out a form.

Banking machines, systems, and customer service may benefit from improvements.

Overview of Example Embodiments

In an example embodiment, described herein is an automated banking machine that is operable to determine that a first card data read by a card reader associated with the automated banking machine corresponds to a financial account on which transactions are authorized to be conducted automatically through an operation of the automated banking machine, wherein the automated banking machine comprises the card reader, a display, and a check acceptor. The automated banking machine is further operable to obtain an electronic image corresponding to one side of a user input check from a check acceptor, resolve check data from the electronic image, wherein the check data includes a check amount, and automatically cause the check amount to be credited to the financial account through the operation of a first transaction authorization computer remote from the automated banking machine. The automated banking machine is further operable to obtain second card data read through the operation of the card reader, which second card data does not correspond to a financial account on which transactions are authorized to be conducted automatically through the operation of the automated banking machine, to be sent to a second transaction authorization computer remote from the machine that is different from the first transaction authorization computer. Other embodiments include a method and a computer readable medium with instructions encoded thereon for implementing the functionality of the automated banking machine.

In an example embodiment, described herein is an intermediate computer that is located intermediate to an automated banking machine and first and second remote computers. The intermediate computer receives messages from the automated banking machine, include first card data corresponding to a financial account for authorization by a first transaction authorization computer, check data, and second card data that does not correspond to a financial account on which transactions are authorized to be conducted automatically through the operation of the automated banking machine that is authorized by the second transaction authorization computer. The intermediate computer selectively routes the received messages to either a first transaction authorization computer or the second transaction authorization computer.

BRIEF DESCRIPTION OF DRAWINGS

FIG. 17 shows a side view of a shared station having dual touch screens.

FIG. 19 shows a plurality of customer stations that are remotely located from a shared service provider station, which can communicate with each respective customer station.

FIG. 20 shows a top view of a banking area that houses a bank teller area and banking enclosures.

FIG. 21 shows a top view of a banking enclosure with a terminal.

FIG. 22 shows a top view of a banking enclosure with a surface computer.

DESCRIPTION OF EXAMPLE EMBODIMENTS

Incorporated herein by reference in their entirety are the disclosures of U.S. Pat. Nos. 7,438,220; 7,438,222; 7,438,221; 7,438,219; 7,431,204; 7,433,844; 7,431,206; 7,428,984; 7,424,972; 7,416,112; 7,418,592; 7,419,089; 7,419,093; 7,404,515; 7,405,724; 6,702,181; and 7,392,937. These patents disclose devices and systems used to carry out banking transactions, as well as features, methods, and capabilities that may be used in connection with the example devices, systems, and methods described herein.

Figure 1:
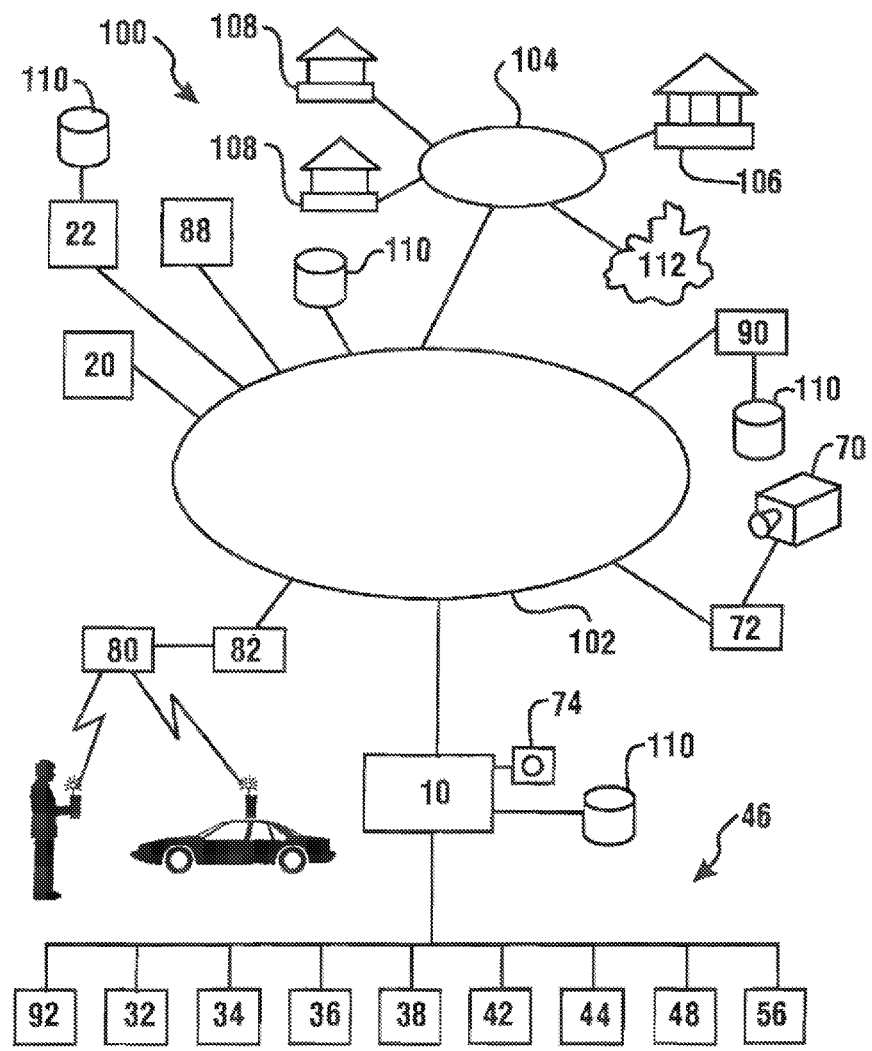
FIG. 1 is an example schematic representation of a computer system used in a banking operation.

Referring now to the drawings and particularly FIG. 1, there is shown an example schematic representation of a banking computer system 100. It should be understood that while only an example number of each component of the banking computer system 100 may be shown in the example banking computer system 100 of FIG. 1, in other example embodiments the banking computer system 100 may contain any number of the same or different network components.

The example embodiment may include a communication network 102. The network 102 may extend within a banking office building or other facility, or may be distributed among a plurality of banking office buildings or facilities. In the example embodiment the network 102 comprises a data transport network environment such as a packet-switched TCP/IP-based global communication network. In the example embodiment the network 102 may comprise a number of network devices such as routers, bridges, gateways, firewalls and any other device known in the art to allow the network 102 to be operable to provide communications between connected devices and systems. The network 102 may be a suitably comprised network including various message transport mechanisms such as, for example, Ethernet, Token-Ring, TM, 802.11, or other wire-based or mobile-based data communication mechanisms.

The network 102 may comprise a local area network (LAN) and may be operatively connected through a larger wide area network (WAN) 104. The WAN is in operative connection to one or more computers located at a host bank facility 106 and may be operatively connected to a plurality of computers located at other banking facilities 108. The WAN or LAN may also be operatively connected to the Internet 112.

A plurality of devices operative to conduct banking or other financial transactions may be operatively connected to the example network 102. A server 90 may be operatively connected to the network that includes software running therein that causes the carrying out of banking transactions, operates to manage banking databases, and carry out other programmed functions. The server 90 may be connected to one or more data stores schematically represented as data storage device 110. The network may be directly operatively connected to one or more data storage devices 110.

Teller terminals 22 may be operatively connected to the network 102. The teller terminals 22 may include computers with associated input and output devices or other devices that are operative to run software programs locally and may be connected to data storage devices 110. The example teller 22 terminal may comprise a thin client software architecture in operative connection with a server running applications requested by the teller terminal 22. Alternatively the teller terminal may comprise a computer operative to run some applications locally therein while accessing other applications that are run remotely on another computer such as a server 90. In some example embodiments teller terminals comprise automated banking machines. In the example system, one or more banking computers 20 may be operatively connected to the example network 102. A banking computer 20 may comprise one of various forms of computers, including for example, a laptop, surface computer, desktop computer, embedded computer, self service terminal, automated banking machine, or handheld device operative to run applications useful in banking transactions.

The example banking system 100 contains an automated banking machine 88 that in the example embodiment performs the functions of a currency exchange terminal. The currency exchange terminal is in operative connection with the network 102. The terminal operates in accordance with its programming to carry out currency exchange transactions.

A welcome terminal 10 is schematically represented in FIG. 1, and discussed in more detail later, and is operatively connected to the network 102. The terminal 10 is in operative connection with one or more data stores schematically represented by data storage device 110. The welcome terminal 10 is operatively connected to a camera 74 which is operative to capture images. The welcome terminal may include features described in U.S. Pat. No. 6,583,813, which is herein incorporated by reference in its entirety. Alternatively, the welcome terminal may be in operative connection with a separate computer or system which includes the features and capabilities of the incorporated disclosure. The example welcome terminal 10 includes a plurality of input and output devices 46 operatively connected to at least one computer in the welcome terminal 10. Example input devices may include a keypad 32, a keyboard 34, a mouse, 36, a microphone 42, biometric input device 56, a card reader 92 and an antenna 48.

Example output devices may include a speaker 38 and a display 44. The welcome terminal may also include a computer input and output device such as a touch screen. The terminal may also include other types of devices for reading data bearing records, such as an RFID reader, NFC device, document scanner, check reader, or other such devices for example. The welcome terminal 10 may be operative to run software locally in its computer to cause the terminal to carry out all or portions of banking customer transactions. In some embodiments, welcome terminal 10 may comprise a thin client software architecture that may cause another computer such as a server 90, to cause the execution of software applications based on inputs to the terminal. The example welcome terminal may include features like those in the incorporated disclosures and may have a computer including browser software operating therein. The computer architecture may operate to interpret and generate markup language documents for purposes of sending and receiving data and interface content which is exchanged with one or more remote computers. Of course this approach is an example.

The welcome terminal 10 may be operative to display or communicate advertising tailored to a particular customer it may have detected and may have recognized. For example, in some example embodiments the terminal may operate using features such as those described in U.S. patent application Ser. No. 11/827,966 filed Jul. 13, 2007. In such a system, for example, the user terminal may identify a user based on data read from a user card, other data bearing record that identifies the customer, and/or their financial accounts. Such identification of a customer from such inputs may be used to provide targeted output information through the welcome terminal in the manner of the incorporated disclosure. In some embodiments the welcome terminal may comprise an automated banking machine at which users can carry out transactions that include transfers of value. Some example embodiments of the welcome terminals or other terminals connected in the system may include features and capabilities like those shown in U.S. Pat. Nos. 7,494,046; 7,490,760; 7,494,054; 7,487,910; 7,503,481, the disclosures of each of which are herein incorporated by reference in their entirety.

In some example embodiments the example banking computer system 100 may be further comprised of a plurality of cameras 70 operatively connected to one or more computers in the network. The cameras 70 may be capable of capturing a series of images. For example, the cameras may be operative to capture data corresponding to visible and/or infrared images. The cameras in the example embodiment may be operatively connected to the network 102 through a camera interface device 72 which may be of the type discussed in the incorporated disclosures. The camera interface device 72 may include a suitable network interface card or similar circuitry that enables the camera to operatively communicate with other computers and devices in the schematically indicated banking computer system 100.

In other example embodiments, the terminal may include an optical card reader based on a camera or some other sensors built into the terminal. The terminal would be able to identify the user's card by merely viewing it through the optical card reader.

In some example embodiments the banking computer system 100 may further contain one or more antenna 80 operatively connected to the network. The antenna 80 may be operatively connected to the network 102 through a mobile interface device 82. The mobile interface device 82 may include a suitable network interface card or similar mechanism that enables RF signals to be sent or received through the antenna 80. The interface and antenna enable RF communications with one or more computers schematically indicated banking computer system 100. The antenna 80 in the example embodiment may operatively communicate with mobile devices internal or external to a banking facility such as cellular phones, laptop computers, handheld devices, and personal digital assistants (PDAs). The antenna 80 in example embodiments may provide communication through one or more suitable mobile frequencies such as cellular, 802.11, and Bluetooth frequencies, for example.

For example, some example embodiments may include features such as those described in U.S. Pat. Nos. 6,315,195; 6,702,181; 7,040,533; 7,201,313; 7,216,800; 6,905,072; 7,207,477; 7,418,427; 7,150,393; 7,025,256; 7,344,066; 7,392,938; and U.S. patent application Ser. No. 11/983,163 filed Nov. 7, 2007. The disclosures of each of these patents and application are herein incorporated by reference in their entirety. The features of these incorporated disclosures may be used in connection with systems in various embodiments.

Figure 2:
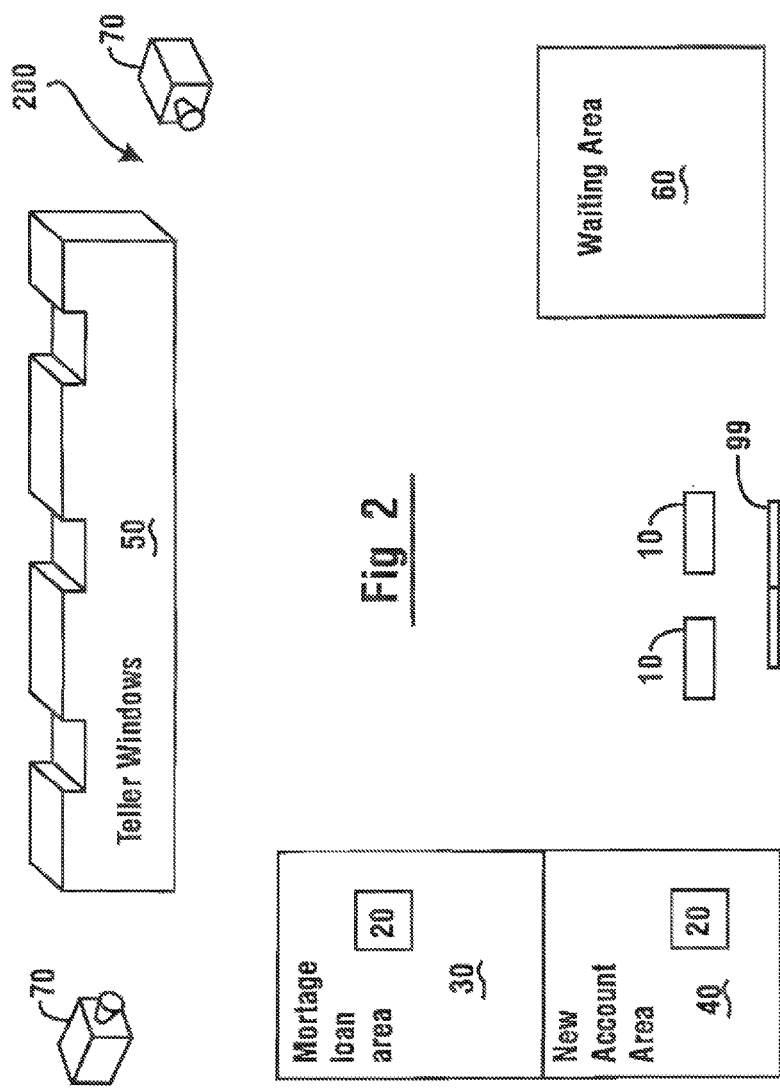
FIG. 2 is an example floor plan of the interior of a banking facility.

An example floor plan of a banking facility is schematically shown in FIG. 2. In the example embodiment one or more welcome terminals 10 may be placed near the front door 99 of the banking facility 200. The example banking facility 200 includes a waiting area 60 where a banking customer may wait if the resources he needs to conduct the desired banking transactions are currently busy. In the example arrangement for conducting transactions such as depositing checks, purchasing a certificate of deposit, or withdrawing of cash from an existing account, a plurality of resources comprising teller windows 50 may be provided. One or more of the teller windows 50 have adjacent thereto a teller terminal 22 (not shown in FIG. 2).

Such teller terminals in example embodiments may be operative responsive to inputs by human tellers to assist in processing banking customer transactions. In other embodiments, the teller terminals may comprise an automated banking machine terminal that receives inputs from customers. In still other example embodiments, teller terminals may include input and output devices that can be operated by both the human teller or other service provider and a customer, to carry out banking transactions. It should be understood that in example embodiments the teller terminals include a computer with connected input and output devices that provide an interface to the teller and/or customer. The input and output devices are operative to cause the computer to cause the carrying out of transactions in accordance with the provided inputs. The teller terminal is also operative to communicate in the network with other computers so as to indicate activities at the teller terminal. This activity, which may be evidenced by a receipt of inputs at the terminal and/or through communications to other computers in the system, may be used to indicate the activity ongoing at the particular resource, and also that nature of such activities, to the other computers. Such information may be used in example embodiments for purposes of determining through operation of the computer a time after which the teller station will become available to conduct transactions for other banking customers. Of course it should be understood that these approaches are examples, and in other embodiments other approaches may be used.

An office used for applying for a loan such as a mortgage or a car loan, 30, and a new account office 40 used for opening new accounts or other banking officer transactions, are shown in the example embodiment of FIG. 2. Each office 30, 40 may contain a banking computer or terminal 20 operative to process transactions responsive to inputs corresponding to the appropriate customer requests. Terminals 20 may include a computer with connected input and output devices which provide a suitable interface for the input and receipt of the transaction data associated with the type of transactions to be conducted at those resources. As is the case with the previously discussed teller terminals, terminals 20 are in operative connection with other computers in a network.

The activities conducted at the terminals 20 and the messages that pass between such terminals and other computers are analyzed through operation of one or more computers in the system. Such analysis may be used to determine when the resource associated with a particular terminal is likely to become available, through operation of one or more computers connected in the system operating in accordance with programmed instructions to analyze the activities and/or messages from such terminals to make such a determination. The terminals or other computers may also be in operative connection with cameras, motions sensors, light sensors or other suitable sensors in the rooms that can provide signals indicative of when each room has persons present therein. Of course this approach is an example and in other embodiments other approaches may be used.

The banking facility 200 may contain cameras 70 for capturing images. The data corresponding to which images can be used for recognizing customers and tracking customers within a banking facility 200. Such cameras may be in operative connection with suitable interfaces and computers so as to enable such computers to identify and/or determine the location of persons within the facility. Connected computers may be operative to analyze such image data to determine the locations of particular individuals in various locations. This may include, for example, the number of customers waiting to use a particular resource. It may also include evaluating the number of customers in various offices or in waiting areas at automated banking machine terminals, or in other locations, so as to provide data which is used by the computers for purposes of determining how to direct customers so as to accomplish transactions in the most expeditious manner. Such information may also be used to help assure that available resources within the banking facility are utilized effectively. For example, in some embodiments one or more connected computers may operate responsive to an indication that there are multiple customers waiting to access one resource, while a service provider such as a teller or a bank officer is currently not occupied at another resource. A computer may operate in accordance with a determination that such conditions exist, to cause a message to be sent to the resource to advise the bank employee who is currently not occupied to switch to another resource location within the facility, so as to assure that transactions for customers are accomplished promptly. Of course these approaches are examples.

In operation, the examples welcome terminal 10 operates to display advertising through a display to banking customers. The welcome terminal 10 may also be operative to provide outputs that describe what banking transactions or services are available at the banking facility 200 where the welcome terminal 10 is located. The welcome terminal 10 may be positioned inside the banking location near a customer entrance. In other arrangements, the terminal may be located outside the bank in a location that may attract banking customers to cause them to provide inputs which correspond to banking transactions they may like to perform.

In some example embodiments, when a banking customer approaches the welcome terminal 10 in response to one of the advertisements, the welcome terminal 10 may operate to prompt the banking customer to provide inputs responsive to the outputs through the display 44, speaker 38 and other suitable output devices corresponding to what attracted the banking customer to the advertisement. The customer may be identified by the terminal operating to read data from data bearing records which identify the customer. This may include a user card that is read through operation of a reading device in the welcome terminal. Such a user card may include a magnetic stripe card, RFID card, NFC card, customer Fob, token, mobile device, passbook, fingerprint, or other data bearing record which provides data usable to identify the customer or the customer's financial accounts. In some example embodiments the welcome terminal 10 is then operative to tailor a response to the banking customer to provide further detailed information of further interest to the banking customer. This may be done in the manner described in U.S. Pat. No. 7,246,082 which is incorporated herein by reference in its entirety. Of course this approach is an example, and in other embodiments other approaches may be used.

In some example embodiments the welcome terminal 10 may be operable to use a camera 74 on the welcome terminal or other cameras 70 operatively connected to the network 102 to capture images of a banking customer at or approaching the welcome terminal. By processing the image data using image recognition software locally or such software in operative connection with other computers, the banking customer may be identified. For example, some embodiments may utilize the features described in U.S. patent application Ser. No. 11/825,553 filed Jul. 6, 2007, the disclosure of which is herein incorporated by reference in its entirety.

When the banking customer is identified, information about the banking customer may be retrieved through operation of one or more computers, from a database 110. Such computers may be in a welcome terminal 10 or may be other computers connected in the banking computer system 100. By using the retrieved customer information, a personalized advertisement or other tailored messages may be presented to the banking customer through one or more output devices on the welcome terminal. In some example embodiments a computer may operate to cause a personalized greeting to be displayed on the welcome terminal 10 to greet the banking customer. In other example embodiments data corresponding to the most recent transactions of the banking customer may be displayed on the welcome terminal, and the welcome terminal 10 may provide outputs that prompt the banking customer to provide selected inputs if they would like to perform a transaction like one of the transactions displayed. The banking customer may then provide one or more inputs operative to select one or more transaction types they would like to perform at the banking facility 200. In an example embodiment, the welcome terminal may operate in accordance with its programming to cause indicia corresponding to the desired tasks to graphically appear in a list in an area of the display 44 of the welcome terminal 10 for reference by the banking customer.

In some example embodiments when the banking customer is not interested in the advertising and does not provide an identifying input in response thereto, and the customer is not recognized in another manner, the banking customer may otherwise identify himself to the welcome terminal 10. In some example embodiments the banking customer may identify himself by inserting a data bearing record such as a bank or credit card into a card reader 92. In some example embodiments, the user may also or alternatively enter a personal ID number (PIN) through the keypad 32 or enter a password through the keyboard 34. In some example embodiments the banking customer may be identified by the welcome terminal 10 by sensing biometric data with a biometric data input device 56. Such a biometric input device may include a fingerprint reader, iris scanner, retina scan, hand scanner, voice print recognition device, or other suitable device that can recognize a biometric input associate with a user. At least one computer operatively connected in the system will then operate in accordance with its programming to analyze the received data and compare it with stored data to identify the particular user who has provided the input. In some embodiments the computer may operate to identify a user in response to multiple inputs or combinations of inputs that can be analyzed and correlated with a particular user. After a banking customer identity has been determined, the welcome terminal 10 may operate to retrieve the banking customer account information and present it to the banking customer through the display 44 or other output device, for example.

If the banking customer is not recognized and not verified, he may be prompted to provide inputs indicating what type of new customer banking product or service he may be interested in. In some example embodiments the new customer may be shown on a welcome terminal 10 output device indicia corresponding to types of accounts the banking customer may open that the banking location 200. The new banking customer may be prompted with account information tailored to the type of account that the banking customer selected. The welcome terminal may also operate to output indicia corresponding to other types of banking transactions and services which are offered by the banking facility. The banking customer may provide inputs to the terminal indicating the type of transaction or service in which the customer is interested. In some example embodiments when a possible new banking customer is detected, an image of the banking customer may be captured responsive to operation of one or more computers in the banking computer system 100. The image is sent to a terminal or other output device in proximity to a banking employee to allow the banking employee to offer a more personal welcome greeting to the banking customer.

In some example embodiments when an existing customer or a new customer has provided inputs to the welcome terminal 10 indicating a request to open an account or process a banking transaction, the banking customer may be prompted through outputs from the welcome terminal to begin entering customer information at the welcome terminal 10 related to the activity or transaction that the banking customer is capable of entering. The information may include the name, address, phone number, income history and other personal information of the banking customer pertinent to the requested transaction. If the banking customer is an existing or former customer, then the personal data of that customer may be retrieved through operation of one or more computers from a database on the computer network 100. The data associated with the banking customer may be used at the welcome terminal 10 to supply data for the requested transaction along with data the banking customer has entered at the welcome terminal 10. For example in some example embodiments, the welcome terminal may operate in accordance with its computer's programming to provide an output that asks the banking customer to confirm information that is retrieved through operation of the bank's computer from the data store. In this way, information that has changed can be updated. This might include, for example, contact information for the user, including information such as new cell phone numbers, e-mail addresses, a mailing address or other information that may be helpful in terms of providing services to the customer.

In some example embodiments the welcome terminal 10 may be in operative communication with a pre-transaction processing system that includes task analyzer software, task queuing manager software, and way finding software. In some example embodiments portions of each of these software functions may reside on different banking computers or computers in resources in the banking computer system 100, which are operable to execute software instructions. In some example embodiments the banking computer system 100 architecture may be balanced and the software and corresponding databases 110 distributed among operatively connected computers in a way that allows for a banking computer system 100 that has high throughput of customer transactions and reasonable banking computer system 100 costs. Of course those approaches may be used in different embodiments.

In some example embodiments task analyzer software is operative to analyze the desired banking transactions identified by a banking customer and determine which tasks (if any) a banking resource could currently begin. For example, if the banking customer indicated they wanted to do a transfer and apply for a home equity line of credit, a banking system computer may begin to execute steps in accordance with its programming to process the home equity line of credit first. The banking resource such as a computer terminal located in the office to which the customer will eventually be directed to review and sign loan papers may begin to operate in response to communication with one or more other computers to begin to populate the forms with data that is available in connected databases in the banking system. Thus the banking resource that will be associated with the transaction will begin to take the steps necessary to open the home equity line of credit to the extent possible without customer or banking officer involvement. When the banking customer is later directed to the home equity loan officer, the home equity loan officer would already have some of the necessary work completed. The capability of pre-processing banking customer banking transactions may produce a more pleasant, efficient and integrated banking experience for the banking customer. The bank may benefit in reduced employee cost and with less resources needed to process banking customer transactions. Of course this approach is an example, and in other embodiments other approaches may be used.

In some example embodiments task queuing manager software would be operative to determine how the requested banking transactions may most efficiently be completed. In the example embodiment the task queuing manager software may dynamically determine the best and most efficient way to prompt the banking customer on how to accomplish the requested transactions. For example, a banking customer may indicate a desire to perform two types of transactions. One transaction may be performed at a currency exchange terminal 88 rather than the welcome station. The second transaction may need a banking employee teller to accomplish the task (purchase a certificate of deposit, for example). The task queuing manager software may be operative in real-time to look at the availability of the two banking resources required. If it is discovered that the currency exchange terminal 88 was not being used at that time, but all the teller stations operating were currently busy, the banking customer would be directed through outputs from the welcome terminal to the currency exchange terminal 88 to perform that banking transaction first.

The banking customer may be directed to the currency exchange terminal 88 by displaying a prompt on the display 44 of the welcome terminal 10. The banking customer may also be presented a map output on the display 44 showing how to proceed from the welcome terminal 10 to the currency exchange terminal 88. At the same time, the banking customer may be placed in a "virtual queue" for a teller station. When the banking customer finishes the currency exchange transaction, the currency exchange terminal 88 may then be operative responsive to messages from the computer establishing the virtual queue to direct the banking customer to the appropriate teller station.

A teller at the station to which the customer is directed may be expecting a banking customer with any "pre-work" already completed. Such work may be accomplished through communications between the teller terminal at the particular teller station and one or more computers which are operative to accomplish the necessary processing steps associated with the transaction type which the customer indicated the customer wished to conduct through inputs at the welcome terminal. The task analyzer software discussed earlier operates to cause the banking teller terminal in conjunction with the teller at that station to accomplish the preliminary work. Alternatively, if the currency exchange terminal 10 was not immediately available but a teller station was available, then the task queuing manager software would be operative to direct the banking customer to proceed to the banking teller station and then the customer would then be directed to the currency exchange terminal 88 after the transaction at the teller station was completed.

In the example embodiment the way finding software may be operative to analyze outputs from the queuing manager software. In some example embodiments the way finding software may be operable to generate outputs that include directions that may be presented to the banking customer on resources which include devices operatively connected in the banking network 102. The directions may be presented to the banking customer through a display in the welcome terminal 10, currency exchange terminal 88, banking terminal, a display at a teller location 50, waiting area 60, a display surface of a surface computer, or any device location through which a banking customer may receive directions. Other resources within the banking facility may include transaction stations such as those described in patent application Ser. No. 10/390,342 filed Mar. 17, 2003, and/or Ser. No. 11/100,148 filed Apr. 5, 2005, the disclosures of each of which are herein incorporated by reference in their entirety. Such resources may also include terminals used in connection with accessing facilities such as safety deposit box areas in vaults such as those described in U.S. patent application Ser. No. 12/004,758 filed Dec. 21, 2007, the disclosure of which is also incorporated herein by reference in its entirety. In addition, in some example embodiments resources may include transaction stations located in walk-through or drive-through lanes associated with the banking facility. These may include systems such as those described in U.S. patent application Ser. No. 11/825,752 filed Jul. 9, 2007, the disclosure of which is herein incorporated by reference in its entirety. Of course these resources, devices, features and functions are examples, and in other embodiments other approaches may be used.

In some example embodiments the directions to customers may be provided in audio format from any location which includes a suitable output device from which a banking customer may receive audio directions. In example embodiments the directions may be output to allow a banking customer to find the way to the next destination which has a resource to complete the next in a series of banking transactions the customer wishes to conduct. For example, when the queuing system software determined the banking customer was to proceed to the currency exchange terminal 88, the way-finding analyzer would operate using data corresponding to that destination along with data corresponding to the known current location at which the banking customer is interacting with other devices on the banking system 100, to resolve a route for the banking customer to follow. A route may be shown graphically to the banking customer in the form of a map in the context of the floor plan of the banking facility 200. In some example embodiments the map may be displayed on an output device on a resource or through output devices where the banking customer is currently located in the banking facility.

In some example embodiments, the financial institution or bank 200 may provide location based services, such as an alerting system, whereby a user or customer may know when a terminal 760, automated banking machine is nearby or when that customer is approaching such a machine via their mobile computing device 764, such as a smart phone, PDA, or the like. The automated transaction machine may include for example features described in U.S. Pat. Nos. 6,010,065; 6,273,413; 6,505,717; 6,573,983; and/or 6,839,688, the disclosures of each of which are incorporated herein by reference in their entirety.

The alerting system may be operatively connected to a computer banking system 100, such as that shown in FIG. 1. For example, the customer may have a location based service application running on their phone 764. In some example embodiments the terminal 760 may be in operative communication with a location based service application, such as the alerting system. In some example embodiments portions of each of these software functions may reside on different banking computers or computers in resources in the banking computer system 100, which are operable to execute software instructions. In some example embodiments the banking computer system 100 architecture may be balanced and the software and corresponding databases 110 distributed among operatively connected computers in a way that allows for a banking computer system 100 that has high throughput of customer transactions and reasonable banking computer system 100 costs.

The location based service application may provide an alert 774 to the customer when the customer is approaching a machine 760. The application may also provide audible alerts regarding how far away or close the customer is to the machine 760, such as "You are 10 feet from the Bank XYZ cash machine." These alerts 774 may continue until the user is physically located at the machine 760, such as "You have arrived at the Bank XYZ cash machine." These may be settings in the application that the user may set based on their own preferences and needs.

In an alternative embodiment, instead of an audible announcement, which may be preferable for a customer who is blind, the alerts 774 or announcements may be through vibrations from the phone 764 or through a visible indicator on the phone screen, which may be preferable for a customer who is deaf. It is to be understood that other approaches may be used in different embodiments. In some embodiments, directions to the machine 760 and/or other information may be delivered to the customer's mobile device 764 so as to facilitate the customer's movement toward the machine.

In some embodiments the alerting system may either audibly annunciate the presence of the machine to the customer when it senses a Bluetooth enabled phone in proximity to the machine. Alternatively, the machine may include a wireless port that may provide outputs that may "handshake" with the user's phone and provide an output through a user's phone whenever the phone comes into proximity with the machine. For example, this may be particularly advantageous for a customer who is blind.

If the user has the location based service application running on their phone, the machine 760 may alert 774 the user in some way, such as via the machine or their phone. For example, when the user approaches or nears a machine, the machine may emit an audible announcement, such as "Welcome to the Bank XYZ cash machine" when the user gets within a few feet of the machine. Alternatively, the user may receive the audible announcement from the Bank on their phone via Bluetooth, such as an indication that the user is at or near the machine. Alternatively, this alert 774 or announcement may be in the form of a text message, an e-mail, a vibration from the phone, a phone call, an audible announcement of some sort, any combination of the above, or any other similar type of announcement that indicates to the user that they are nearing a machine.

Once at the machine, the user may follow prompts that may allow the user to step through the financial transaction on their cell phone and then fulfill or complete that transaction at the machine such as either depositing or dispensing money from the machine. In addition, the user may be required to approve the connection to the machine via Bluetooth or by other means by providing one or more inputs to the phone. In other embodiments, the user may initiate the transaction at the machine and then complete the transaction on their phone.

Many people typically have their cell phone with them. In these instances the user may not require any additional special equipment, such as a headset. Moreover, the user may be very familiar with the layout of their own phone's keypad and functions and may be able to perform any necessary phone prompt interactions easily. The user may also already have their phone set with their preferred settings, such as volume levels, screen brightness, font size, etc. that make performing some part or all of the transaction on their own phone preferable to using the machine. Users may be allowed to operate a machine via their mobile phone such as described in U.S. Pat. No. 7,874,479 filed May 17, 2010, U.S. Pat. No. 8,033,456 filed Jan. 24, 2011 and U.S. Pat. No. 8,052,050 filed Jan. 21, 2011 and U.S. patent application Ser. No. 13/317,087 filed Oct. 7, 2011 and Ser. No. 13/373,168 filed Nov. 7, 2011 and 61/795,499 filed Oct. 18, 2012, the disclosures of each of which are herein incorporated by reference in their entirety.

In other embodiments, there may also be Americans with Disabilities Act (ADA) type accessibility features for lobby machines, drive up machines and pneumatic tube type terminals. Some of these accessibility type features may include text-to-speech, speech-to-text, two-way communication, alternative machine interface accessibility, voice guidance, Braille signage and input controls, etc.

In some embodiments, RFID reading devices may be utilized in conjunction with the machines. RFID reading devices are shown in U.S. patent application Ser. No. 10/814,100 filed Mar. 31, 2004 and Provisional Application Ser. No. 60/459,791 filed Apr. 1, 2003, the disclosures of each of which are incorporated herein by reference in their entirety. The approach of reading an RFID tag or other indicator or associated indicator on a user and providing a marketing output may be applied to outputting a notification to a blind user through the interface of the machine. In other embodiments, Bluetooth and NFC type devices may be utilized in conjunction with the machines. Examples of Bluetooth and NFC type devices and interfaces are shown in U.S. patent application Ser. No. 13/066,323 filed Apr. 12, 2011, the disclosure of which is incorporated herein in their entirety.

Figure 23:
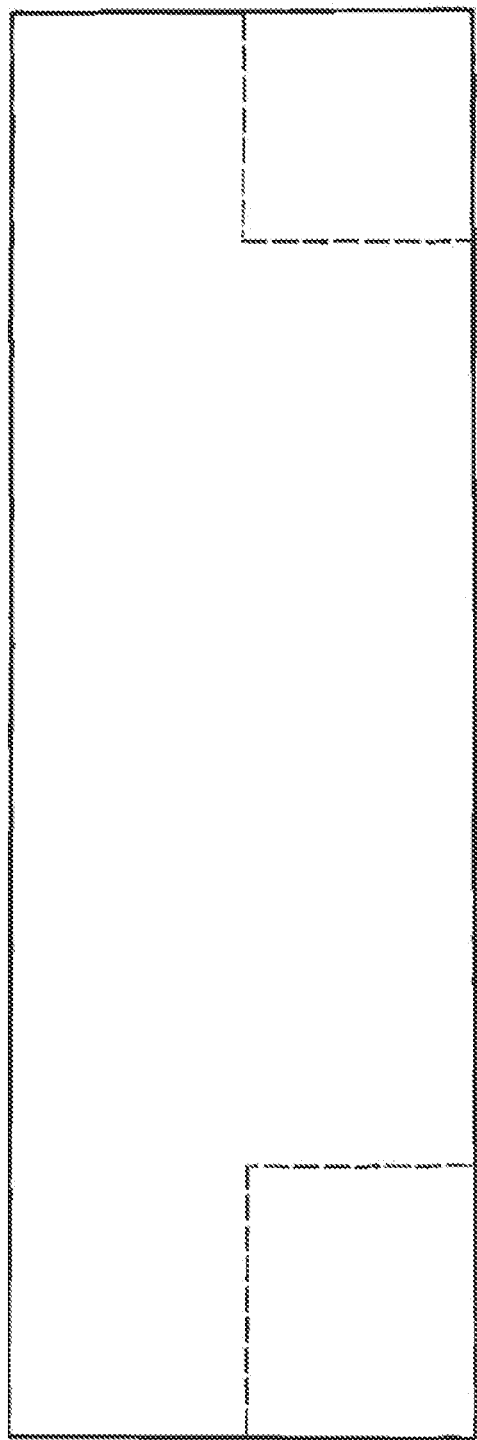
FIG. 23 shows a partial top view of an automatic banking machine located outside of a bank or store.

In still other embodiments, as shown in FIG. 23, the automated banking machine and/or financial institution may include sensors 772 located at or adjacent the machine 760 or an area of financial institution 200. The sensors 772 may be provided for detecting customers approaching or adjacent to the machine 760 so that the machine may initiate communication with the customer and/or know when a customer has left the vicinity of the machine. Adjacent to the sensors 772 may be an output device 770, such as a speaker or display screen that may provide an alert 774, announcement or some sort of indication to the customer that the customer has arrived at the machine 760 or a door of the bank 200, for example.

In an example embodiment, the machine may include at least one sensor 772 in the area of the machine. The sensor 772 may preferably be an optical type sensor or other sensor which is operative to sense that a customer is present at the machine. The sensor may be operatively connected to at least one processor associated with the machine. When a customer is detected adjacent to the machine by the sensor an indication may be given which is operative to cause at least one processor to cause the machine to initiate a dialog with the customer, such as an audible dialog, visual dialog or combination of the two.

The monitor or display associated with the machine may have a contactless reading device associated therewith. The reading device may be used to read data which identifies the particular customer adjacent to the display and/or the machine. The reading device may be for example, a camera, RFID reader, biometric reader or other type of reading device that can read data that can be used to identify the particular customer. This data may include information about the user, such as if they have a particular disability and need to conduct their transaction in a certain manner, such as via voice evidence, or without sound outputs. For example, image analysis software operating in one or more computers may identify objects such as a wheelchair, a white cane, a guide dog, or other articles that would be indicative of the need for the user to operate the machine in a particular mode. Responsive to the data read by the reading device, at least one processor included in one or more computers operate to determine the preferred way to communicate and conduct the transaction to that particular user. The processor may cause the sending of signals to the machine to conduct the transaction in the format suitable for the customer. Of course, this approach is an example and other approaches may be used.

The example machine may further include an audio control module. The audio control module includes a microphone which serves as an audio input device and a speaker which serves as an audio output or transmitting device. The machine may be one of the types previously discussed herein or discussed in one of the incorporated disclosures. The machine may include transaction function devices such as a display, card reader, keypad, input keys, printers, check imager and cash dispenser. All of these devices may be mounted in supporting connection with the machine housing so as to be contained within the machine. Of course in alternative embodiments, additional devices or multiple housings may be used.

In other embodiments, outputs including a map may be provided to a user through a mobile device. This mobile device may be of the type supplied to the customer by the banking facility to facilitate user transactions. Such a device may include a device that a customer may receive from the welcome terminal or from a bank employee for use only during the time that the banking customer is in the bank. Alternatively, the banking customer may be provided with a fob, token or other suitable device which includes an indicator or output device which the banking customer may retain when the banking customer is outside the bank. Further in alternative embodiments, directions and other information may be delivered to a customer's portable phone or other mobile device so as to facilitate the customer's movement efficiently between resources in the banking facility. Of course these approaches are examples.

In some example embodiments computers in the system may operate so there is coordination with the destination point for a customer. An output device may be operated so a message may be displayed at the location of the resource, such as "reserved for (customer name)" or "welcome Mr. (customer name)." Alternatively, the computers may operate to facilitate maintaining the customer's privacy. This may include providing outputs on a display that include only the customer's first name and last initial. Alternatively, a display may include only initials. Further in some embodiments other customer identifiers may be used that further maintain anonymity of the customer. These may include numerical or character designators which are associated with outputs provided to the customer through the welcome terminal or other resources, or through a customer's mobile device. After a banking transaction is complete at the first destination or resource, the way finding software may cause output of a map or information showing the banking customer how to proceed to the next destination.

In some example embodiments banking resources such as automated teller machines, the teller terminal 22 and the banking computers 20 may be operative to run workflow analysis software, customer awareness software, and image tracking software. In some example embodiments, portions of each of the workflow analysis software, customer awareness software, and image tracking software may reside on different computerized banking resources in the banking computer system 100 operable to execute software instructions. Of course these approaches are examples, and other types of systems, software architectures, and concentrated or distributing processing systems may be used.

In some example embodiments the workflow analyzer software may be operable to receive outputs from the task analyzer software discussed earlier, and may be operative to define what steps a human teller will need to perform in order to complete the selected transaction for the customer. In some example embodiments after the task analyzer software resolves the steps needed to execute a banking transaction, it may provide outputs to the teller (or other appropriate bank personnel) on a display device corresponding to those items and/or action steps that apply to the task. For example, if the requested banking transaction is to open a certificate of deposit, the workflow analyzer software may prompt on an output device of the banking employee's terminal, to carry out only those items that adhere to the business rules associated with opening a certificate of deposit. In the example embodiments the workflow analyzer software may be operative to present as outputs to the banking employee only the forms and procedures that pertain to opening the certificate of deposit. In the example embodiment forms and procedures may come to the banking employee with data already populated into an electronic form that was generated and/or processed earlier from the task analysis software phase and populated with information that may have earlier been collected at the welcome terminal 10 or gathered through operation of a computer in connection with one or more data stores in the system that include the customer's information.

In some example embodiments the banking customer awareness software may alert the appropriate bank employees to certain information about customers that may currently be in the banking facility 200. For example, if an individual that is not identified as a current customer indicated at the welcome terminal 10 an interest in opening a checking account, the welcome terminal 10 may operate to capture an image of that customer and cause that image to be conveyed to a banking customer awareness software function. In the example embodiment the banking customer awareness software may make a bank employee aware of where that banking customer was directed go and transmit that image to an output device so the employee may see what the banking customer looked like. In some example embodiments computers connected in the system may operate responsive to their programmed instructions to cause outputs to a selected banking employee's terminal which include visual information which indicates, for example, "Customer #1 is interested in opening a checking account and was told to go to the waiting area . . . and the banking customer looks like 'this'<shows their picture>." With that information, a bank employee may go to the waiting area to greet the new customer in a more personal manner because the bank employee already knows who to approach. For example, the bank employee is now enabled to say: "Hello. My name is Bob Jones and I understand you'd like to open an account with us. Please let me take you to our new accounts manager." In alternative systems, bank employees may be provided with mobile terminals which include suitable output devices for receiving messages and pictures. Computers connected in the system may operate in accordance with their programming to send messages via wireless communication to the particular employee's mobile terminal which identifies the customer and provides the information on the customer and the type of transaction that customer would like to conduct. This approach enables the bank employees to be roaming and still receive the information. Of course this approach is an example, and in other embodiments other approaches may be used.

In some example embodiments the image tracking software may be operative to track banking customers and/or bank employees wherever they were relative to the floor plan of the banking facility 200. For example, if a banking customer was directed to proceed to a waiting area and the banking customer never made it to the waiting area because the banking customer may have been distracted by a friend in another area of the lobby, the bank employee may not be able to greet the customer. In some example embodiments the banking customer tracking may be accomplished by utilizing the image data captured through video surveillance of the entire banking facility 200. A video stream of the floor area from all the cameras may be fed to image tracking software running in one or more computers.

In the example embodiment all the points of customer interaction may be recorded as data values stored in memory associated with a computer so those points are known relative to customer positions on the floor of the facility. For example, the welcome terminal 10 may be at a floor grid with coordinates E7. When the image tracking software determines that Customer #1 has provided inputs that correspond to a request to open a banking account at the welcome terminal 10, the welcome terminal may provide that data to the computer running the person image tracking software. In some example embodiments the image tracking software is then operative to cause data to be generated that corresponds to the location of the Customer #1 being at the welcome terminal 10 which corresponds to coordinate E7. Next, the image tracking software operates to track Customer #1 as the customer moves from one camera 70 field of view to another. The cameras 70 may feed image data corresponding to the real-time movement of the customer to the image tracking software which may use a mapping function to overlay the coordinates of each customer being tracked on a floor plan of the branch. The computer may operate to output this "live" information to bank personnel through output devices operatively connected to the computer through an animated graphic with customer names, privileges, reference numbers, or other data shown attached to the moving objects.

In an example embodiment if the bank employee does not find Customer #1 in the waiting area 60, the employee may provide an input to a handheld device and data corresponding to an animated map of customer movement within the lobby could be sent to the handheld device of the bank employee. With information about where Customer #1 is located on a layout of the banking facility 200, the banking employee may now approach Customer #1 and great them in a proper manner.

In other example embodiments the banking customers may be tracked by capturing and processing image data which is analyzed by one or more computers that identify the particular customer by various properties that can be sensed by sensors and devices in operative connection with the computer. In some example embodiments the banking customer may be tracked using signals from a plurality of sensors positioned in an array throughout the banking facility 200 floor. Sensors in the floor may sense the weight of a banking customer and how that weight is distributed to various portions of the footprint of a banking customer as the banking customer moves about the banking facility 200. The sensors may also or alternatively include an array of photo sensors. The sensors are in operative connection with one or more computers. The computers operate to analyze the data from the sensors indicating the weight that is currently sensed thereon and/or the interruption of photo sensor beams. The computer may then operate to track the user from the known starting point throughout the area of the bank where the sensors are located. In some other example embodiments the shoe print of a banking customer may be captured with cameras at a low level or in the banking facility 200 floor. In example embodiments, low height level cameras may operate to identify an image of a customer's shoe as associated with that particular customer. The image of the shoe may be analyzed and recorded such that when the image of that shoe is seen by other cameras, the computer operates to identify a particular customer that is associated with the shoe image. The banking customer may then be tracked within the banking facility 200 by tracking his shoe image. It should be understood that in other embodiments other articles on or associated with customers could be used for tracking the customer within the banking facility. This may include articles of clothing, items of jewelry, or other identifiable features that will remain associated with the particular customer through the customer's activities at the bank facility.

In other example embodiments a banking customer may be tracked by a unique signal emitted from a mobile device the banking customer carries. A plurality of sensors may detect the unique mobile signal and that signal may be triangulated within the banking facility 200 to determine the location of the banking customer. In yet some other embodiments a banking customer may be tracked by sensors and software operative to detect biometric data such as readable scanning features of the eye or facial features as the banking customer arrives and moves within the banking facility 200.

Some example embodiments may include special areas within a banking facility reserved for a segment of banking customers with "high net-worth customers" that are of high value to the banking facility. The explanation of a banking customer segment here will use "high net-worth customers" and services they find of value, but the use of a banking customer segment may be used to identify other groups of people with common transaction characteristics, such as small business customers, or safe-deposit customers, for example.

In some example embodiments the use of a personal identification device may be used to identify a banking customer segment to the bank or even individual customers of high interest or value. In some example embodiments the personal identification device may comprise a device that is specifically issued to the customer who is within the customer segment or category. For example in some embodiments, the personal identification device may comprise a fob, card or other article that is operative to emit or provide one or more unique signals or data that identify the customer. For example in some embodiments, the personal identification device may include an RFID device which is operative to provide a unique signal that identifies the customer. Such an RFID device may include articles such as a credit or debit card which includes an RFID indicator thereon. Alternatively, the article may include a token, fob or other item that a user may include on the user's person when traveling to the banking facility. Of course these approaches are examples When a person in the segment is detected upon their approaching or arriving at the banking facility, the banking facility and banking computer system may be operative to identify the banking customer by matching the signals emitted or output by the person's identification device with data stored in at least one data store. In some example embodiments once the banking customer is identified, the banking facility may begin to prepare the banking environment for services that particular person, or a person in a particular customer segment, typically desire. This may include, for example, providing outputs on display devices or at the customer terminal acknowledging the customer by name. Alternatively or in addition, at least one computer may be operative to communicate with a computer terminal or a portable device carried by a banking employee. The communications with the portable device or the bank employee computer may be operative to advise the employee of the identity of the customer approaching the bank, and advise the employee to greet the customer. Further in some example embodiments, the computer may be operative to recover data corresponding to an image of a customer that is displayed to the bank employee. This will facilitate the employee identifying the customer so that the employee can personally greet the customer as the customer enters or approaches the bank. In some example embodiments detection of the personal identification device may also be operative to begin execution of the previously discussed software routines like the way finding software, queuing manager software, and task analyzer software.

In some example embodiments the personal identification device may be a biometrically enabled device. The biometric personal identification device may only become active when the person to whom it has been registered has personal possession of the device and provides a unique biometric input. For example, the personal identification device may only be operative to output one or more signals for a period of time after a user has provided an input such as a fingerprint over a scanner included on the device. Alternatively in some embodiments, the identification device may respond to a user's voice print or other perceptible input to cause it to provide the identifying output. In some example embodiments when the personal device is active it may emit a radio frequency signal that may be detected by one or more receiving devices that are operative to receive the signal and operatively communicate data corresponding to the signal to the banking computer system of the banking facility when the customer approaches or enters the facility.

In some example embodiments upon being detected, a particular banking customer or a person belonging to a specific banking customer segment would have a space reserved for them (a private financial consultation room, for example) allowing them to proceed directly to that space. This may include, for example, the computer operating in accordance with an instruction to activate an output device to indicate the customer's name or other identifier on an output device associated with the private meeting room. One or more sensors adjacent to the meeting room may operate to unlock a door or other access control device as the user's identification device is sensed in proximity to the door. In some example embodiments after a reservation was in place for a particular customer, no other banking customer could use that room even if they also had a similar device. In some example embodiments once the banking customer for whom the room was reserved for enters the room, they may again need to identify themselves with the device or otherwise before they may proceed with the special services. This may be accompanied by one or more sensors sensing the device within the room. Alternatively or in addition, users could further identify themselves through a secondary form of authentication. This could take the form of providing inputs to an input device, such as a card reader reading a card, an input of a PIN number through a keypad, or a biometric input. Of course these approaches are this approach is an example, and in other embodiments other approaches may be used.

Figure 3:
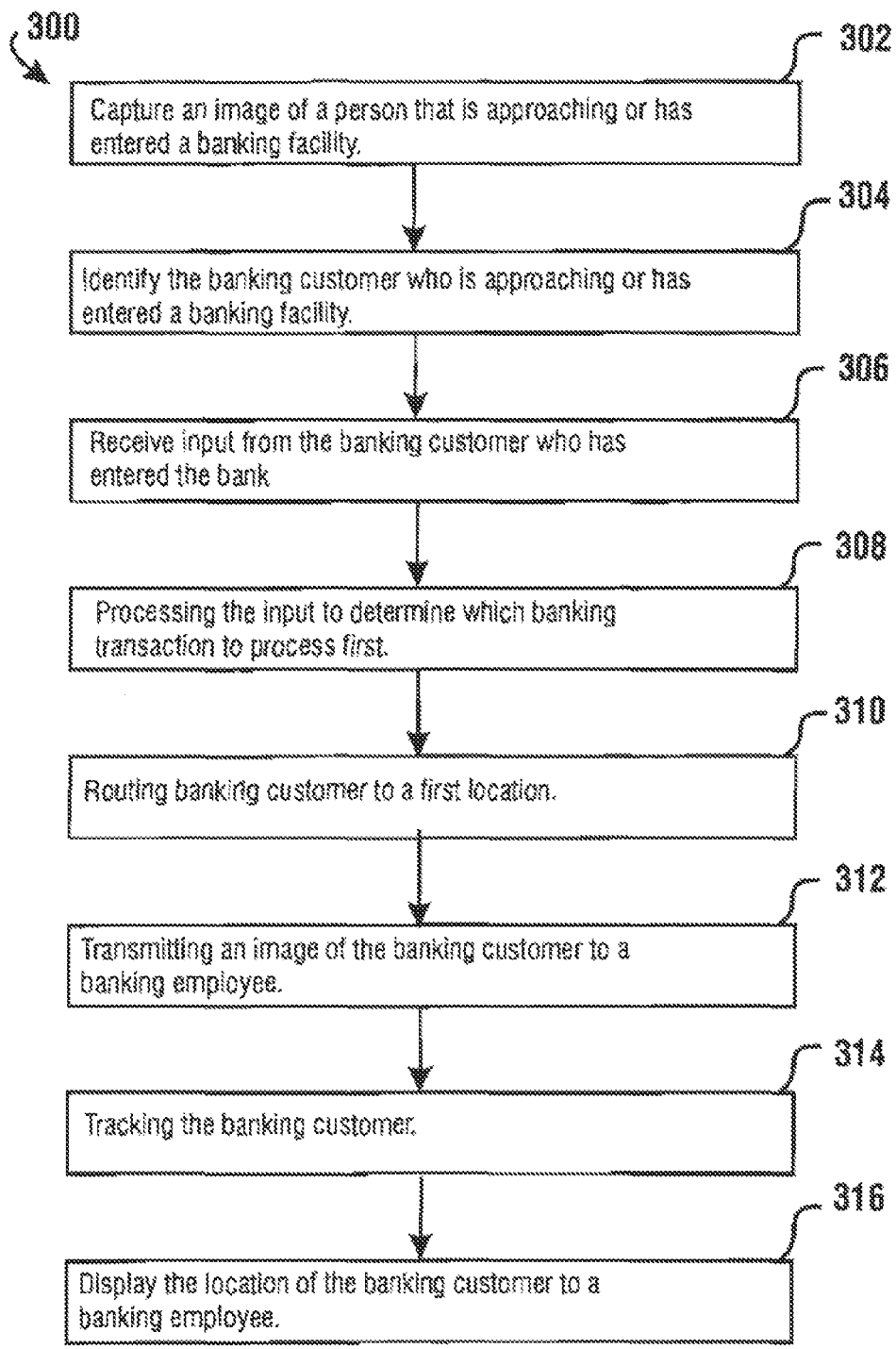
FIGS. 3 and 4 are schematic diagrams of a method associated with processing banking customer transactions using a welcome terminal.

FIG. 3 shows schematically an approach that is an example method of processing banking transactions using a welcome terminal 300. The method may include a step 302 where an image of a banking customer approaching or at a banking terminal may be captured through operation of one or more computers. The image may be optical or of any method that may be useful to identify or track the banking customer. The banking customer may be identified in step 304. The identification may be by computer analysis of optical images, facial images, infrared images or any other method to identify the banking customer. At step 306 input may be received at a welcome terminal located near the bank entrance from a banking customer that has entered a bank. The input may include information about the types of transactions the banking customer wants to perform at the banking facility 200. In some example embodiments the banking customer may now begin entering data corresponding to the types of transactions the banking customer would like to transact. At step 308 the input received from the banking customer is analyzed through operation of a computer to determine which transaction may be processed first. The determination may be made by a banking computer system determining which resources are needed for each requested transaction and which of the needed resources are then currently available. The banking customer may be routed to a first location at step 310 through outputs from the welcome terminal and/or other devices. In some example embodiments one or more computers may operate to present the banking customer with a map at the welcome terminal displaying how to proceed to the first location. At step 312 an image of the banking customer may be transmitted through operation of one or more computers to a computer or other output device accessible to a bank employee. The image may be used by the bank employee to personally greet the banking customer or to find the banking customer. The banking customer may be tracked in step 314. The tracking may be performed by the banking computer system through one or more of the approaches as discussed above. At step 316 the location of the tracked banking customer is presented to a banking employee through one or more output devices such as a computer display or a portable handheld terminal. The displayed location may enable a banking employee to more easily find the banking customer.

Figure 4:
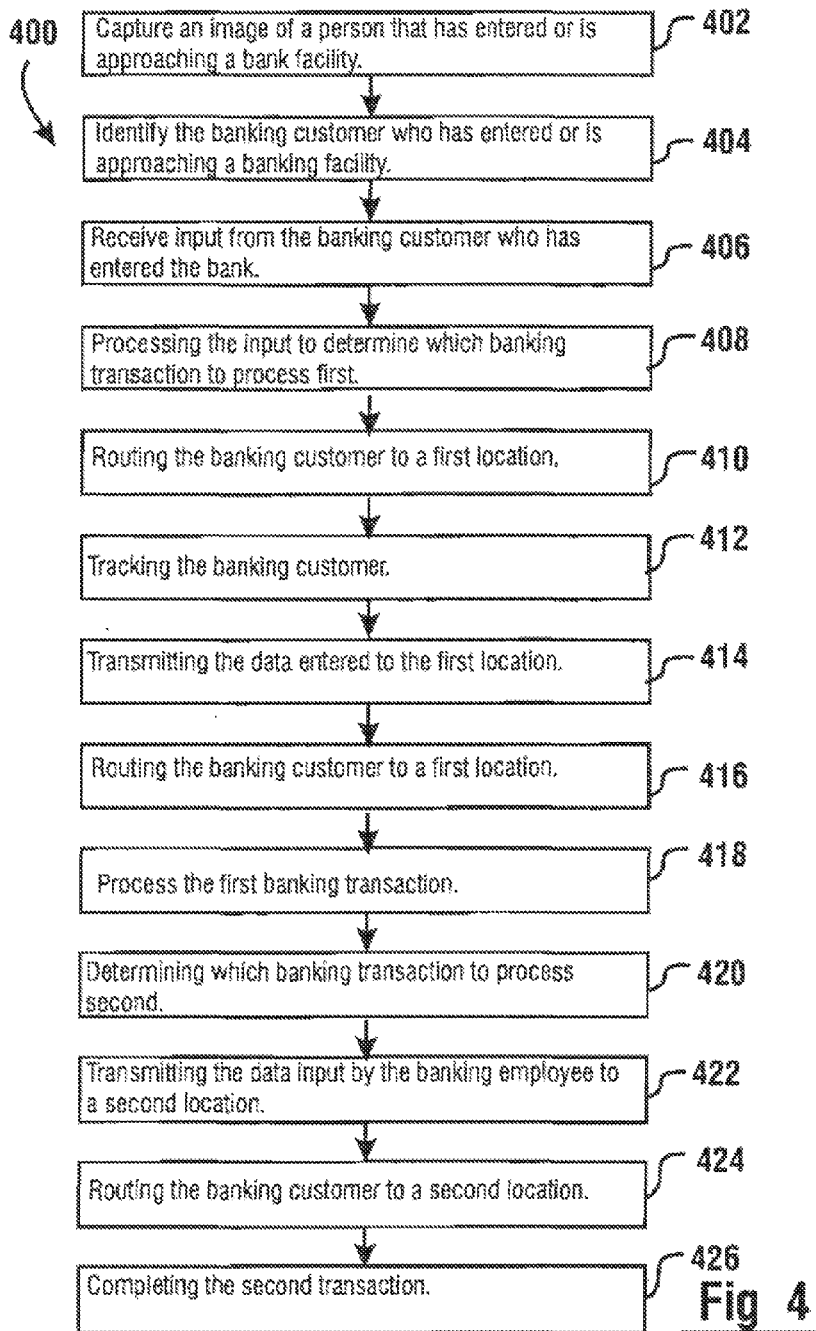

FIG. 4 schematically represents an approach that is an example method of processing banking transactions using a welcome terminal 400. The first five steps of the example method may be identical to the first five steps of the method in FIG. 3. At the sixth step 412, the banking customer may be tracked through operation of one or more computers. At step 414 the data the banking customer may have entered into the welcome terminal is communicated to one or more computers that are operative to analyze and/or communicate the customer data to a resource at a first location where the customer is being directed to carry out a transaction. A banking resource such as a computer terminal or other device at the first location operates to begin processing the first transaction before the banking customer arrives at the first location. At step 416 the banking customer may be presented information through the welcome terminal or other output device about how to get to the first location. The first banking transaction is processed at step 418. This is accomplished by the customer interacting with the banking resource at the first location. This may include, for example, providing inputs to terminal devices either by the customer or human operator, or other activities as are necessary to carry out the transaction. At step 420 a determination is made through operation of a computer as to which banking transaction may be processed second. The determination may be made by the computer or computers in a similar manner as was the determination to determine the first transaction in step 408. One or more computers operate to cause data corresponding to the customer and/or the selected transaction which is to be processed second to be transmitted to the banking resource at the second location in step 422, which may allow the second transaction processing to begin before the banking customer arrives at the second location.

At step 424 the banking customer is routed to the second location by the first resource or other manner, and the second transaction is completed at step 426. If there are more transactions, then step 420 through 424 may be repeated for each transaction until all transactions are completed.

In some example embodiments rather than waiting until a banking customer has arrived at a welcome terminal, the banking customer may contact the banking facility before arriving at the bank, through the customer's mobile device. This may be done by the mobile device communicating with one or more computers in the banking network. This may be done, for example, through a cell phone connection or other wireless communication methodology. In some example embodiments some of the functions of the welcome terminal discussed above, such as identifying a banking customer, may be accomplished by the messages from (i.e., an originating phone number or network address of) the mobile device. This may include, for example, receiving from the customer suitable identifying inputs through the mobile device. The identifying inputs are transmitted to one or more computers and compared to stored data so that the customer may be identified. One or more computers in the banking network may operate to generate and cause to be presented on the mobile device a list of the banking transactions a banking customer may desire to perform. The customer may operate the mobile device to provide inputs which correspond to the one or more banking transactions which the customer desires to perform. This may be done through operation of the mobile device and software operating therein, as a result of communications with one or more computers in the banking system. Such inputs may cause one or more computers of the banking system to begin preprocessing or other activities to prepare for the transactions that the banking customer will conduct when the customer arrives at the banking facility.

In some example embodiments the mobile device may comprise a personal device such as a mobile phone or PDA. In some example embodiments a mobile device may connect with the banking computer system through any mobile system including cellular, Wi-Fi, WiMax or 802.11. Of course these are this approach is an example.

After a mobile device is in operative connection with a computer in the banking network, it may be used to pre-order financial services or banking transactions from wherever and whenever the banking customer desired. In some example embodiments the pre-ordered transactions or services may then be processed through operation of the computers at a convenient time and place before the banking customer needs them completed or arrives at a banking facility. If the banking customer does not need the transactions completed that day or later that day, the banking computer system may schedule the transactions to be completed at a future time, or completed to the extent possible until the banking customer arrives at a banking location.

For example, a customer may have a mobile device that can be used to communicate with one or more computers in the banking system, and has 10 checks the customer wishes to deposit.

The banking customer may enable an application on their handheld device to begin to operate and communicate with one or more computers in the banking computer system. In some example embodiments portions of the mobile application may reside in the mobile device or on computers in a banking computer system. In some example embodiments the mobile software application may be text message based, or may communicate using a web application.

Using a mobile device, the banking customer may provide one or more inputs to identify themselves and enter a personal identification number (PIN) in private. In some example embodiments the transaction sequence carried out through operation of the mobile device interface may be similar to the transaction sequence described above with a welcome terminal, except that it is being conducted on a mobile device. The banking customer may select from a menu output on a display of the mobile device to "deposit checks" at a branch. The mobile device may then operate to cause data corresponding to the customer's selections to be communicated to one or more computers in the banking computer system. The banking computer system may then provide communications to the mobile device that cause the device to instruct the banking customer how to proceed to the nearest banking facility 200 location that may accommodate the desired transactions. The banking customer may be prompted through outputs that include a map or directions to the banking facility 200.

The banking customer arrives later at the banking location to which the customer was directed. In some example embodiments the presence of the banking customer may be detected at the banking facility 200 through operation of the mobile device. In some example embodiments a signal such as an RFID, NFC, Bluetooth, or other radio signal may output by the device and detected by the banking computer system. In some example embodiments when the banking computer system detects the arrival of the banking customer, the banking computer system may process the banking transactions the banking customer requested earlier using the task analyzer software and queuing manager software as previously discussed.

Figure 24:
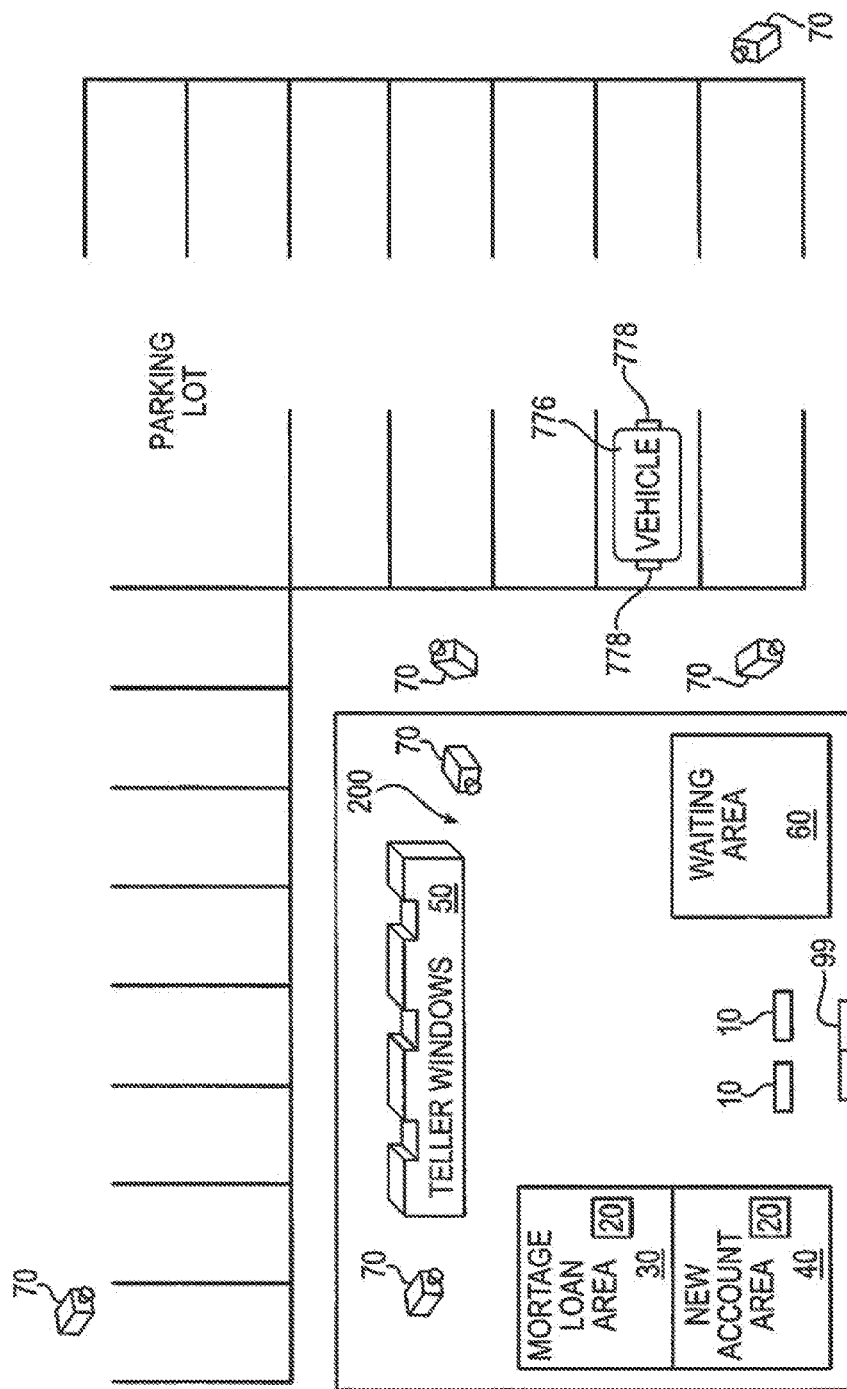
FIG. 24 shows a top view of a bank and its parking lot.

In an example embodiment, a customer or user may make an appointment with a financial institution or bank 200 prior to arriving at the financial institution or bank, such as from home or work or while on their way to the bank. When that customer arrives at the bank 200, the bank may be alerted that the customer has arrived for their appointment via license plate recognition software. The bank 200 may have at least one camera 70 with a field of view that includes an exterior area of the bank 200, as shown in FIG. 24. In an example embodiment, the bank 200 may have a plurality of cameras 70 located at various locations around the exterior of the bank and the bank's parking lot.

The plurality of cameras 70 may be operatively connected to one or more computers in the network 102, as shown in FIG. 1. The cameras 70 may be capable of capturing a series of images. For example, the cameras may be operative to capture data corresponding to license plates, including visible and/or infrared images. The cameras in the example embodiment may be operatively connected to the network 102 through a camera interface device 72 as shown in FIG. 1. The camera interface device 72 may include a suitable network interface card or similar circuitry that enables the camera to operatively communicate with other computers and devices in the schematically indicated banking computer system 100.

Customers of the bank may voluntarily decide to provide the bank with their vehicle's license plate 778 numbers. These license plate 778 numbers may be stored in a database operatively connected to the bank computer system 100. The bank computer system 100 may operate recognition software, such as license plate recognition software. In some example embodiments the terminal 760 may be in operative communication with license plate recognition software. In some example embodiments portions of each of these software functions may reside on different banking computers or computers in resources in the banking computer system 100, which are operable to execute software instructions. In some example embodiments the banking computer system 100 architecture may be balanced and the software and corresponding databases 110 distributed among operatively connected computers in a way that allows for a banking computer system 100 that has high throughput of customer transactions and reasonable banking computer system 100 costs. Of course those approaches may be used in different embodiments.

When the customer arrives and parks in the bank's parking lot, the cameras 70 may detect the arrival of a new vehicle 776 in the parking lot. The executable instructions include instructions for identifying vehicles and for analyzing the front and/or rear of a vehicle to locate structure or structures that correspond to the shape and/or content or color of license plates. The cameras 70 may then capture an image of the license plate 778 or send a live feed of the license plate 778 to the bank computer system 100. The computer system 100 may then compare the indicia in that image of the license plate 778 to the information stored in the database to determine if this is a customer of the bank and which bank customer it is. This may be done for example through the use of character recognition software that can identify characters such as numbers, letters and symbol included on the license plate.

Once the customer vehicle is recognized via the license plate recognition software, the bank staff may bring up the appointment details specific to that customer from the bank's computer systems in order to be fully prepared when the customer comes inside the bank 200. This may prevent delays once the customer arrives at the bank, thereby improving customer service. This may also aid in providing additional security for the user and bank as well as aid in any fraud investigations. In an alternative embodiment, the customer may not have an appointment with the bank.

The customer may simply park in the bank's parking lot without an appointment. The image analysis processors in operative connection with the cameras 70 may detect a new vehicle 776 in the parking lot. The license plate 778 information may then be sent to the bank computer system 100 for analysis recognition via the recognition software. Even without an appointment, the customer's information may be queued up for the bank staff. The personal data of the customer may be retrieved through operation of one or more computers from a database on the computer network 100. This may provide the bank staff advance notice of that customer's arrival so that they may greet them when they arrive and it may also provide the staff time to bring up the customer's account information to have it ready for any banking transactions the customer would like to make while at the bank 200.

In other embodiments, the bank 200 may also utilize the license plate recognition software in combination with queuing manager software. As a variety of customer's arrive at the bank and their license plates 778 are detected and recognized by the bank computer system 100, the customers may be sorted into the queuing manager software by time of arrival.

In some example embodiments, NFC may be utilized to read a user's card or conduct a transaction. A customer's mobile device, such as a Smartphone, tablet, computer or the like may contain a NFC chip. NFC chips may send encrypted data a short distance to a reader located in the terminal, for example. The user may be able to initiate or complete transactions by waving or tapping their NFC enabled mobile device near or on the NFC reader in the terminal. NFC may permit the user to make a payment, deposit or withdraw cash. In an example embodiment, the user may walk up to a NFC enabled terminal and wave their card or mobile phone next to the reader on the terminal and enter the user's PIN or ID number in order to operate the automated banking machine. Alternatively, the user may log onto the bank's web site and select the option to withdraw cash, for example, and indicate the specifics related to the transaction, such as the particular account from which they want to make a withdrawal and the amount to be withdrawn. Once the user has completed the transaction online, the user may then receive a text message via SMS that may include a temporary PIN or ID number to use at the nearest terminal. For security reasons, the PIN may have a time limit attached to its use, such as that the PIN must be used within 30 minutes of receipt and that the PIN may only be used one time. As an alternative, any appropriate type of device may include an NFC chip, such as a user's vehicle key fob, personal computer and the like.

In addition, the user's NFC enabled device may serve as an encrypted security device, personal ID card and/or banking ID card. The user's NFC device may read NFC tags located on a bank's display to get more information, special offers, or an audio or video presentation related to some existing or new products or services. Using the phone as a reader may allow the phone to interact with RFID-enabled objects, such as posters embedded with chips that connect to web sites, mobile web sites or applications. In an example embodiment, the bank may provide "smart" posters or advertisements that may include RFID tags, whereby the banking customer may tap their NFC mobile device against the RFID equipped poster or advertisement. The customer may then receive promotional offers from the bank.

The terminal may include NFC in any appropriate or desired location of the terminal. For example, the terminal may include NFC in the display, touch screen or signature pad. This may be done in a manner where the card is read by bringing it adjacent to the desired portion of the terminal that includes the NFC communications. This would allow a transaction to occur where a user would bring their card near or physically touch their card to the portion of the terminal with NFC in order to start the transaction. In this manner, the card may be read through NFC associated with that specific part of the terminal, such as the display screen, touch pad, track pad and the like.

In some example embodiments the banking computer system may operate in accordance with its programming to identify the resource that is available to perform the requested transactions and may direct the banking customer through outputs from the banking customer's mobile device where in the branch to proceed. In some example embodiments the mobile device may receive communications that direct the banking customer and cause the device to output a map or floor plan of the banking facility. This may be accomplished in a manner similar to the maps shown on the welcome terminal discussed earlier. In some example embodiments the banking customer may be prompted responsive to software similar to the operation of the way finding software discussed earlier to cause the mobile device to present a map accompanied with a message such as "Please proceed to Check Deposit Terminal #1." In some example embodiments "Terminal #1" may be reserved by providing an output that includes the name of the banking customer. This may be done, for example, by the computer system operating to cause an output through an output device adjacent to or on the terminal, which output indicates the customer name or other identifying information for the customer. Of course this approach is an example, and in other embodiments other approaches may be used.

In some example embodiments when the banking customer arrives at the terminal, they may press an application button on their mobile device or provide another type input that operates to inform the banking computer system they are at the indicated location. The banking computer system may generate a verification message for one-time use and display the message on the terminal where the banking customer should now be located. The banking computer system may then operate to instruct the banking customer through their mobile device to enter a one-time message that the banking computer generated, as inputs into the banking customer's mobile device. If the banking customer enters the verification message, this is received by one or more computers and operates to verify to the banking computer system that the banking customer is at the targeted terminal. In some example embodiments, the banking customer is from this time instructed through the mobile device, the terminal, or both, to refer to instructions on the terminal's display to execute the physical check deposit into the automated banking machine terminal. Once the checks are deposited, the check images and summary information may be compiled into an electronic acknowledgment. One or more computers in the banking system operate to cause to be transmitted to the customer's mobile device, a record of the transaction.

In another example, a small businessman places a request from his mobile device to pick up his cash drawer money for the day (banded bills and rolled coins) in a drive-up lane. The small businessman may complete a mobile-based ordering transaction similar to the first example and indicate his desire to pick up his order at a pneumatic tube terminal, which is also referred to as a VAT terminal in a drive-up environment. This may be done through inputs to the user's mobile phone. The mobile phone is operative to communicate data corresponding to the inputs wirelessly to one or more computers in the banking system. The banking system is operative responsive to its programming to cause one or more computers to analyze the inputs and determine what steps should be taken prior to the customer's arrival to accomplish the customer's desired transactions. When the small businessman arrives in the parking lot, he may be detected automatically as discussed above. Alternatively, the customer may be detected by a camera system that captures images and that is in operative connection with a computer that operates facial recognition software. Of course these approaches are examples. The detection initiates a queuing function in at least one computer and may reactivate the computer processing data corresponding to the pending transaction. The businessman is queued for the cash pickup transaction for "Lane #1" and is instructed to proceed to that lane on his mobile device. This is done responsive to operation of one or more computers which provide outputs that are wirelessly transmitted to the customer's mobile device. The mobile device is operative to output instructions to the customer through its display or other output device.

Once the businessman arrives in the correct lane, he may press an application button on his mobile device or otherwise provide inputs to indicate to the system he is in position. The system is operative to generate a one-time use pass code, transmits it and causes it to be output to the customer, who may view it on his mobile device. The output through the mobile device may be operative to prompt the customer to enter the one-time use pass code into a keypad or other input device positioned adjacent to or on a customer terminal of a pneumatic tube transport system. For purposes of this disclosure, a pneumatic tube transport system is also referred to as a "VAT" system. The input of the code through the input device is operative to indicate to one or more computers in the system that the businessman is where he should be and may receive the currency. The computer system operates in response to the one-time use input to cause the requested funds to be delivered to the customer through the pneumatic tube system. This may be done, for example, by the computer operating to cause one or more outputs through an output device associated with a resource such as a teller terminal. In response to such an output, a teller may collect the desired items and place them in a pneumatic tube carrier for transmission to the customer. Alternatively in other embodiments, an automated device which may be of the type in the incorporated disclosure operates to collect the desired items and place them in a carrier on an automated basis which is transmitted through the pneumatic tube system to the customer. In still other embodiments, the one or more computers in the banking system may communicate with devices such as cash dispensers and rolled coin dispensers to make available the items that have been requested by the customer, so that either a human teller or an automated system may cause them to be placed in and delivered to the pneumatic tube system. Of course these approaches are this approach is an example, and in other embodiments other approaches may be used.

In an example embodiment, terminals 760, automated banking machines or pneumatic tube terminals (sometimes alternatively referred to as VATs) may include a processor (which is alternatively referred to herein as a computer) and a device that outputs a signal built into the machine or VAT that may provide the functions of a communication system. The communication system may be in operative connection with the bank computer system 100, such as that shown in FIG. 1. The terminal 760 may be operative to run software locally in its computer to cause the terminal to carry out all or portions of banking customer transactions. In some embodiments, the terminal 760 may comprise a thin client software architecture that may cause another computer such as a server 90, as shown in FIG. 1, to cause the execution of software applications based on inputs to the terminal.

In some example embodiments, the device may output signals such as an RFID, NFC, Bluetooth, or other wireless signal outputs from the device that may be detected by the bank computer system 100. For drive up terminals 760, automated banking machines or VATs with the computer and Bluetooth built in, the customer or user may pull up to the terminal 760 in their vehicle 776 with their phone or mobile computing device 764. The customer's phone 764 may also have Bluetooth built into their phone as well as have Bluetooth built into the customer's vehicle, whereby the customer's phone 764 may sync with the customer's vehicle 776. The system may find the Bluetooth ID from the customer's phone 764. After the phone and terminal 760 are in communication, the system may pull up a transaction interface on the drive up terminal 760 or VAT terminal that the customer may interact with, such as to proceed with a transaction.

In some example embodiments the banking computer system 100 may further contain one or more antenna 80 operatively connected to the network 102. The antenna 80 may be operatively connected to the network 102 through a mobile interface device 82. The mobile interface device 82 may include a suitable network interface card or similar mechanism that enables RF signals to be sent or received through the antenna 80. The interface and antenna enable RF communications with one or more computers schematically indicated banking computer system 100. The antenna 80 in the example embodiment may operatively communicate with mobile devices internal or external to a banking facility such as cellular phones 764, laptop computers, handheld devices, and personal digital assistants (PDAs). The antenna 80 in example embodiments may provide communication through one or more suitable mobile frequencies such as cellular, 802.11, and Bluetooth frequencies, for example.

Figure 25:
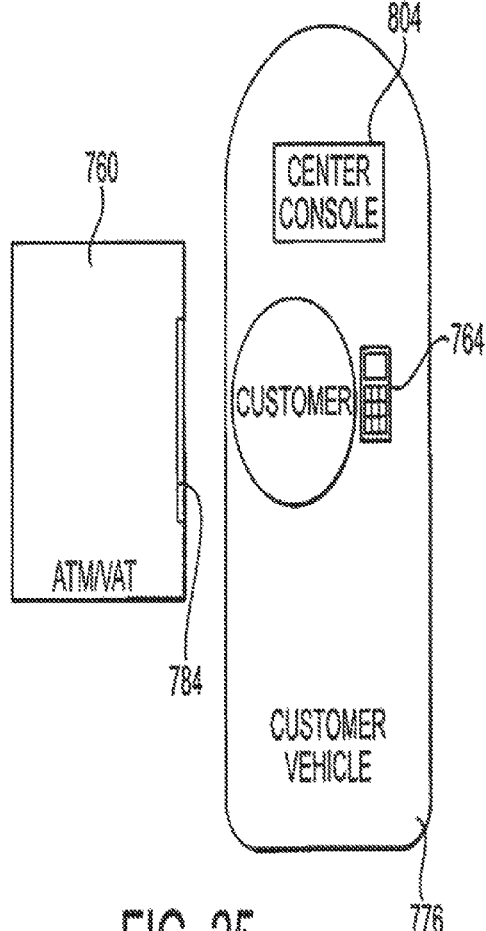
FIG. 25 shows a top view of a customer in a vehicle next to an automatic banking machine.

In this embodiment, the customer may drive up to a terminal 760, such as an automated banking machine or VAT terminal, as shown in FIG. 25. The machine or terminal may detect the Bluetooth communication from the customer's phone 764 and communicate with it. The customer may then conduct all or part of the transaction via the transaction interface on their mobile phone 764. For example, the customer may initiate a withdrawal or deposit transaction via inputs to and outputs on their own phone 764 and then complete the transaction with the terminal 760, such as receiving the cash they withdrew or depositing money or checks into the terminal 760.

Figure 26:
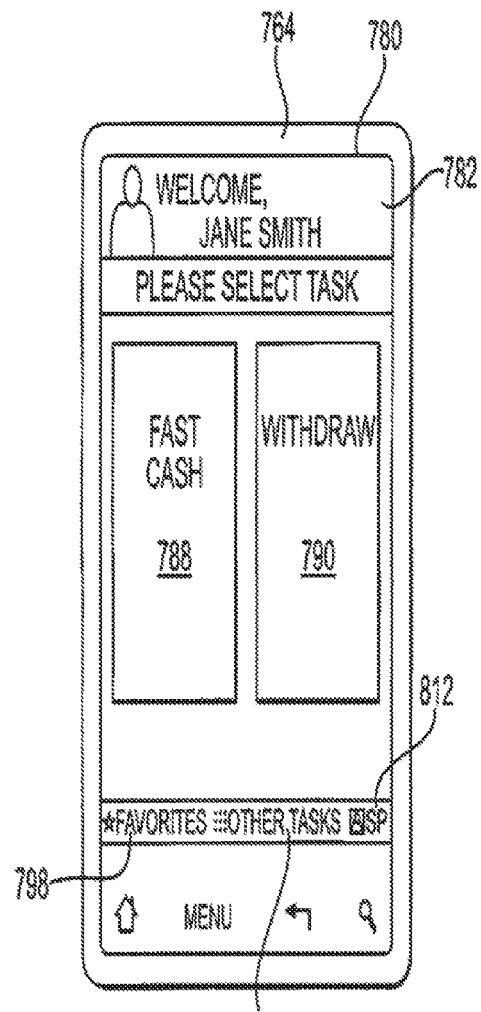
FIG. 26 shows a front view of a customer's mobile computing device.
Figure 27:
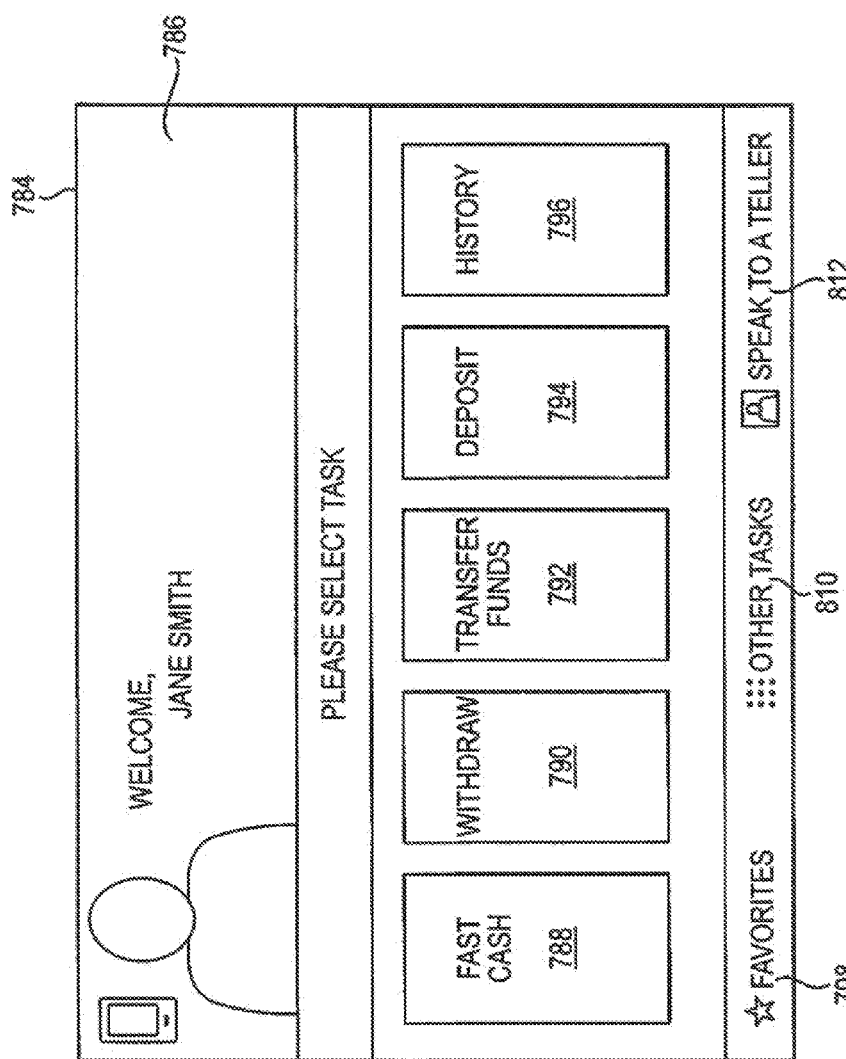
FIG. 27 shows a front view of a transaction screen.

FIG. 27 shows a customer's touch screen 784 that may be part of an automated banking machine or terminal 760 which may also include a computer and other components/devices. Similar touch screens may be part of applications that may run on the customer's mobile device 764, whereby the mobile device 764 may include a mobile device touch screen 780 that may similarly display an output 782 from the screen 780 of the mobile device 764. The customer's touch screen 784 may include a display area 786 which may output information that allows a customer to carry out a desired transaction or other banking function, as shown in FIG. 26.

As illustrated in FIG. 27, the customer's touch screen 784 may present an output 786 that may include a (make selection) message and virtual buttons (function keys) for selecting a function involving any of the following: fast cash 788, withdraw 790, transfer funds 792, deposit 794, history 796, favorites 798, other tasks 810 and speak to teller 812. A customer may touch the corresponding key to select the transaction function desired. Touching the withdraw key 790 may correspond to a customer selection that initiates a withdrawal of funds from one of the customer's accounts. Touching the transfer funds key 792 may present the customer with a series of screen outputs for transferring funds from one account into another account. Touching the teller key 812 may connect the customer with a teller. The teller key 812 may be shown in every screen output so the customer can always contact the teller for assistance. It should be understood that many other buttons and screen displays can be presented to a customer. The displays output 786 through the customer's touch screen 784 may be determined and controlled by the corresponding computer programming.

In an alternative embodiment, the system may work in an alternate manner. For example, the navigation system of the vehicle 776 may detect the drive up terminal 760, automated banking machine or VAT terminal, communicate with it, and then display the transaction interface on the customer's vehicle's in dashboard or in center console 814 system. In addition, a Bluetooth PIN pad may be exposed on the customer's connected phone 764 for authentication. There may also be two way audio communications to the phone/in vehicle audio system via Bluetooth, or alternative wireless communications methods.

Figure 28:
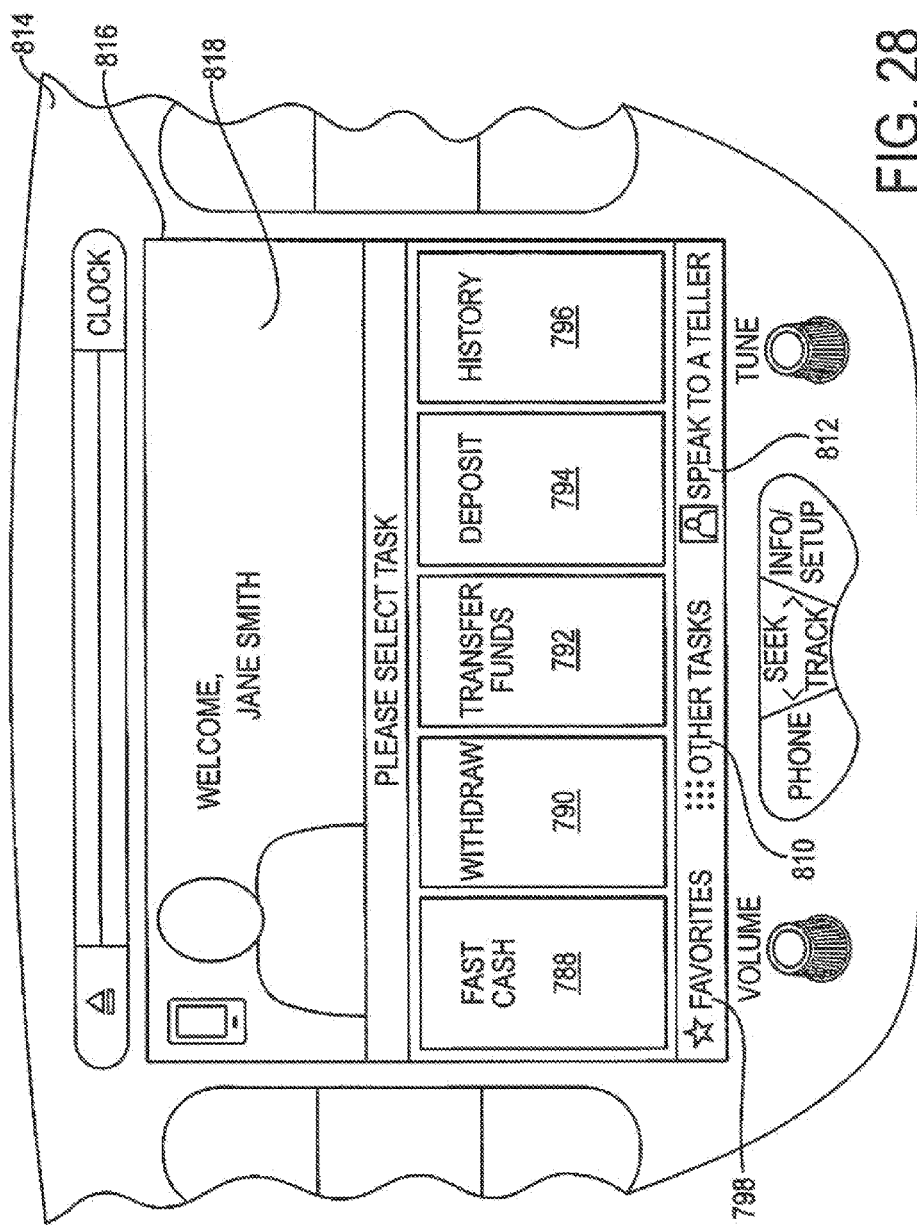
FIG. 28 shows a partial front view of a center console of a vehicle.

FIG. 28 shows a center console 814 touch screen 816 that may be in communication with an automated banking machine or terminal 760. The center console 814 touch screen 816 may be in communication with an application that may be run on the customer's mobile device 764. The center console 814 touch screen 816 that may similarly display an output 818 from the screen 816 of the center console 814. The display area 818 which may output information that allows a customer to carry out a desired transaction or other banking function as similarly described above.

In one example embodiment, the customer may drive up to a terminal 760. The customer's vehicle 776 may detect the Bluetooth communication system from the terminal 760 and communicate with it. The customer may then conduct all or part of the transaction via the transaction interface on a center console 814 of their own vehicle 776. For example, the user may initiate a withdrawal or deposit transaction on their vehicle's center console 814 and then complete the transaction with the terminal 760, such as receiving the cash they withdrew or depositing the money into the terminal 760.

As previously stated, users may be allowed to operate an automated banking machine or other terminal via their mobile phone such as described in U.S. Pat. No. 7,874,479 filed May 17, 2010, U.S. Pat. No. 8,033,456 filed Jan. 24, 2011 and U.S. Pat. No. 8,052,050 filed Jan. 21, 2011 and U.S. patent application Ser. No. 13/317,087 filed Oct. 7, 2011 and Ser. No. 13/373,168 filed Nov. 7, 2011, the disclosures of each of which are herein incorporated by reference in their entirety.

In some example embodiments a banking customer may be issued a banking card when the banking customer opens an account at the banking location. The banking card may be operatively used to identify the banking customer to the welcome terminal or remote automated banking machines. The banking card may be operative to identify a banking customer to a mobile device used by banking employees before the mobile device is authorized to request or conduct transactions within the banking facility 200. The banking card may include one or more features therein or thereon that are operative to provide outputs that identify the customer. These may include, for example, an RFID tag or an NFC tag that is operative to provide data which can be used to identify the customer. In other embodiments the card may include a memory chip or other memory device which holds data that can be used to identify the customer. In still other embodiments the card may include a magnetic stripe which has data encoded thereon that can be used to identify the customer. Numerous different types of data storage arrangements may be used in various embodiments. Further it should be understood for purposes of this discussion, a card may include other articles of a small and portable variety that may be suitable to provide identifying inputs associated with a customer.

In some example embodiments, the terminal may be set up to have transactions be more readily performed through the user's mobile device. For example, although the terminal would normally have a video output through the display, the terminal could be set up so that it hands off the video presentation or dialog with an actual teller to the user's mobile device. This may be done, for example, by having some correlation between the user ID, such as the user's card number or some other user identifying value, and the user's mobile phone number. When the user starts a transaction at the terminal, they might select to have the transaction carried out on their mobile phone. Responsive to having determined that the particular customer is at the terminal, one or more computers may be operative to cause the terminal to transfer the details of the transaction to the user's mobile device. The voice client on the phone could then allow them to carry out the transaction either via voice commands or by manual inputs to the phone.

Conversely, transactions could also be started the opposite way, such as initiating the transaction on the mobile device and then finishing the transaction at the terminal. In both instances, handing off the transaction from the terminal to the user's smart phone, or vice versa, would facilitate a more private discussion related to the transaction and may free up the terminal for other customers to use, while still allowing the initial customer to continue their discussion after they leave the terminal.

During transactions of this type, there may be the need for some validation to indicate that the user is in fact located at or near a terminal. In some example embodiments, the terminal may require that the user input a code into their phone, either by speaking the code or by inputting some output indicated on the terminal display. The terminal may output a one-time use code on the screen that the user then needs to input into his mobile device. Alternatively, the user could be required to receive a value on the mobile device and input that value into the terminal. Another alternative may be to have a QR code on the screen of the terminal or on the screen of the mobile device, which could then be read by the opposite device. This would enable verifying that the person conducting the transaction on the phone was in fact at the terminal. A further enhancement on this concept may be to have voice ID as a secondary authentication factor for the user on the call. Voice ID may be done through any appropriate operation, such as APIs. This may essentially allow a user to conduct a transaction on a "bring your own display" basis. This may be done using features like those shown in U.S. patent application Ser. No. 13/068,461 filed May 11, 2011; Ser. No. 13/135,526 filed Jul. 7, 2011; and/or Ser. No. 13/134,128 filed May 31, 2011, the disclosures of each of which is incorporated herein by reference in its entirety.

In some example embodiments, other personal forms of identification may also be utilized to further identify a user at a terminal. For example, a user's vehicle key fob may be used. The vehicle key fob may include an ID that may be read at the terminal to further identify the person. Similarly, NFC and RFID tags in the user's mobile device may be utilized.

In other example embodiments, the floor space around the terminal may include a covering or coating with a sensor network. When the user is located on the floor space around the terminal, the sensor network located within or on top of the floor space surrounding the terminal may send a signal to the terminal to indicate that the user is currently located at the terminal. Responsive to having determined that the particular customer is at the terminal, one or more computers may be operative to cause the terminal to provide outputs appropriate for the particular user.

In some example embodiments, in order to further identify the customer, the terminal may include a sensor system similar to an electroencephalograph (EEG) that may measure the fluctuations in the brain activity of the customer. The identification software may be in operative connection with the banking computer system that may store a database of identifying information for each customer. Each person has a unique pattern of neural pathway that determines their brain activity. This makes an EEG biometric system hard to forge and therefore desirable for use in identification. The customer would need to have an authentication of the EEG, a sort of base "fingerprint" or "signature" to compare subsequent authentications against.

The initial authentication procedure may be non-invasive, using a removable cap that may have even fewer electrodes than used in standard EEGs. The data taken may then be sent to one or more of the computers in the banking network 102 for analysis and filing away in a database.

This method of authentication may be incorporated with other types of identification to create a secure system of identification.

Figure 5:
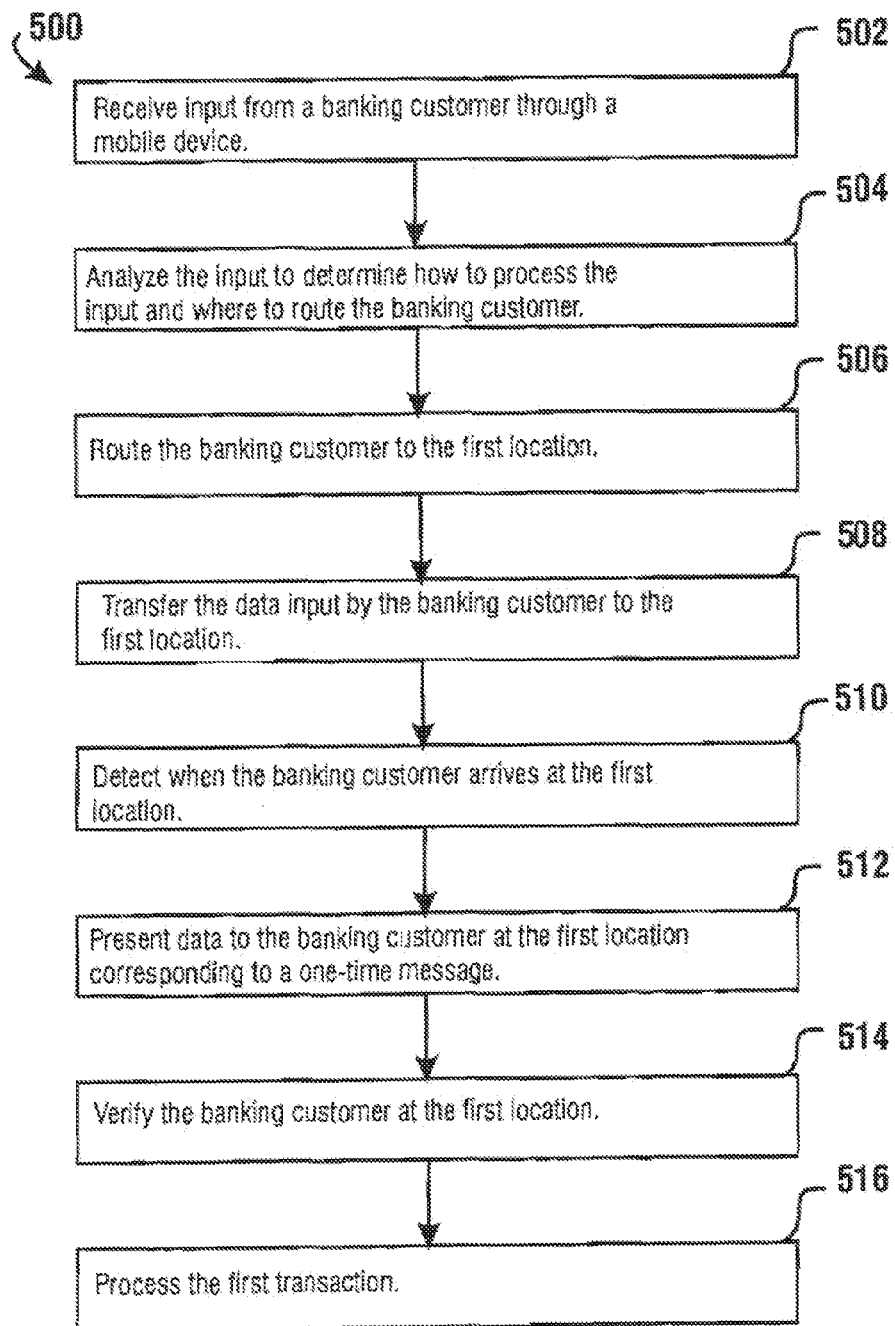
FIG. 5 is a schematic diagram of a method associated with processing banking customer transaction requests made from a mobile device.

FIG. 5 shows a schematic representation of an example method of processing banking transactions in a system that includes a welcome terminal 500. The method may include a step 502 where one or more inputs are received from a banking customer through an input device included on a mobile device. The input may be received before the banking customer arrives at a bank and may contain information about the types of transactions the banking customer would like to perform. Data corresponding to the one or more inputs is transmitted through wireless communication to one or more computers included in the banking computer system. At step 504 the input is analyzed through operation of one or more computers to determine which one of a plurality of banking transactions requested by the customer will be processed first and where to route the banking customer once the customer arrives at the bank.

The banking customer is routed to a first location in step 506. This is done through communication between one or more computers in the system and the mobile device. The mobile device provides outputs to indicate to the customer where the customer is to go.

Alternatively, the customer may be provided with outputs through other output devices that are perceivable in the area where the customer is located, either inside or outside of the banking facility. This may include, for example, beginning to prepare necessary items for delivery to the customer through operation of a self service terminal or automated banking machine.

Alternatively it may include the generation of electronic and/or paper forms through operation of a computer terminal. In other embodiments it may include the generation of other items by a service provider in response to outputs from a teller terminal or other terminal device.

In step 508 data entered by the banking customer is transmitted through operation of at least one computer to a first location. The first location may correspond to the banking resource that will handle the first banking transaction. Transferring the data to the first location may allow the first banking transaction processing to begin by the resource before the banking customer arrives at the first transaction location. At step 510 the banking customer may be detected when they arrive at the bank location. This may be done, for example, by detecting the presence of the customer's mobile device at the bank location by sensing RF signals or other signals emitted from the device. Alternatively, detecting the customer at the bank may be accomplished through image analysis based on images captured by cameras and processed through one or more computers to identify a facial or other image associated with the customer. In still other embodiments other identifying aspects associated with the customer, such as the customer's unique identification card or other article, may be sensed. Of course these approaches are examples At the first location a one-time message or password may be presented to the banking customer in step 512. The one-time message may be generated through operation of one or more computers in response to their programming. The one-time message may be communicated to a device such as a self-service terminal or other resource that the customer is to utilize in carrying out the customer's transaction. The customer may then input the one time message. The message is input by the customer to the customer's mobile phone. The message included as part of the message from the mobile device is communicated through operation of the mobile device to one or more computers in the banking system. In accordance with their programming, one or more computers are operative to compare the input message received from the mobile device to the one-time message generated by the system. In some example embodiments the computer is also operative to analyze the source of the communication, such as the particular mobile device and/or the location of the mobile device, based on outputs which can be detected by the system. This may include, for example, the system determining the phone number, network address, or other identifying data associated with the mobile device to confirm that it is the mobile device of the customer. Likewise, GPS or other tracking data may be used to determine the location of the particular mobile device from which the input is received.

In response to one or more computers in the system determining that the data input through the mobile device corresponds to the customer and the indicated output code, the at least one computer is operative to cause outputs or operations at the particular banking resource that cause the customer's requested transaction to occur. At step 514 a verification determination is made that the banking customer is at the first location. The verification may include prompting the banking customer to enter the one-time message into a mobile device used by the banking customer and analyzing related data. At step the first 516 transaction is processed.

In an alternative example embodiment the banking computer system may be used to generate personal messages to a banking customer. As a banking customer approaches the bank, welcome terminal, teller terminal, automated banking machine, or other resource location a banking customer may approach to conduct a banking transaction, the banking computer system may be operative to identify the banking customer. The banking customer may be identified by any of the methods described above, for example image recognition by devices recording images of persons in the banking facility. When the banking customer is identified through operation of one or more computers, data associated with that customer may be retrieved from one or more data stores. Data is used by the banking computer system to cause to be produced, a personal greeting or other messages to the banking customer.

In some example embodiments, an electronically communicative chip, such as a RFID or NFC chip for example, may be implanted into any appropriate or desired location in or on a human person. For example, in order to use the terminal the user would not need to have any other device with them while at the terminal in order to process a banking transaction. The RFID implant may be placed under the user's skin. For example, the chip may be as small as a grain of sand and be able to be syringe-injected. The chip implant may be in operative connection with a banking computer system to activate the identification software and would be able to identify the user during a banking transaction. These chips may also be placed in any other desired object, such as a pen, a ring, a pair of earrings or the like. Responsive to having determined that the particular customer is at the terminal based on the implanted or other associated identifying device, one or more computers may be operative to cause the terminal to provide outputs appropriate for the particular user.

In other example embodiments, these chipped customers may be able to walk past a "reader" that may verify the customer's identity and links it to their current banking accounts. These implanted chips may even automatically open doors to exclusive areas of the bank for them. The customers may then conduct various banking transactions with a wave of their hand and do not need to worry about losing a banking ID card, credit card or wallet. Implanted chips may eliminate the need to carry ID documents and credit cards.

In other example embodiments, an electronic device having physical properties that are similar to human skin may seamlessly integrate and conform onto the surface of the human skin, such as a patch acting as a temporary tattoo. For example, the epidermal electronic circuit may initially be mounted on a thin sheet of soluble plastic or paper and then laminated onto the human skin with water, just like a temporary tattoo. Once the electronic patch is on, it may bend, wrinkle and stretch along with the user's skin. When the electronic patch is no longer desired or needed, the patch may be peeled off like a layer of dead or sun burnt skin. Adhesion of the patch may last as long as desired, such as twenty-four hours or a week. An electronic patch like this may be desired when going to the beach or some other place where it may be inconvenient to carry a phone, wallet or purse. This electronic patch may communicate with the terminal to act as a personal ID. Alternatively, the electronic device may be temporarily or permanently tattooed onto the skin of the user, such as with a form of electronic ink. This electronic device may be able to communicate with the terminal.

In some example embodiments, other authentication approaches may include greater use of facial recognition. As discussed in prior embodiments, a computer may be capable of retrieving the personal data about the banking customer from a database of personal information in operative connection with the banking computer system. The banking computer system may be operative to activate the recognition or identification software. The customer may be detected by a camera system that captures images and that is in operative connection with a computer that operates facial recognition software. Responsive to having determined that the particular customer is at the terminal, one or more computers may be operative to cause the terminal to provide outputs appropriate for the particular user. Of course these approaches are examples During an initial authorization process at the bank, a photo of the customer may be taken and entered into the facial recognition software. The facial recognition software may identify faces by extracting landmarks or features from an image of the user's face, such as the relative position, size, and/or shape of the user's eyes, nose, cheekbones, jaw and the like. In addition, facial recognition software may utilize 3-D technology to detect and identify distinctive features on the surface of the user's face, such as the contour of the eye sockets, nose, chin and the like. Other identification or authentication software may analyze visual details of the user's skin.

Later or during another visit, the customer's face may be analyzed by the facial recognition software to compare the real-time face of the customer to the data related to the face and facial features of the customer that may be saved on the bank's server or network 102, which may provide instantaneous and accurate identification of the customer. This facial recognition data may also be stored on a chip, such as an RFID or NFC chip, located within the user's banking or ID card or within a chip on the user's mobile device. If the facial recognition data of the customer does not match the data of the card or mobile device user, the bank's security team may be notified and the user may not proceed with any banking transactions. In an example embodiment, the facial recognition software may operate as a security and identification measure taken at the terminal, whereby instead of using a banking card or PIN, the terminal may capture an image of the user's face and compare that image to the image stored in the bank's database in order to confirm the identity of the user.

In some example embodiments a database of personal information for each banking customer may be in operative connection with the banking computer system. Information, such as data corresponding to the history of the transactions the banking customer conducted at the bank, may be saved in the database. Other information such as the height, weight, hair style, clothes worn, visual images, hobbies, political views, family history, jewelry, health history, previous banking responses, special interests the banking customer may have, and other personnel information may be saved in a database. The banking computer system may be operative responsive to image data captured through one or more cameras to recognize the face, image, clothes, hair, jewelry, watch, shoes, responses and actions of a banking customer during visits to a banking facility and store data corresponding to this information in a banking database for future reference.

In some example embodiments the current mood of a banking customer may be operatively determined through operation of the banking computer system. This may be done by analyzing the customer's actions, motions, body language, facial expression or other detectable parameters. If, for example, it is detected that the customer is acting in ways that suggest the customer is in a hurry, the computer may cause the banking resource such as a self-service terminal to provide outputs more rapidly, provide outputs that are shorter, or eliminate promotional messages and take other steps to cause the terminal to operate more promptly consistent with the customer's determined status as in a hurry. Alternatively or in addition, the customer might be presented with the option through an output device on one or more banking resources such as an automated banking machine or a self-service terminal, to indicate that the customer is in a hurry to complete the transaction. When this occurs, one or more computers either within the terminal or outside the terminal may operate in accordance with their programming to take steps such as those previously discussed to cause the transaction to be completed more quickly. Of course these approaches are examples In some example embodiments the greeting or response may be displayed on a screen of a display device of a welcome terminal or other device in the form of text. Alternatively, the greeting or response message may be presented on a screen in the form of a virtual person speaking the message with a corresponding computer generated audio voice output. In some example embodiments the greeting or response may be presented by a device that projects a realistic three-dimensional image of a person speaking the personal message or response message responsive to operation of one or more computers. In some example embodiments the device may be operative to project a holographic image of a person.

In some example embodiments the banking computer system is operative to determine, based on stored data, the age of the banking customer. The computer operates to cause an image of a simulated person of similar age to be displayed to the banking customer on an output device. In some example embodiments the banking computer system may be operative to make a determination of a kind of person likely to put the banking customer most at ease, based on stored data. The at least one computer is operative responsive to this data to display the image of this type of person to the banking customer for welcoming and responding to the banking customer. Of course these approaches are examples In some example embodiments the greeting or other messages output to the banking customer may be tailored to changes in the appearance of the banking customer. Records of past banking visits may be retrieved from a database. Past data on the clothes, wrist watches, shoes, hair styles, weight, jewelry, and/or other data of interest pertaining to the banking customer may be retrieved. In some example embodiments if the banking computer system detects any change in this data, a personal greeting or response to the banking customer may be generated through one or more computers that compliment the banking customer on the change. In some example embodiments the banking computer system may analyze image data to detect and identify family members or other people accompanying the banking customer. The computer may be operative to generate personal greetings and responses to the family members or other persons accompanying customers. In some example embodiments a greeting or response to the banking customer may be generated responsive to image data and/or other information about the people accompanying the banking customer. In some example embodiments the automated banking machine 760 may utilize a voice profile and/or a photo profile of the customer in order to verify that the person attempting to use the machine is an actual customer and to prevent unauthorized transactions at the machine. For example, as also discussed herein, facial recognition software or other recognition software may be utilized to help verify that the individual is who they say they are prior to the completion of the transaction at the machine 760.

Features such as analyzing digital information to identify a person or traits that might be associated with a person are illustrated in U.S. patent application Ser. No. 12/931,261 filed on Jan. 27, 2011 (e.g., identifies images such as a person wearing a mask, carrying a weapon and the like) and Ser. No. 12/319,194 filed on Jan. 2, 2009 (e.g., discusses using the processing power in the machine to look for facial images that correspond to a terrorist or other entity), the disclosures of each of which are incorporated herein by reference in their entirety.

In some example embodiments, the machine 760 may include a microphone 42. For example, the microphone 42 may detect whether foreign language audio is being spoken adjacent to the automated banking machine during the transaction. For example, the computer in the automated banking machine 760 or a computer in a private cloud 113 connected to the automated banking machine may operate to recognize the fact that the person seeking to conduct the transaction is speaking Russian or some other foreign language that is unusual in the vicinity of the machine. The recognition of spoken Russian language occurring at the time of the transaction might serve as an indicator which causes the machine to come under surveillance by the remote service provider operator 22.

Of course, any other factors that can be detected through image analysis by a camera 70 and/or via sound analysis where sound is captured through a microphone 42 could be utilized to be an indicator that a transaction should be given additional scrutiny. For example, if the camera 70 picks up suspicious activity located around the machine and/or located around the customer attempting to complete a transaction at the machine 760, the machine may prevent the transaction from being completed by sending a message to the screen indicating the machine is currently inoperable or the like.

The automated banking machine 760 may include software that may provide for automated voice stress analysis of the customer at the machine as may be picked up by the microphone 42 at the machine 760. The level of stress of the customer may either be detected through operation of the automated banking machine computer or a computer that is located remotely, including the computer 20 at the remote teller station 22, such as at a banking facility 200, for example. The level of stress of the customer could be utilized to make an indication of a possible fraudulent transaction.

The level of voice stress of the customer may also be in combination along with other indicators that might suggest a fraudulent transaction. For example, other indicators might include detecting whether the person being unusually sweaty, which could be determined via contact points with the machine such as through a connection to the keypad 32. Alternatively, image analysis taken from the camera 70 could be used in conjunction with voice stress analysis taken from the microphone 42 to determine whether or not the customer keeps looking around, keeps shuffling their feet, exhibits body language or fidgets in ways that suggest that they are acting nervously during the transaction. This image analysis could be used to detect the conditions and subject the transaction to additional scrutiny by the remote teller, for example.

As discussed in more detail herein, the automated banking machine 760 may utilize biometric identification, such as via a biometric identification device 56, to identify the customer using the machine. For example, the automated banking machine may identify a user via an image and/or voice. U.S. patent application Ser. No. 13/199,518 filed on Sep. 1, 2011, the disclosure of which is incorporated herein by reference in its entirety, illustrates that the automated banking machine 760 itself or the remote computer system operated by the user interface may be utilized to identify a user either by an appearance aspect, such as an iris scan, retina scan, facial recognition, fingerprint recognition, etc., as well as voice recognition and the use of sound to automatically detect fraud.

In some example embodiments data on pets of the banking customer may be obtained from one or more sources and stored in a data store in operative connection with the system. In response to identifying the particular customer, one or more computers may be operative to access the data corresponding to the particular customer's pet or pets. The computer may then operate to include in the personal messages to the customer comments or messages about the particular customer's pet or pets. In some example embodiments one or more computers in the banking system may operate to analyze the data concerning the customer and make a determination that the customer has certain characteristics which cause that customer to be classified within a particular category or group. In some this approach is an example groups the classification may correspond to social status. In other example embodiments, the classification associated with the customer may indicate that the customer is not a native English speaker. In other example embodiments the classification may indicate that the customer has a particular disability and require outputs of a particular type from automated banking machines in order to utilize those machines. Based on this determination as to the category in which the particular customer is classified, the one or more computers are operative to provide outputs to devices through banking resources that correspond to the particular classification.

In some example embodiments the banking computer system is operatively connected to one or more databases with information on the current weather data, recent news stories, and sporting event results, for example. This information may be used by one or more computers to generate a greeting or personal responses to a banking customer tailored based on such data. In some example embodiments the banking computer system is adapted to analyze the images of the banking customer and to recognize movements or other detectable indications that the banking customer is in need of medical care. This might include analysis of image data that indicates that a customer is doubled over, is listing, is shaking, or has fallen, for example. The greeting message and responses may be tailored to the medical care needs. If the banking customer is in need of urgent medical care the banking computer system may operate to send one or more messages to bank personnel or to a hospital or an ambulance requesting assistance for the banking customer.

Figure 6:
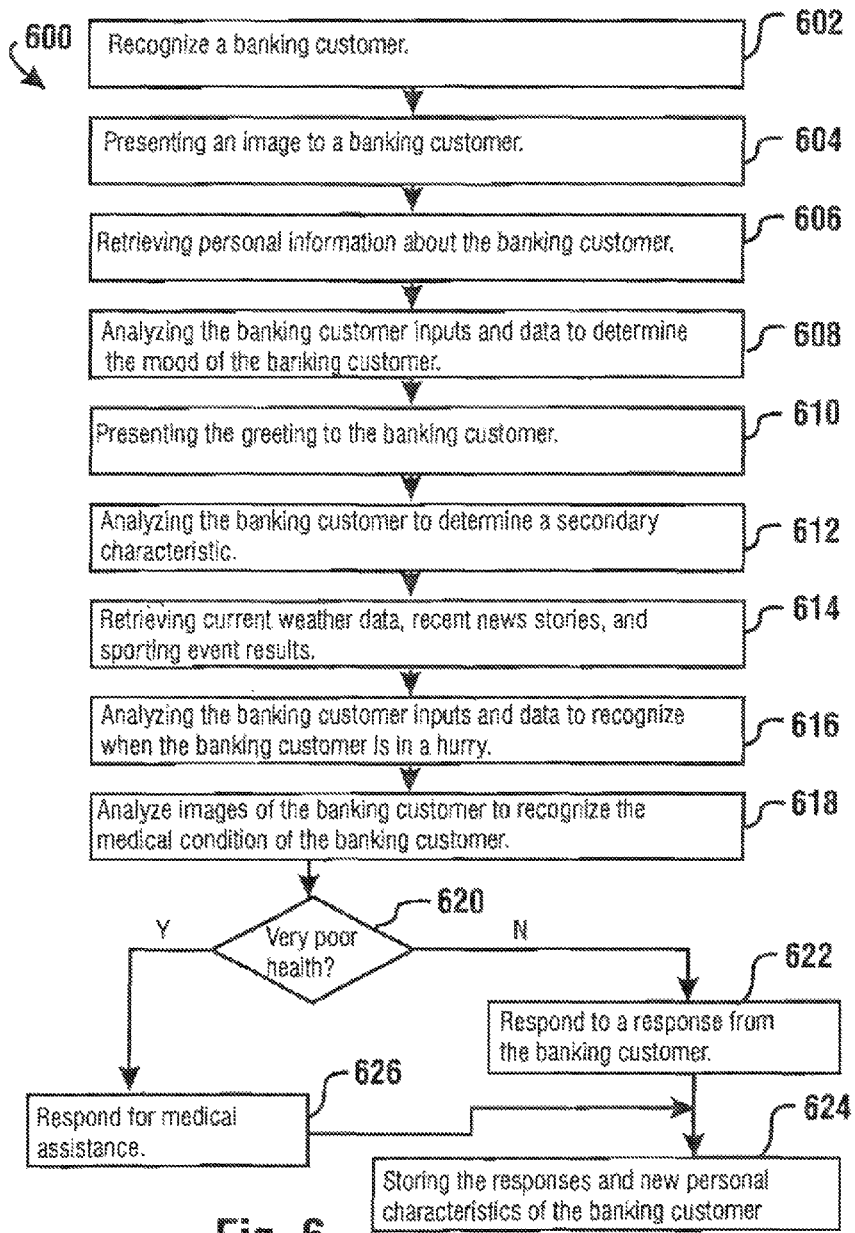
FIG. 6 is a schematic diagram of a method associated with processing banking transactions using a surface computer.

FIG. 6 is a schematic representation of an example method of processing banking transactions 600. The method begins at step 602 by identifying a banking customer. The banking customer may be recognized when the customer arrives at the bank. This may be done through operation of one or more computers, based on received data in one or more of the ways previously discussed. At step 604 the banking customer is presented an image through an output device. The image may be a personalized welcoming image and may be presented in one or more of the ways described above. At step 606 personal data about the banking customer is retrieved from a database of personal information in connection with the banking computer system. At step 608 the images, inputs or other available data or properties associated with the banking customer, or the inputs the customer has recently provided to devices connected to the computers, is analyzed to determine the mood of the banking customer. The data is analyzed through operation of one or more computers to determine one or more properties corresponding to a probable mood of the banking customer. The computer then operates responsive to the resolved probable mood data to generate a greeting to the banking customer which corresponds to the result of the analysis. At step 610 the banking customer is presented with the greeting.

The greeting may be personalized to the banking customer and may be tailored to the resolved data concerning the mood of the banking customer. At step 612 one or more images of the banking customer may be analyzed to recognize a secondary characteristic. Secondary characteristics may include for example, clothes, hair, jewelry, wrist watches, shoes, or other perceivable features associated with the banking customer. When a secondary characteristic is detected, the computer may operate to provide messages to the banking customer tailored to the secondary characteristic. At step 614 data corresponding to current weather data, recent news stories, and sporting event results may be retrieved through operation of one or more computers. This data may be retrieved from one or more data stores included in the banking system.

Alternatively such data may be retrieved from an external source such as sources accessible through the Internet or other operatively connected network. This data may be used by one or more computers to generate messages to the banking customer. At step 616 data corresponding to images, movement, properties, inputs, tone of voice, or other data associated with the banking customer may be analyzed to make a determination as to when the banking customer is in a hurry. In some cases the customer may provide an input in response to an output message from the welcome terminal or an automated banking machine asking the customer to provide one or more inputs to indicate the customer is in a hurry.

When it is resolved or otherwise determined that the banking customer is in a hurry, the computer may operate to cause outputs, wait time, or information provided to a customer to be shorter, or the computer may operate to eliminate the display or provision of advertising, additional queries, or output of other information that might be provided when a customer is determined not to be in a hurry.

At step 620, images, movement, characteristics or properties associated with detectable aspects of the banking customer are analyzed to determine a probable medical problem of the customer. If the banking customer appears to have a medical problem, one or more computers are operative to generate a request for medical assistance at step 626. If the banking customer does not appear to have a medical problem, one or more computers are operative to generate a response to a banking customer as represented at step 622. At step 624 a database of personal information corresponding to the banking customer is updated responsive to operation of one or more computers based on the responses and new personal characteristics of the customer.

In some example embodiments a surface computer may be operative to process customer banking transactions. The surface computer may be operatively connected to the network 102 of FIG. 1. For purposes of this disclosure, a surface computer will be deemed to be a computer including a large, generally planar display surface. Through such a display surface multiple users may at the same time or during a single transaction session or during overlapping transaction sessions, receive visible outputs from the display surface and provide inputs to through physical contact with the display surface. In an example embodiment the surface may comprise a surface which provides a visible output while at the same time enables the receipt of inputs from multiple users through contact with the surface in disposed areas. In some embodiments the display surface may comprise a large single touch screen panel, while in other embodiments the display surface may include a plurality of such panels arranged to have the surface thereof in generally a single plane.

In other example embodiments the terminals may include signature pads, whereby the user's signature may be captured at the terminal. For example, a display or track pad on a mobile device, which is touch sensitive, may be utilized to allow a user to write on it with their finger or a stylus. As another alternative, a signature pad may be integrated into the touch screen of the terminal. Features may be used like those shown in U.S. Patent Application Ser. No. 61/479,005 filed Apr. 26, 2011 which is incorporated herein by reference in its entirety. For example, a glass surface may be utilized, whereby the glass may measure the amount of force applied to it. A user may write on the touch screen with their finger or a stylus and the terminal may not only sense the positions through which the finger passes, but also the pressure that is applied to the touch screen. The pressure features and speed may be indicative of a genuine signature based on repeatability.

This type of force-touch touch screen may be integrated into the terminal. Another alternative may be to include a smart stylus device. The smart stylus device may be like a pen, but the touch and speed measuring aspects may be located within the stylus device, whereby the stylus device would be able to capture and detect if the signature was valid. Alternatively, the accelerometers located in mobile devices may be utilized to allow the user to essentially write their name in the air using their phone to produce their signature. For example, the mobile device may be operatively connected to the terminal via wireless communications.

In some example embodiments, avatars and facial transformation software may operate to present the customer with a constant user experience from the same "person." Features may be used like those shown in U.S. patent application Ser. No. 12/384,479 filed Apr. 3, 2009 and Ser. No. 12/925,114 filed Oct. 14, 2010 the disclosures of each of which are incorporated herein by reference in its entirety. For example, a user may approach the terminal and that person may be asked if they would like to have the same teller assist them that may have helped them with their previous transactions. If they did, then a virtual person who looked the same (such as avatar or face and voice transformation) may assist them with the transaction. This way the user could establish a relationship with that virtual teller that would appear to be the same person. For example, a file or database of personal information and preferences could be maintained on each user, whereby that information could be provided during each user session.

In an example embodiment each banking customer may have a variety of information stored on a bank network 102 database, such as keeping track of how long it has been since the user last visited the bank, referencing the user's clothing, additional persons who are accompanying the user, pets that accompany the user, changes to the user's hairstyle, the presence of any bandages or casts related to discussions of any injuries, noticing the user's use of a handkerchief or tissue that might indicate a cold or health issue, and other things that may be the basis for casual conversation, such as the weather, sporting events and the like, so as to make the terminal-presented teller appear more like a regular individual. In other example embodiments, the computer generated person projected at the terminal may include and utilize eye tracking software. The eye tracking software may operate to provide inputs into the terminal. The eye tracking software may also be used by the terminal-presented teller or avatar so that the teller appears to look at the user when "speaking." In addition, eye tracking software may operate to permit the customer to communicate with the terminal and complete banking transaction using only the customer's eyes and eye movements.

For example, the user may control the functions of the terminal with the movement of their eyes, whereby the user's eyes may act as a pointer or cursor on the screen. Features may be used like those disclosed in U.S. Pat. No. 8,220,706 the disclosure of which is incorporated herein by reference in its entirety.

In some example embodiments the surface computer operates in accordance with its programming to allow a banking customer to display indicia corresponding to banking services to be output through a display surface of the surface computer, and to allow a banking customer to organize and compare the accessed banking services. A surface computer may be in operative connection with one or more cameras or other devices that operate to sense the then current position of the user's face and/or eyes. This may be done through software which is operative to analyze data corresponding to such features.

In such example embodiments when a person selects banking data to be displayed with the surface computer, the computer is operative to cause the display surface of the surface computer, based on where on the display surface the banking customer appears to be looking, to display the data at that location. The surface computer is operative to allow the banking customer to compare and sort indicia corresponding to different features of the displayed banking services and to select one of the banking services to be performed through contact with the display surface. The surface computer may also be operative to enable a banking customer to display, sort and select indicia corresponding to icons or other indicia output through the display surface to carry out transactions such as a review of banking account information and to open a banking account. The example surface computer interface is adapted to allow a banking customer to touch, slide a finger and tap the surface computer with a finger when organizing, comparing and selecting data. The touch, sliding and tapping of the surface computer surface is operative to cause the opening, closing, rotating, flipping, stretching and shrinking of indicia and data displayed on the display surface responsive to operation of the computer.

In some example embodiments the surface computer may have the display surface included as all or part of a desktop or a wall surface. In some example embodiments the surface computer may receive inputs that enable the computer to identify the banking customer and operate to automatically access information stored in a banking database about banking transactions that the identified customer commonly performs. For example in some embodiments, images of the banking customer may be captured by cameras located within the display surface of the surface computer.

The banking customer images may be analyzed by a computer running facial recognition software. The facial recognition software operating in the surface computer may operate to identify the customer and provide outputs or other information in response thereto. In other embodiments a surface computer may receive inputs through the display surface such as biometric inputs. Such inputs may include, for example, a fingerprint scan or hand scan. The data which is input may be used to identify the customer. Of course these approaches are this approach is an example, and in other embodiments other approaches may be used.

In some example embodiments the banking customer may be recognized by sensors that capture data that enables the computer to recognize that a mobile device placed on or adjacent to the display surface of the surface computer belongs to a particular banking customer. This may be done through sensors that are operative to capture image data or other visible data of the mobile device that identifies it as belonging to a particular user.

Alternatively or in addition, the display surface may include other sensors which are operative to sense other characteristics of items. This may include cards, passbooks, checks, tokens, fobs or the like. Further, in still other embodiments, the surface computer may be in operative connection with an input device such as a wireless input device. The wireless input device may receive inputs from a mobile device or other article carried by the user that provides data that can be used by one or more computers to identify the user. Of course these approaches are examples The surface computer may be adapted to recognize the cell phone, laptop computer or personal digital assistant of a banking customer. The surface computer may include an interface that enables the banking customer to transfer data from a mobile device to the surface computer, and the surface computer may be adapted to allow the banking customer to transfer data from the surface computer to a mobile device. This may be done, for example in some embodiments, by an optical interface that enables sensors included in the display surface to read data output on a screen associated with a mobile device. Alternatively the data interface may include transmission of data through optical signals that are exchanged between the mobile device and the display surface or other interface that is in operative connection with the surface computer.

In some example embodiments the surface computer may be operative to allow data to be transferred to the mobile device by providing an interface to allow a banking customer to touch an icon on the display surface and drag the icon to a zone adjacent to or around the mobile data device while the mobile device is on or touching the display surface. The surface computer may operate to allow a banking customer to access existing banking account information of the banking customer and to display the account information on the display surface. In some example embodiments the surface computer is operative to automatically retrieve banking customer data from a portable mobile device the banking customer may have placed near the surface computer. Of course these approaches are examples In some example embodiments, the terminal may include a display or touch screen made of glass. The glass may have a film or other coating placed on the inside surface of the glass, whereby the film may enable projection of images onto the glass display which can be viewed from outside the glass and yet still allow for viewing through the glass from the inside out. This glass display or touch screen may operate to permit a camera to view through the display while at the same time projecting images thereon. This glass display or touch screen may operate to allow the terminal to identify a user by having the user place their driver's license up against the display.

For example, the camera behind the display may view the user's face through the glass as well as the user's driver's license. Facial recognition software may then be used by at least one processor to determine if the driver's license corresponds to the user at the terminal. Additional elements located on a valid driver's license, such as the presence of holograms and the like, may also be resolved by operation of the at least one processor and may be used in determining that the driver's license is genuine.

As a result, the facial recognition of the person and verification of the driver's license may be performed at the same time. In addition, the user may be verified as the person at the terminal without the need to maintain an additional database of information regarding the user. The glass display may also provide the capability of having the customer hold up a check to the display, whereby the check may be imaged through operation of the camera and at least one processor and/or viewed by a remote teller. Features may be used of the type shown in U.S. patent application Ser. No. 13/066,323 filed Apr. 12, 2011 the disclosure of which is incorporated herein by reference in its entirety.

In other example embodiments, the terminal may also include a display, such as a glass display, that may be positioned and/or function as a shelf, whereby the shelf may generally be parallel to the floor space. This glass shelf may function as a display, touch screen, track pad, surface computer and the like. The shelf may include a film whereby images may be projected onto the underside of the shelf. For example, to complete a banking transaction the shelf may project an image of a card or a mobile device on the shelf to indicate that the user should place their card or mobile device on the shelf to complete the transaction. The shelf may interact with both the users touch as well as the users electronic devices, such as via NFC.

Figure 7:
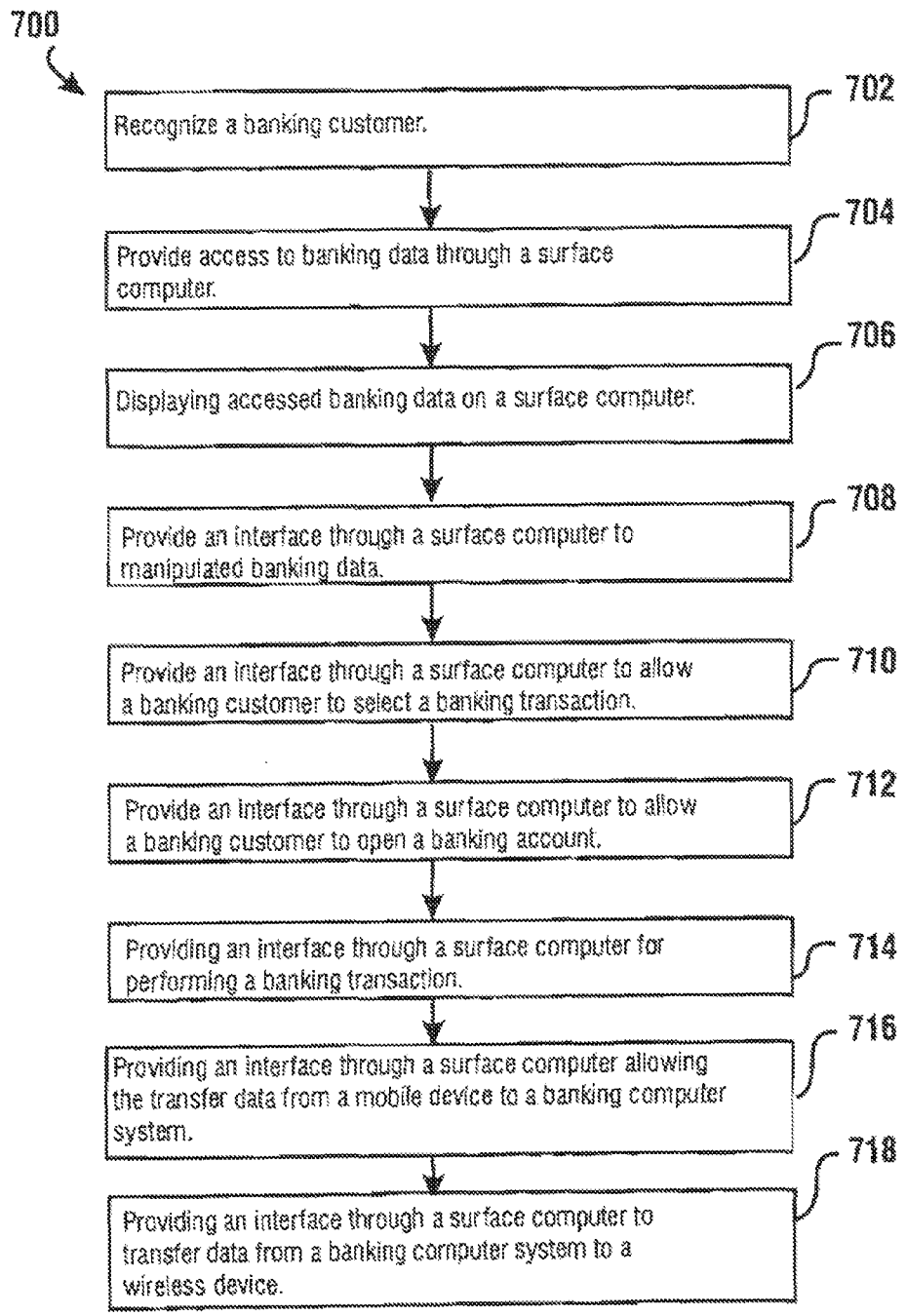
FIG. 7 is a schematic diagram of a method associated with processing banking transactions in a manner personal to the customer.

FIG. 7 schematically represents an example method of processing banking transactions using a surface computer 700. The method begins at step 702 by identifying a banking customer. The banking customer may be recognized through image data captured by devices within the display surface of the surface computer or by image capture devices operatively connected thereto. Such customer recognition may be accomplished by capturing images of the customer's face, thumbprint, or other biometric features. One or more computers including the surface computer may operate to identify the user based on one or more biometric features. Alternatively, a user may be identified based on an article or signals output by or sensed from the article, such as the user's mobile device, token, passbook, check, checkbook, card or other item that is uniquely associated with the customer.

The computer receives data corresponding to the one or more inputs and operates to determine if the received inputs have a corresponding relationship to data stored in at least one data store in operative connection with the computer. In response to determining that the received data corresponds to stored data for a particular customer, the computer operates to determine the customer's identity and to resolve that the identified customer is to be authorized to conduct transactions through the surface computer. At step 704 access is provided that allows banking data to be accessed by the identified customer through the surface computer.

The computer operates responsive to the one or more inputs received through the display surface to cause data to be retrieved which corresponds to that requested by the computer's inputs. At step 706 the data that is received responsive to the inputs is displayed on the surface computer. At step 708 an interface is provided through the display surface of the computer to allow a banking customer to organize and compare indicia corresponding to the accessed banking services. At step 710 an interface is provided through the surface computer to allow a banking customer to provide one or more inputs operative to select a banking transaction. At step 712 an interface is provided through the surface computer to allow a banking customer to open a bank account. An interface to allow the performance of a banking transaction is provided at step 714.

At step 716 an interface through the surface computer is provided to allow the transfer data from a mobile device to a banking computer system. At step 718 an interface is provided through the surface computer to transfer data from a banking computer system to the surface computer may be provided. Thus as can be appreciated, the surface computer may provide various interfaces through the display surface that enable the provision of outputs and the receipt of inputs that cause selected transactions for users to be carried out. Of course these approaches are examples In some example embodiments a surface computer may be combined with one or more transaction function devices to provide an automated banking machine with transaction capabilities that users may perform on a self-service basis. This may include for example, providing devices that can accept bills and/or checks in an area within or below the display surface of the surface computer.

For example in some embodiments a device capable of receiving bills and/or checks through an opening, may be positioned with the opening extending in a wall or other surface vertically below a portion of the display surface. Such a device may be operative to receive bills and checks from a user in some embodiments. Further in other embodiments such a device may be operative to dispense currency bills to users. Further in some embodiments several such devices may be positioned in laterally spaced relation below a generally continuous display surface which extends vertically and horizontally in a plane on or in connection with a wall.

In some example embodiments transactions may be conducted using the principles previously described. A user may move adjacent to the display surface of the surface computer in general alignment with the opening of such a device. Such activity may be facilitated by including an output through the display surface in such an area. Further as discussed previously, some embodiments may provide an output including a customer name or identifier based on a particular area of the display surface being determined by a computer as the transaction resource a customer is to use to conduct a transaction.

In response to the output, the customer may approach the surface computer and provide the inputs required to accomplish a transaction. This may include for example, the customer providing a card input, biometric input, numerical input, password, PIN or code input, mobile device input, or other input of the types previously described which can be used to identify the particular customer and/or that the particular customer is at that location of the surface computer. In some arrangements, the surface computer may provide virtual buttons, a keypad, a keyboard, a dial or other virtual component output through the display surface, which the user can contact, touch and/or manipulate in order to provide identifying or other inputs.

In other embodiments the display surface may include a card reader opening for a card reader. The card reader may be mounted behind the opening. In other embodiments a card reader can be mounted adjacent to the display surface. In other embodiments a contactless card reader may be mounted in or behind the display surface. Of course these approaches are examples Responsive to having determined that the particular customer is at the location at the display surface, one or more computers may be operative to cause the surface computer to provide outputs appropriate for the particular user. This may include a predetermined transaction that the customer has requested through a welcome terminal or mobile device as previously described. Alternatively, the customer may be presented with transaction options through indicia that are output through the display surface. The customer may provide inputs corresponding to data or transaction selections which are operative to indicate the type, characteristics or properties of the transaction which the user wishes to conduct. The inputs from the user are received through the display surface and used through operation of the surface computer or other connected computers to carry out the customer's requested transactions.

For example, if the customer has requested to receive cash, the device located adjacent to the display surface of the surface computer in the area where the customer is standing may operate to cause the cash to be dispensed from the opening. The display surface may operate to indicate to the customer that the cash should be retrieved from the opening below the display surface. This can be done through text outputs, arrows, graphics, or other outputs presented through the display surface. Likewise if the customer is providing a deposit transaction, the customer may be prompted through graphics or other outputs on the display surface to input bills, checks or other accepted items into the opening below the display surface. The items may be received through the opening and processed through operation of the device in a manner like that discussed in the incorporated disclosures.

In example embodiments the customer may also receive other prompts or outputs through the display surface. For example, the surface computer may output a query to the customer as to whether the customer wishes to receive a receipt. In response to an input to the display surface indicating that a receipt is requested, the device positioned in the area where the customer is located may operate to deliver a receipt through the opening. Of course as can be appreciated, other items can be exchanged with the customer and other transactions conducted.

As can be appreciated, in example embodiments the display surface of the surface computer may comprise a relatively large surface with multiple spaced locations at which transaction sessions for multiple transactions by different users can be concurrently conducted. Customers may be selectively directed to such locations in the ways previously discussed, so as to facilitate the carrying out of transactions. Further, transactions that do not require the exchange of tangible materials may be conducted in areas intermediate of the locations and openings in which transaction function devices are located.

It should be understood that various types of transaction function devices may be located below, above, beside, or even within display surfaces. This may include transactions that are carried out by transporting items to and from the user through use of a VAT carrier. This provides the capability for having numerous different configurations and transaction types. Of course these approaches are this approach is an example, and in other embodiments other approaches may be used.

In some example embodiments it may be desirable to enhance security within a banking facility by tailoring the security to the locations of banking employees and customers within the banking facility. In some example embodiments one or more detection devices operative to detect a person entering the banking facility may be used to identify individuals entering or within a banking facility. The person may be detected and/or identified by any previously discussed detection method. In some example embodiments the banking customer or employee may be automatically identified or may be identified when the person presents a banking card to a card reading device.

Alternatively a user may be identified by a token, mobile device, fob, passbook or other article that can be read through operation of a reading device or that emits signals that can be used to identify the particular device and/or customer associated therewith. A security level may be assigned to the banking customer or employee detected entering the bank, through operation of the banking computer system. It should be understood that for purposes of this disclosure a security level corresponds to authorization and ability to access or operate selected data, functions, devices, areas or other things in accordance with rules or limits that are stored or resolved by one or more computers associated with the facility.

In an example embodiment a banking customer or employee may only have access to the resources that correspond to the security level assigned to them. A banking computer system may be operative to activate different banking resources corresponding to each identified banking customer or employee when the banking customer or employee approaches the resource. Some this approach is an example banking resources that may be activated according to the assigned security level of the banking customer or employee are computer terminals, computer databases, self-service terminal, safety deposit boxes, access control devices, drawers, office space, storage areas, meeting rooms, automatic banking machines, teller areas, safety deposit box areas, and vault areas. In some example embodiments one or more computers operate so that only banking resources adjacent to the determined current location of the person or within a small immediately adjacent zone around the person are activated if authorized according to the security level of the person.

The security level may correspond for example, to whether the person is a high value customer, standard customer, new customer, management banking employee, supervisory bank employee, teller, other bank employee, or in another group of people. The level of security of high value customers may provide access to more resources, areas or data than the security level for regular customers; the security level for regular customers may provide greater access than the security level for new customers; the security level for managers may provide greater access than the security level for supervisory bank employees; the security level for supervisory bank employees may provide greater access than the security level for tellers; and the level of security for tellers may provide greater access than the security level for other bank employees.

It should be understood that the category of a particular individual based on the individual's identity as resolved by one or more computers in connection with the system, may provide such individuals with different types of access to resources, devices, areas, data, or other capabilities of the system. It should be understood that for different categories, the nature of the types of activities that can be performed, as well as the extent of authorization to utilize particular aspects of the available capabilities, may be different. Further for purposes of this disclosure, greater access may not necessarily require quantitatively greater capabilities, but only access to different capabilities of the facility, system or data.

In some example embodiments a banking facility may be segmented into a plurality of security zones. Zones may correspond to different areas within the banking facility or to different banking resources. The security zones may include office spaces, teller areas, storage areas, safety deposit box areas, vault areas and public areas. Banking resources that may correspond with a zone include computer terminals, computer databases, account information, safety deposit boxes, drawers and automatic banking machines or other items. Each computer database may include a plurality of sub-databases each with its own security level.

In some example embodiments a bank employee with a higher security level may override a lower security setting on a banking resource that the bank employee needs to access if a person with a lower corresponding security level is in the same security zone.

Figure 8:
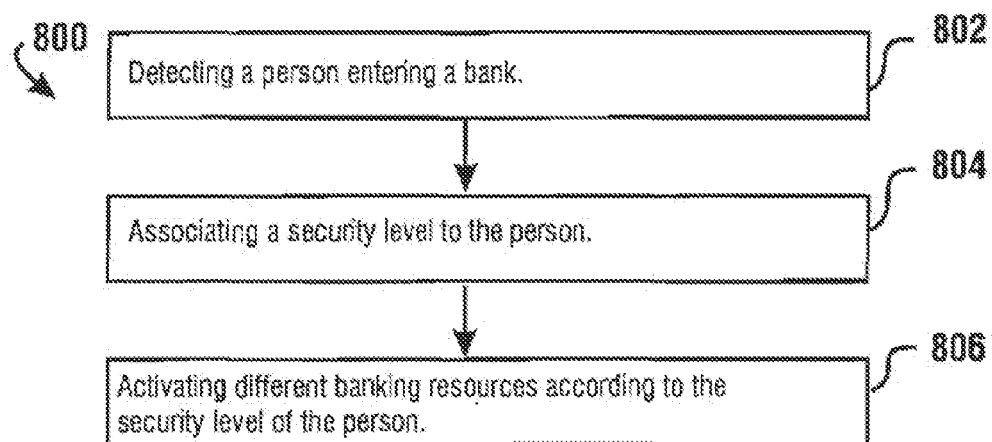
FIG. 8 is a schematic diagram of a method associated with improved banking security using security levels.
Figure 9:
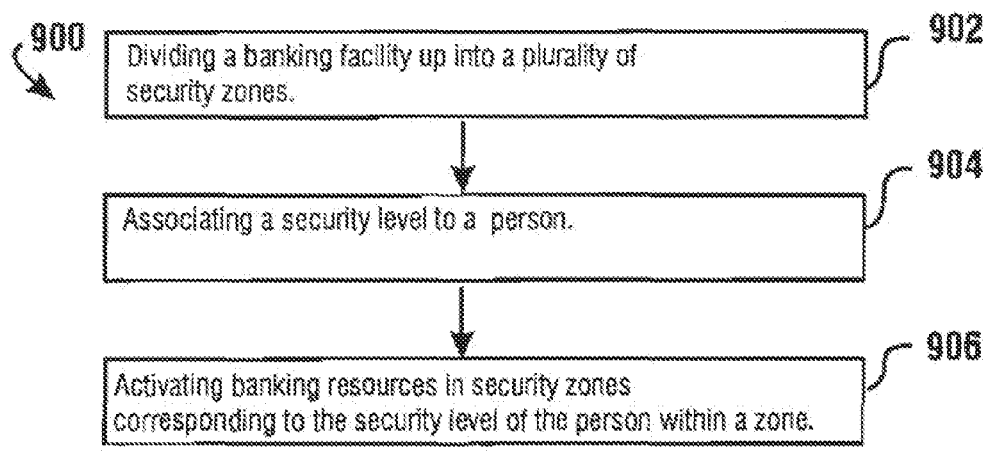
FIG. 9 is a schematic diagram of a method associated with improved banking security using security zones.
Figure 10:
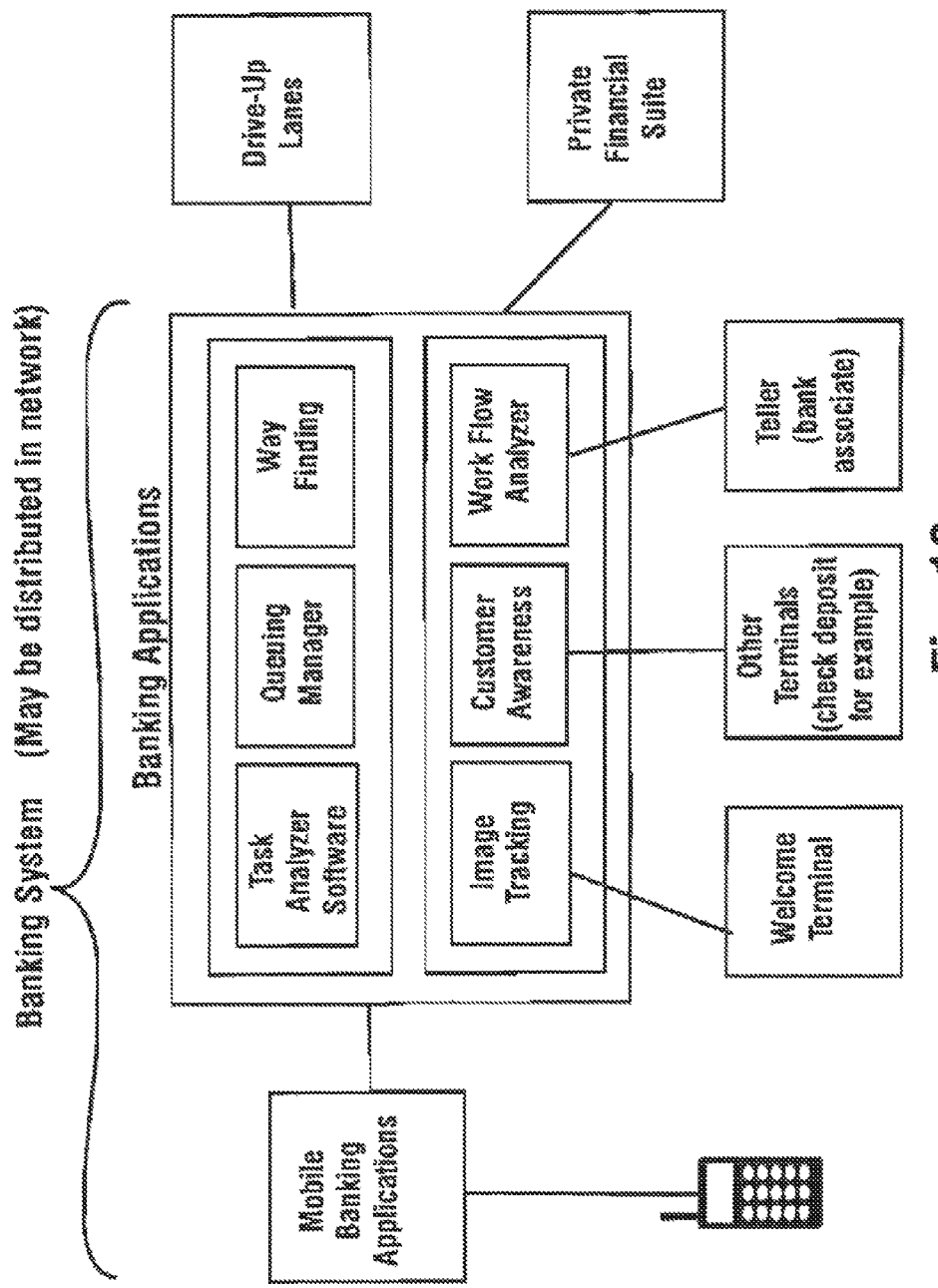
FIG. 10 is a schematic diagram of example software used to improve banking customer transactions.
Figure 11:
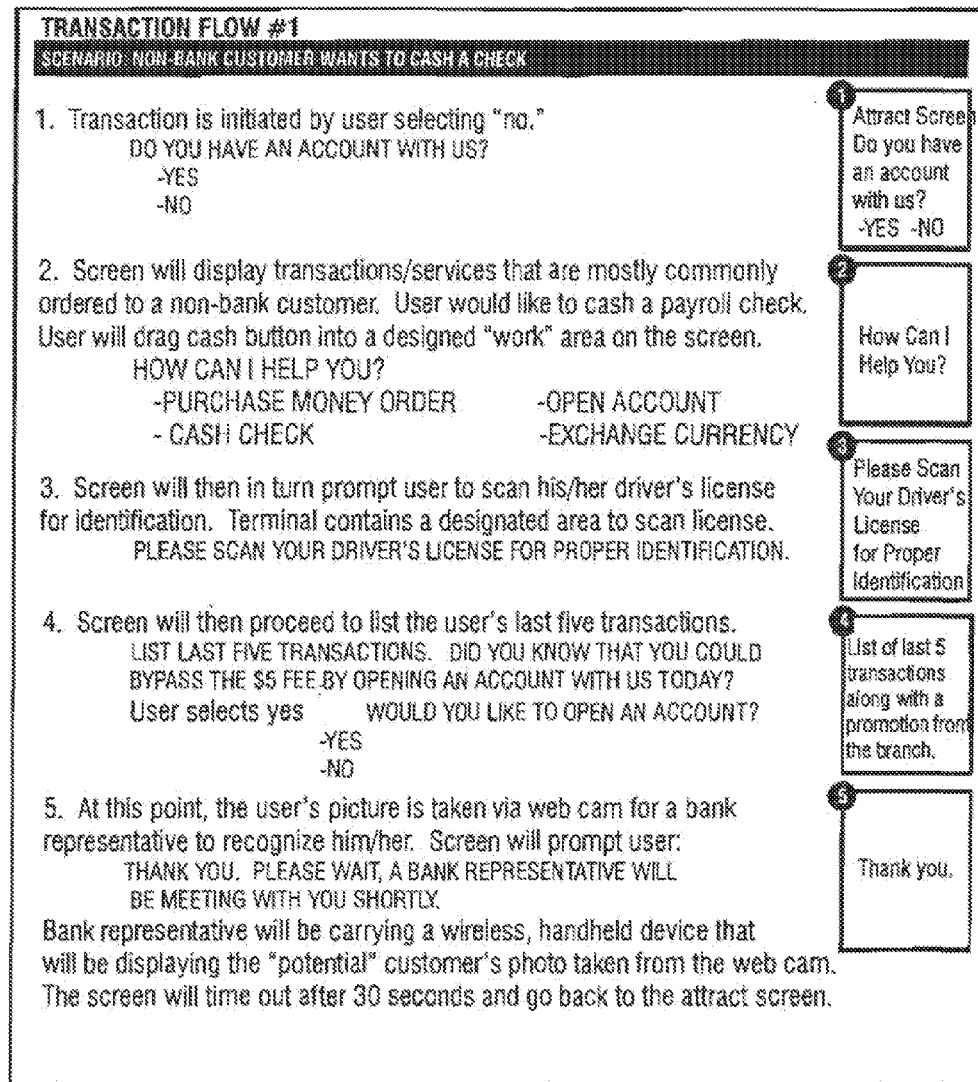
FIG. 11 is a schematic logic flow diagram of an example user interface sequence for a request by a non-banking customer to cash a check.
Figure 12:
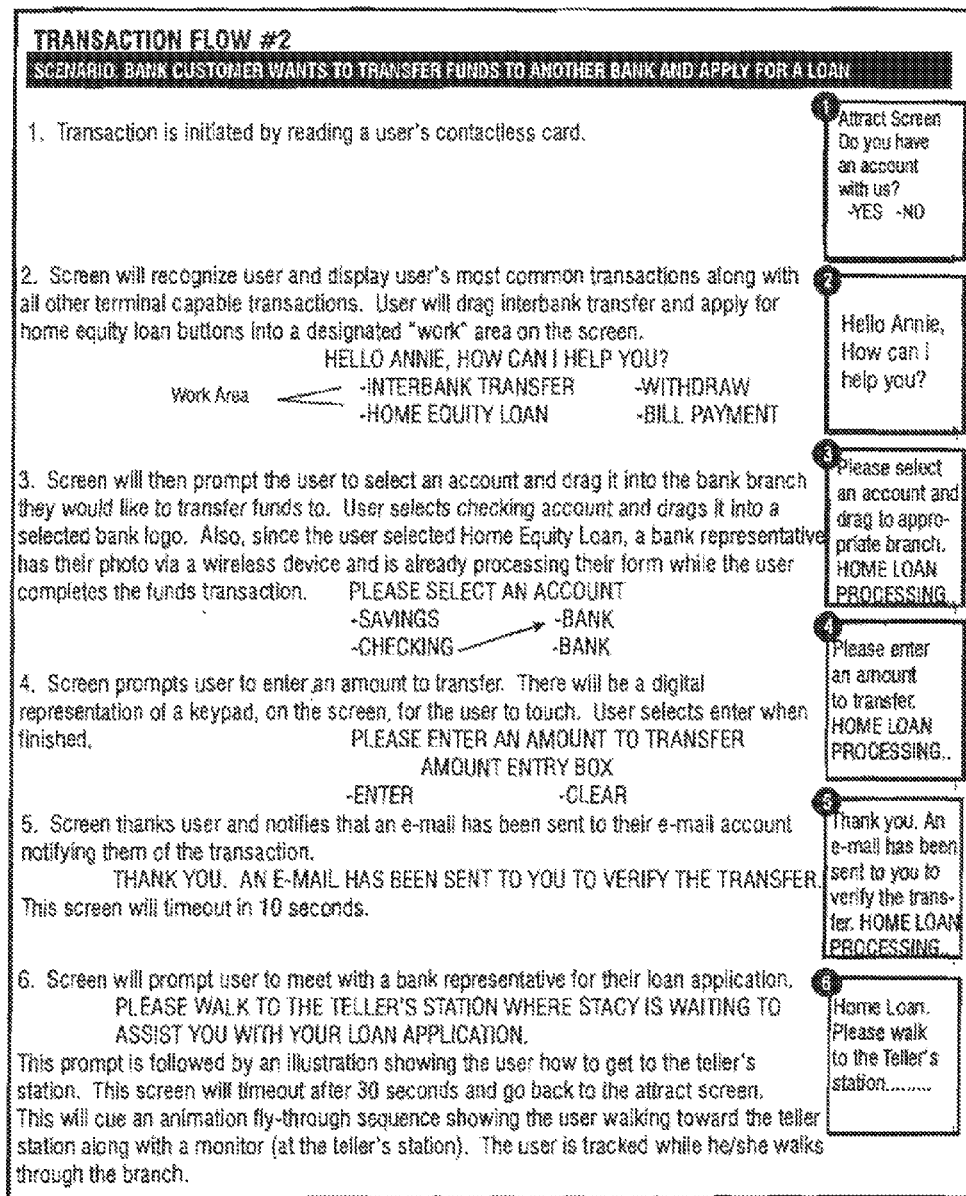
FIG. 12 is a schematic logic flow diagram of an example interface sequence for a request by a banking customer to transfer funds to another bank and apply for a loan.
Figure 13:
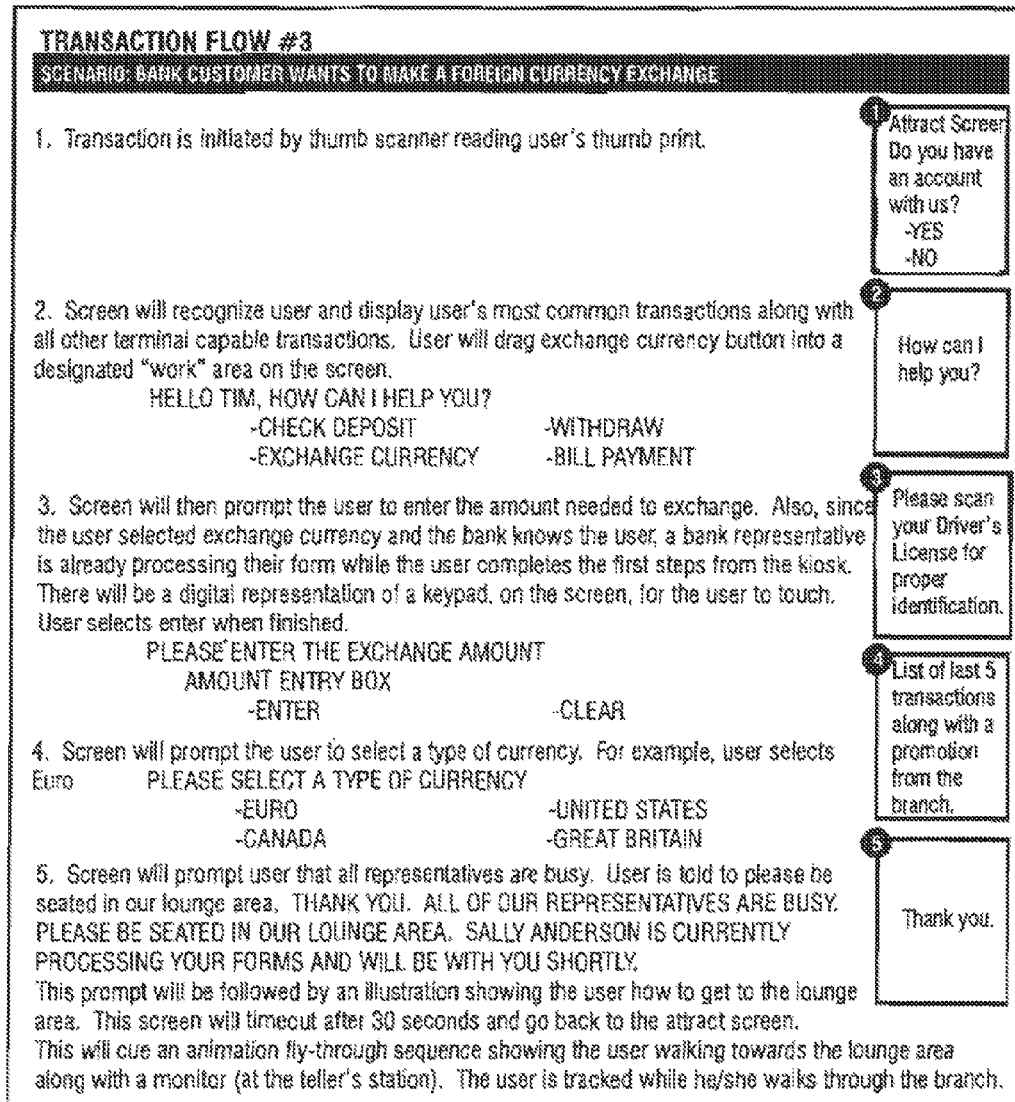
FIG. 13 is a schematic logic flow diagram of an example interface sequence for a request by a banking customer for foreign currency exchange.
Figure 14:
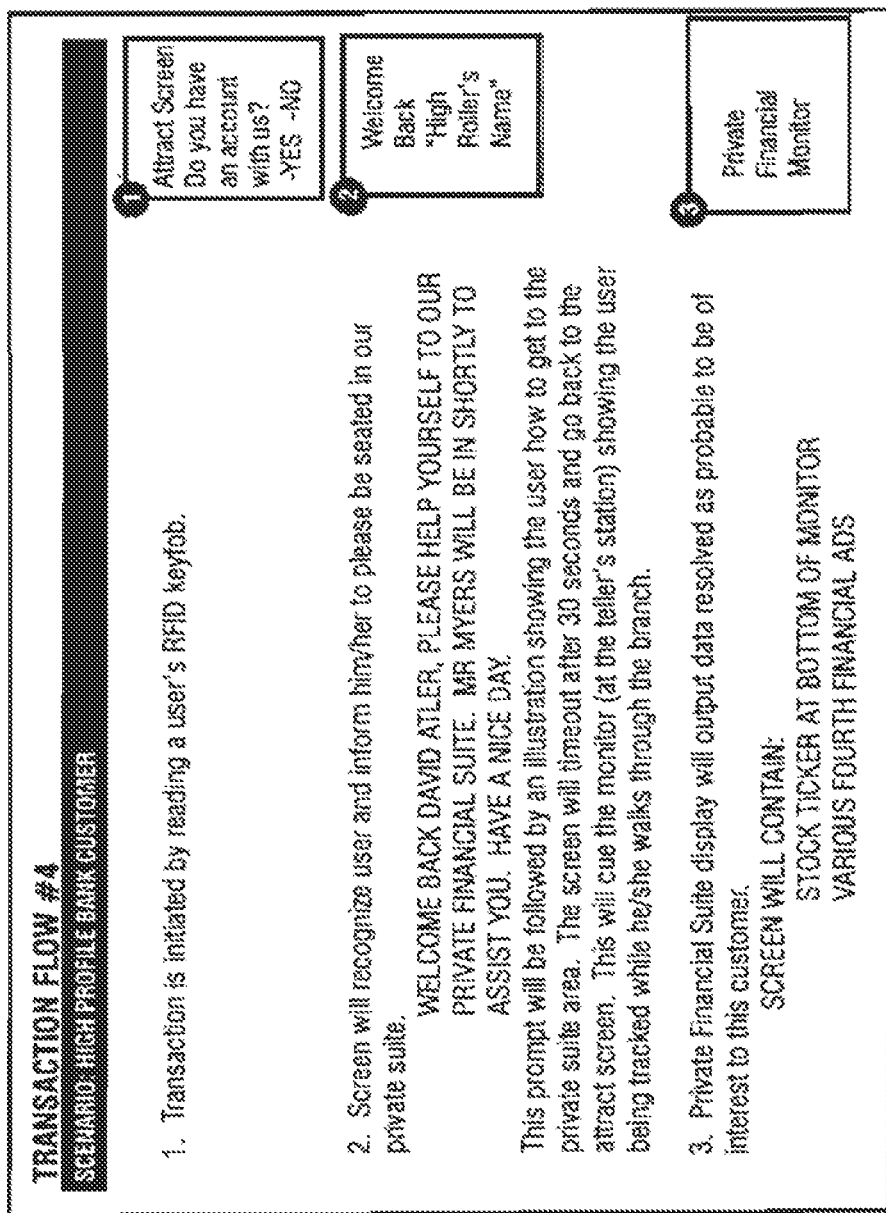
FIG. 14 is a schematic logic flow diagram of an example interface sequence for a request by a high profile banking customer for access to a banking resource.

FIG. 8 schematically represents an example method of improving banking security using security levels associated with a person 800. The method begins at step 802 by detecting a person entering a bank. When a person is detected, that person may also be identified through operation of one or more computers. At step 804 a security level is assigned to the person detected through operation of such computers. Different banking resources corresponding to the level of security assigned to the person detected are activated in step 806. The banking resources activated responsive to such computers may be only the resources right in front of the person, adjacent to the person or within a limited range of the person to which the person's security level authorizes the person to have access. Of course these approaches are examples FIG. 9 schematically represents an example method of improving banking security using security zones 900. The method begins at step 902 by dividing the banking facility through operation of a computer into a plurality of security zones. Zones may correspond to different areas within the banking facility or to different banking resources. In step 904 a security level is assigned to an identified person. In step 906 banking resources within a security zone are activated corresponding to the level of security of a person within that zone.

Through operation of one or more computers, the identified individual may operate to receive access to one or more resources, areas, capabilities, data, functions, or other aspects that may be accessed within the banking facility. Computers may operate to minimize the risk of unauthorized activities through the categorization and security levels that are applied to particular individuals. As can be appreciated, in the example embodiments the capabilities of identifying individuals and of granting them different privileges and access to various resources and capabilities enables the more secure conduct of transactions, as well as the preservation of a more secure environment within the banking facility. Of course it should be understood that these approaches are this approach is an example, and in other embodiments other approaches may be used.

The automated banking machine 760 may include a microphone 42 or microphone 42 array. A microphone array is any number of microphones 42 operating in tandem, such as those produced by Polycom. The microphone array may be within the requirements regarding echo cancellation and noise suppression that may more reliably perform voice recognition and voice commands. In an example embodiment, the video and non-video transactions may function in a similar manner.

In an example embodiment, the customer may identify themselves as they approach the machine either verbally through their phone 764 or verbally to the machine 760. Alternatively, the machine 760 may just pick up on the customer's approach due to an application on the customer's phone 764 that alerts the machine 760 that a customer is approaching. Of course it should be understood that these approaches are this approach is an example, and in other embodiments other approaches may be used.

The customer may tell the video teller or the machine what sort of transaction they want to do, such as verbally stating "I would like to deposit $50 into my savings account and view the balance of my checking account," which would be the same thing that the customer may say if they had walked into the bank itself. If no video teller is present, the transaction may process the same as if the customer had selected the buttons on the machine. If a video teller is present, the application receives the information just as if the video teller selected the various buttons on the machine. The video teller may then talk to the customer while the transaction is being processed and then asks the customer if they need anything else.

Alternatively, if a mobile device or smart phone 764 is in proximity to the machine, instead of fully integrating with an application on the smart phone 764, the application may just be viewed as a microphone and speaker to switch to, the customer may swipe their phone 764, then say what sort of transaction they want to perform into their phone.

This application may provide the same experience at the machine 760 as a customer may experience in a banking facility 200 without having to press any buttons at the machine, which may speed up the processing of transactions at the machine. This may also provide accessibility for those customers with disabilities. In addition, this type of application may also allow the machine to answer more complicated questions just as the banking facility staff may be able to. For example, the customer may ask "If I purchased a $5,000 vehicle what would my monthly payment be for 42 months at my current interest rate?" Or similar types of questions.

Figure 29:
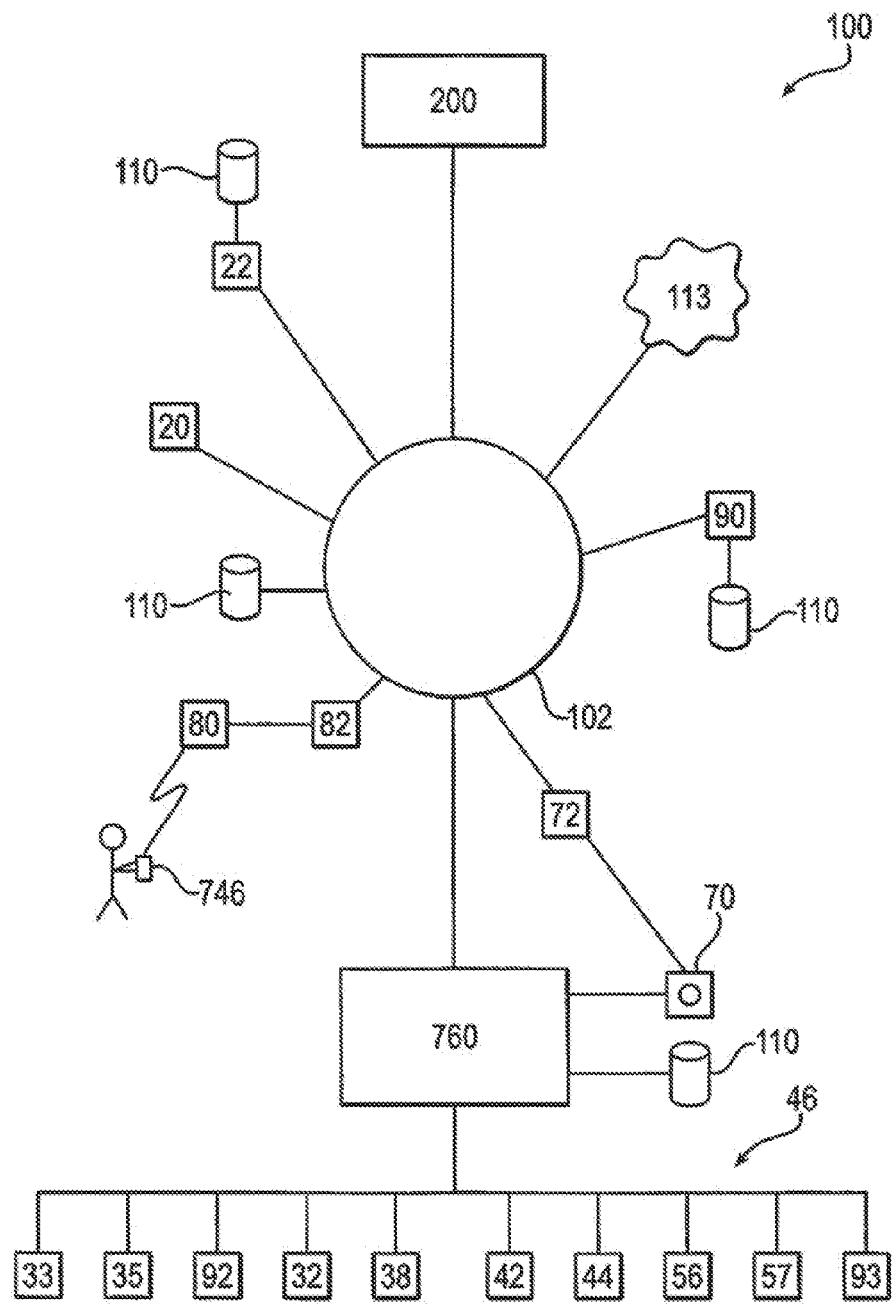
FIG. 29 is an example schematic representation of a computer system used in a banking operation.

The machine may react to a customer's voice commands, either directly to the machine 760, such as into a microphone 42, or the machine may react to a customer's voice commands that may be provided through a smart phone 764, whereby the smart phone 764 may communicate with the machine, such as through an antenna 80 and mobile interface device 82, as illustrated in FIG. 29. Of course it should be understood that these approaches are this approach is an example, and in other embodiments other approaches may be used.

The automated banking machine 760 may include a microphone 42. In one example embodiment, the microphone 42 on the machine 760 may be utilized to analyze any noises that may correspond to the installation of an unauthorized sensing device. This includes evaluating various factors and features adjacent to the machine 760 for purposes of determining if an unauthorized device has been attached or installed on an automated banking machine, such as sensing vibratory properties of the machine in order to detect the installation of an unauthorized device, for example as illustrated in U.S. patent application Ser. No. 13/200,697 filed on Sep. 28, 2011, the disclosure of which is incorporated herein by reference in its entirety. The machine 760 may also utilize the camera 70 to aid in determining if any unauthorized devices may be being installed.

The microphone 42 may be utilized to capture sounds that could be analyzed through operation of a local or remote processor to determine if they correspond to drilling, prying or other unsavory activity. The sound may be recorded through the operation of the automated banking machine processor and then the recorded sounds may be analyzed through the remote systems to determine what the sounds are related to. In addition, the machine microphone 42 related sound analysis system may also be associated with an alarm or alerting system 774. The alarm 774 may correspond to the probable installation of a suspected device.

In another example embodiment, sound analysis for other types of attacks on the machine may also be included. For example, this may include analyzing sounds that might correspond to attempting to access the automated banking machine such as picking a lock, which may provide access to the upper housing. Other sounds that could be analyzed could be sounds that may be associated with someone attempting to install a bill trap or a card trap in the depositor and/or card reader 92. Or just analyzing any other sounds that involve unsavory activity related to the machine, such as scraping, prying, hammering and the like. Of course it should be understood that these approaches are this approach is an example, and in other embodiments other approaches may be used.

Example embodiments also include a financial transaction arrangement in which a service provider's terminal (or station) is in operative connection with a customer's terminal. The operative connection permits the service provider (e.g., a bank teller) to view the same transaction information as the customer. For example, the service provider may view (through their touch screen) the same transaction screen that is currently being displayed through the customer's touch screen. The communication arrangement can include a system like those described in U.S. patent application Ser. No. 11/360,008 filed Feb. 21, 2006, the disclosure of which is herein incorporated by reference in its entirety.

The operative connection between the service provider's touch screen and the customer's touch screen also allows the service provider to make markings on their touch screen which get displayed through the customer's touch screen. That is, with the same transaction screen being simultaneously displayed to the teller and the customer, the teller can mark on their display to cause the mark to be displayed on both touch screens. For example, the teller can touch their touch screen to create a marking (or drawing) that circles the "I accept" button being output in the common transaction screen being displayed on the teller's touch screen. The creation of this marking made by touching the teller's touch screen also causes this same display marking to be displayed on the customer's touch screen. While a marking is being drawn it can be simultaneously displayed on both touch screens. That is, a marking being made through one screen can be displayed in real time on the other screen.

In an example arrangement, a marking can be produced by the teller sliding or dragging a user finger while it remains in contact with the touch screen, from a first location on the touch screen to a second location on the touch screen. A marking can comprise an outline of a path that follows the movement of a finger placed in contact with the touch screen and then is slid while it remains in contact with the touch screen. The marking created will correspond to the path taken by the teller's finger. That is, the marking generated will follow the course of (trace) the screen-contacting finger (or other screen writing tool). Likewise, a marking made through the customer's touch screen is also displayed on the teller's touch screen. That is, a customer can produce markings that the teller can see.

The service provider's terminal and the customer's terminal both include application software that allows their touch screens to communicate with each other over a network. The touch screen may be part of various forms of terminals or computers, including for example, a laptop, surface computer, desktop computer, embedded computer, self-service terminal, automated banking machine, iPad, tablet, smart phone, a handheld portable device, or other device operative to run applications useful in communicating display screen overlays. A marking can be created using display screen overlay software. The application software causes the same screen overlay that is created by the teller touching the teller's touch screen, to be reproduced through the customer's touch screen, and vice versa.

The service provider can be local or remote relative to the customer. For example, a local service provider may comprise a bank teller (or other bank employee) in a bank building, where the teller is assisting a customer in the same bank building. In contrast, a remote service provider may be located in one building while the customer is in another building. A remote service provider may even be located in a different country.

The service provider can provide inputs through the customer's touch screen to guide the customer through a transaction. The communication arrangement link between the service provider's touch screen and the customer's touch screen permits the service provider to electronically point to specific locations on the customer's touch screen. For example, the service provider may control a virtual pointer which is movably displayed on the customer's touch screen to point out banking options or information. Such a pointer may also be used to show a customer which input devices to press to engage a particular transaction function. These customer input devices can be physical function buttons that are located adjacent to a customer screen's side. Such input devices can also be virtual buttons or icons that are displayed through the customer's touch screen.

In another example, the service provider may use a type of teleprompter which enables the customer to view an arrow on the customer's touch screen. Besides the touch screen, the service provider station may also include input devices such as a touch pad and mouse that enable the service provider to move indicators such as a pointer, highlighter, or icons on the customer's display screen. In this way a service provider is able to indicate to the customer particular features or items as appropriate in connection with the display currently being output on the customer's display screen. The example arrangement allows a service provider to better assist a customer in understanding exactly which button or key to operate, or which section of the customer's touch screen to touch to achieve the desired effect.

An example arrangement allows the service provider to physically contact their touch display screen to provide (e.g., draw) hand written notes, comments, marks, and/or symbols which get displayed through both the service provider's touch screen and the customer's touch screen. The service provider also has options for turning their (and the customers') multi-displayed drawing feature on and off.

The service provider can create a marking by contacting their touch screen with their finger(s) or with some other hand drawing/writing implement. For example, such implement can comprise an electronic pen, teleprompter, finger pad, or mouse.

Figure 15:
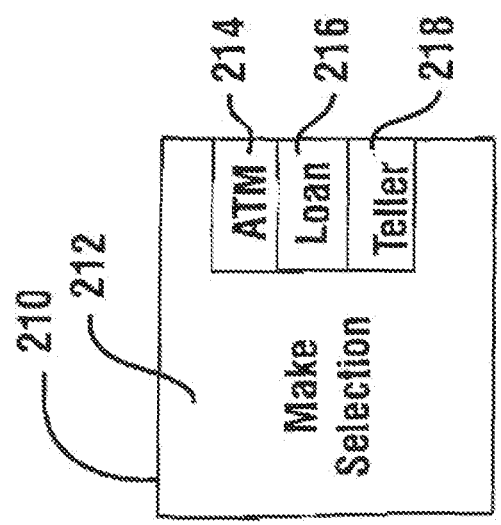
FIG. 15 shows a front view of a customer touch screen.

FIG. 15 shows a customer's touch screen 210 that is part of a customer station (or terminal) which can also have a computer and other components/devices. As previously discussed, the screen has a display area which can output information that allows a customer to carry out a desired transaction or other banking function. In the example shown, the screen 210 presents an output 212 that includes a (make selection) message and virtual buttons (function keys) for selecting a function involving any of an ATM 214, a loan 216, or a teller 218.

A customer can touch the corresponding key to select the transaction function desired. Touching the ATM key 214 correspond to a customer selection that causes the customer station to function as an automated banking machine, which can include a user data reader (e.g., card reader, biometric reader), cash dispenser, check acceptor, an/or a deposit acceptor. Touching the loan key 216 presents the customer with a series of screen outputs for filling out a loan application request. Touching the teller key 218 connects the customer with a teller. The teller key 218 may be shown in every screen output so the customer can always contact the teller for assistance. It should be understood that many other buttons and screen displays can be presented to a customer. The displays output through the customer screen 210 are determined and controlled by corresponding computer programming.

Figure 16:
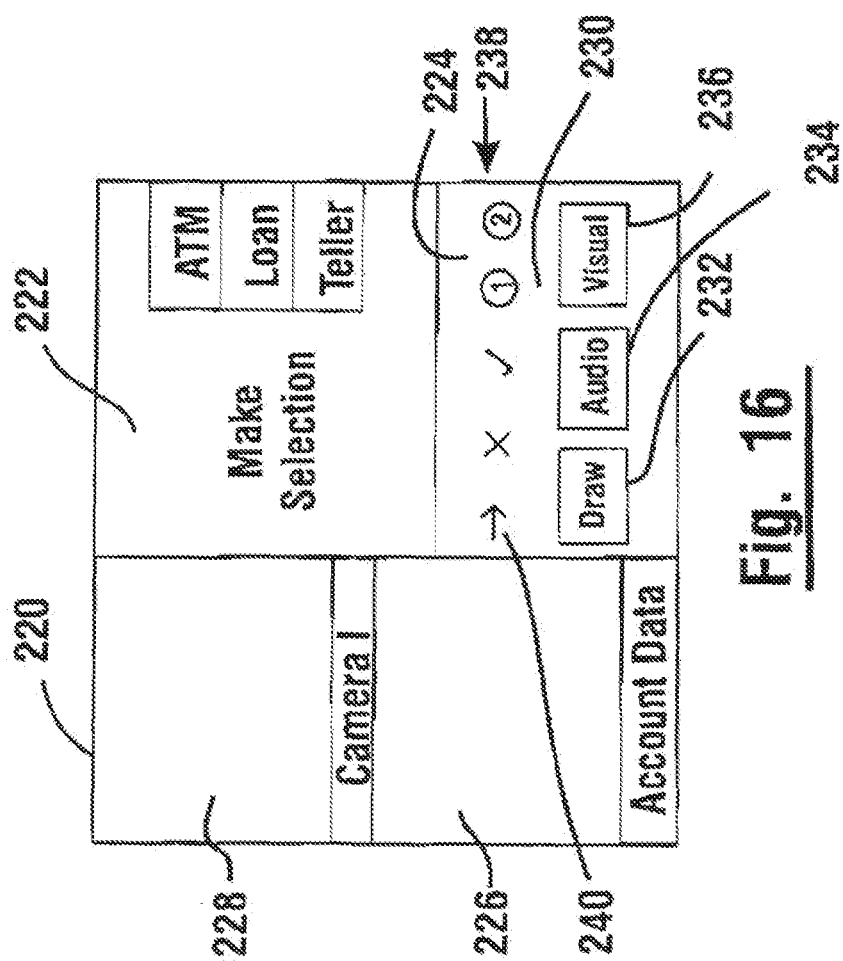
FIG. 16 shows a front view of a service provider touch screen.

FIG. 16 shows a service provider's touch screen 220. The provider's touch screen 220 can be physically larger (with a larger display surface) than the customer touch screen 210. The extra area of the service provider's display surface can include information usable by the service provider to assist the customer in performing a banking function. This information can include data which the customer cannot see.

The provider screen 220 can simultaneously output several different displays in respective different areas (or portions) of the display surface. For example, a first display area 222 can display the identical customer screen output 212 that is being displayed (as shown in FIG. 15) through the customer's display screen 210. A second display area 224 can provide visual tools 230 which the provider can use in assisting the customer. A third display area 226 can output customer account data. A fourth display area 228 can output real time images of the customer, which are captured by a camera near the customer station.

The on-screen visual tools 230 can include (for example) predetermined icons, symbols (e.g., arrows), words (e.g., instructions), thumb nails, and/or images. The example work tools shown include selectable symbols 238 for an arrow, "X", check mark, and the numerals one and two. The example work tools also include virtual buttons for selection of draw, audio, and visual. Touching the draw button 232 allows the service provider to manually mark on the screen, which in turn (as previously discussed) causes the generated mark to be displayed on both touch screens. The audio button 234 places the provider in audio communication with the customer. The visual button 236 allows the provider to view the customer in the display area 228.

The service provider can touch their screen 220 to drag and drop a symbol from the display (work) area 224 onto the display area 222 that shows the reproduction of the customer's screen output. For example, the service provider can move (e.g., using a finger, a mouse, etc.) the visual arrow 240 (or a shadow copy thereof) to an exact location on the customer screen output 212 shown in the display area 222. This movement causes a copy of the arrow 240 to visibly remain at that specific location on both the reproduced customer screen output 222 and the actual customer screen output 212. The finger-sliding drag and drop feature also allows the arrow 240 (or a different visual symbol) to be rotated so it can be pointed in a specific direction (or orientation) at a particular item (e.g., a virtual button) being displayed in the customer's screen output 212.

An example arrangement involving a local service provider will now be discussed. A customer enters a bank and proceeds to a self-service transaction machine (e.g., customer terminal, customer station, automated banking machine, etc.), which includes a touch screen and audio/video devices. The machine has the bank's customer assistance application operating thereon. While using the machine to perform a transaction the customer provides input to the machine that requests assistance.

The bank's customer communication network places the machine in contact with an available bank employee (e.g., a bank teller) who is located in the bank. This enables the bank employee to view on the touch screen of their terminal, the same screen output that is being displayed through the machine's touch screen. The network also places the bank employee and customer in real time audio and visual communication with each other via the terminal and machine. The bank employee can converse with the customer to determine the type of assistance desired.

The bank employee can assist the customer such as by contacting their touch screen with their finger in pointing to a specific area of the screen output. This contacting causes a marking to be produced and displayed on both the bank employee's touch screen and the machine's touch screen. The marking produced corresponds to (matches) the movement of the bank employee's finger while it was contacting the touch screen. As previously discussed, the marking can be an indication that informs the customer or designates a particular area of the customer's screen, including markings of an arrow, circle, rectangle, asterisk, letter "X", number(s), character(s), underline, note, highlight, etc.

In some example embodiments, the terminal may have the ability to have documents filled out and executed using the terminal. The display may provide for a split screen where a teller may be present on one side and a form may be present on the other side. The user may then complete the form with the help of the teller by touching the screen. The user may also sign the form in a manner such as previously discussed, by the movement of their finger over the screen or by agreeing that their image as taken by a camera or other input constitutes their designated signature on the form. Features may be used as disclosed in U.S. patent application Ser. No. 13/135,143 filed Jun. 27, 2011 the disclosure of which is incorporated herein by reference in its entirety. Alternatively, instead of completing the documents at the terminal, the documents from the terminal may be loaded onto the mobile device of the user, whereby the user could then transport the documents home to be completed at their convenience, such as on their mobile device.

The teller may be located at a remote location and may be able to handle several different land based terminal locations. The teller may be a live human being or a computer generated teller. The terminal may include a help button. For example, if a customer initiates a banking transaction on their own, but during the transaction finds that they need assistance completing the transaction, the user may push a help button and a video feed of a live teller may come on the display screen to assist the user in completing their banking transaction at the terminal. As an alternative, the user could just opt to have a live teller assist them through the entire banking transaction from start to finish immediately upon walking up to the terminal.

The use of a live teller being presented via a video or a virtual teller may provide additional services to customers up to twenty-four hours a day, thereby giving banking customers the benefit of a teller during non-traditional banking hours. The customer may have a live or virtual teller assist them in any desired kind of banking transaction, such as withdrawing or depositing money, transferring money between accounts, issuing money orders, depositing checks, filling out a loan application, and the like.

In some example embodiments, the terminal may include voice response systems. These systems may be interactive or automated and may be utilized to help guide customers through various transactions. For example, the terminal may respond to voice commands from the customer as well as audibly respond back to the customer, whereby the entire transaction may take place verbally without any physical interaction required on the part of the customer, such as pushing buttons or touching the touch screen. Responsive to listening to the customer, one or more computers may be operative to cause the terminal to provide outputs appropriate to assist the user through the desired transaction.

An this approach is an example arrangement involving a remote service provider will now be discussed. Instead of the service provider being a bank teller who is located in the same bank as the customer (as discussed above in the local service provider arrangement), the service provider is remotely located from the customer. For example, the service provider and the customer may be located in different cities. The customer can still use a self-service transaction machine (e.g., customer terminal, customer station, automated banking machine, etc.), which includes a touch screen and audio/video devices. However, the machine is not limited to being located inside of a bank building. The machine has a customer assistance software application operating thereon.

A communication network (which may include the Internet) allows the customer to place the machine in communication with the service provider's station. This enables the service provider to view on their touch screen the same screen content that is being output through the machine's touch screen. The service provider can provide assistance by contactingly engaging their touch screen to cause a corresponding marking to be displayed on the machine's touch screen. Likewise, the customer can contactingly engage their touch screen to cause a marking (e.g., a question mark) to be displayed on the service provider's touch screen. Audio (microphone/speaker) and visual (camera/display) communications are also available.

Another this approach is an example arrangement involving a remote service provider will now be discussed. Instead of the customer using a self-service transaction machine (as discussed above in the prior remote service provider arrangement), the customer uses a personal portable computing device, which has a display screen. For purposes of this example, a smart phone will be used. However, as discussed previously, it should be understood that many other types of personal portable computing devices can be used.

The phone has the customer assistance application thereon. The customer can be a client of a transaction assistance service that is affiliated with the application. The service offers live human assistance to carry out financial transactions. The transactions may involve banking, stock trading, investing, gambling, etc. A financial institution (e.g., bank, brokerage, casino) may provide the service for free to a customer who is considered to be a VIP (very important person) by that institution. Alternatively, a customer may be required to pay a fee for the transaction assistance service.

While the customer is using their phone to carry out a remote banking transaction, assistance with the transaction is needed from the service. The customer uses the customer assistance application to access the service's communication network. This access allows the customer to communicate with a live service provider. This access also allows the service provider's touch screen to be linked with the phone's display screen. The service provider can view through their display touch screen the same transaction information that is being output through the phone's display screen.

In a manner previously discussed, the service provider can provide assistance to the customer by manually slidingly engaging their touch screen to cause a corresponding sliding marking to be output through the phone's display screen. Furthermore, the phone screen may be a touch screen, enabling the customer to cause similar markings to be generated and displayed through the service provider's touch screen.

Both the service provider terminal and the customer terminal can include more than one display screen. The example arrangement also permits visual and audio communication between the service provider and the customer. The service provider and the customer can view each other through a respective display screen. For example, a touch screen can be used that allows a PIP (picture in picture) type of display.

The example arrangement enhances customer service because it allows the service provider to view the same transaction information (e.g., same display screen output) that the customer is currently viewing. This arrangement can reduce average time used by a teller in assisting a customer to carry out a banking function.

The automated banking machine 760 may include the option for a teller 22, such as a teller located remotely from the automated banking machine 760, to take control of the transaction to assist the customer with their transaction. As described above and illustrated in FIG. 1, the teller or remote teller 22 may comprise a thin client software architecture in operative connection with a server running applications requested by the remote teller terminal 22. The remote teller terminal 22 may comprise a computer operative to run some applications locally therein while accessing other applications that are run remotely on another computer such as a server 90. As illustrated in FIGS. 1 and 29, in the example system 100, one or more banking computers 20 may be operatively connected to the network 102. Of course it should be understood that these approaches are this approach is an example, and in other embodiments other approaches may be used. An application may reside on the machine 760 that may include an option for a "help" input or speak to a teller button 812 on a touch screen 784 of the display 44. Alternatively, the same help button 812 or a separate help button may provide this input that could cause the application to send an e-mail message or other message to the remote service center or remote teller terminal 22, which may identify the particular terminal 760 at which the user was requesting assistance.

In an example embodiment, the machine 760 may be operating PC remote control software, such as PC Anywhere, or any other similar type of product like Axeda, GoToMyPC, TightVNC, VNC, Remote Desktop Connection and TeamViewer. The PC Anywhere or Axeda type software located on the machine 760 may then provide the remote service provider 22 with information about the current status of all of the devices in the machine. The PC remote control software may also provide information concerning the machine's current state. For example, this may include whether any of the devices in the machine were indicating a malfunction condition, whether any of the software in the machine was indicating an abnormal state, and also in general the state (particular transaction condition) of the software on the machine. Of course it should be understood that these approaches are this approach is an example, and in other embodiments other approaches may be used.

The remote service provider may see this information graphically represented on a display 220 at the remote service provider's station 22. For example, the customer may initiate that an e-mail message be sent to the remote service provider's station 22 in response to a service provider inquiry information on status, state, etc. being sent to the remote computer associated with the service provider, and this may be output in a manner that is visible to a service provider, such as illustrated in FIG. 16.

Once the service provider has the information about the machine 760 in front of them, the user may then establish the remote video and audio communications link to the machine. In this way, the teller's face may appear on a screen or on a portion of the screen 789, and the teller's voice may come out of the speakers 38 located on or adjacent to the automated banking machine 760, as illustrated in FIG. 31.

Figure 30:
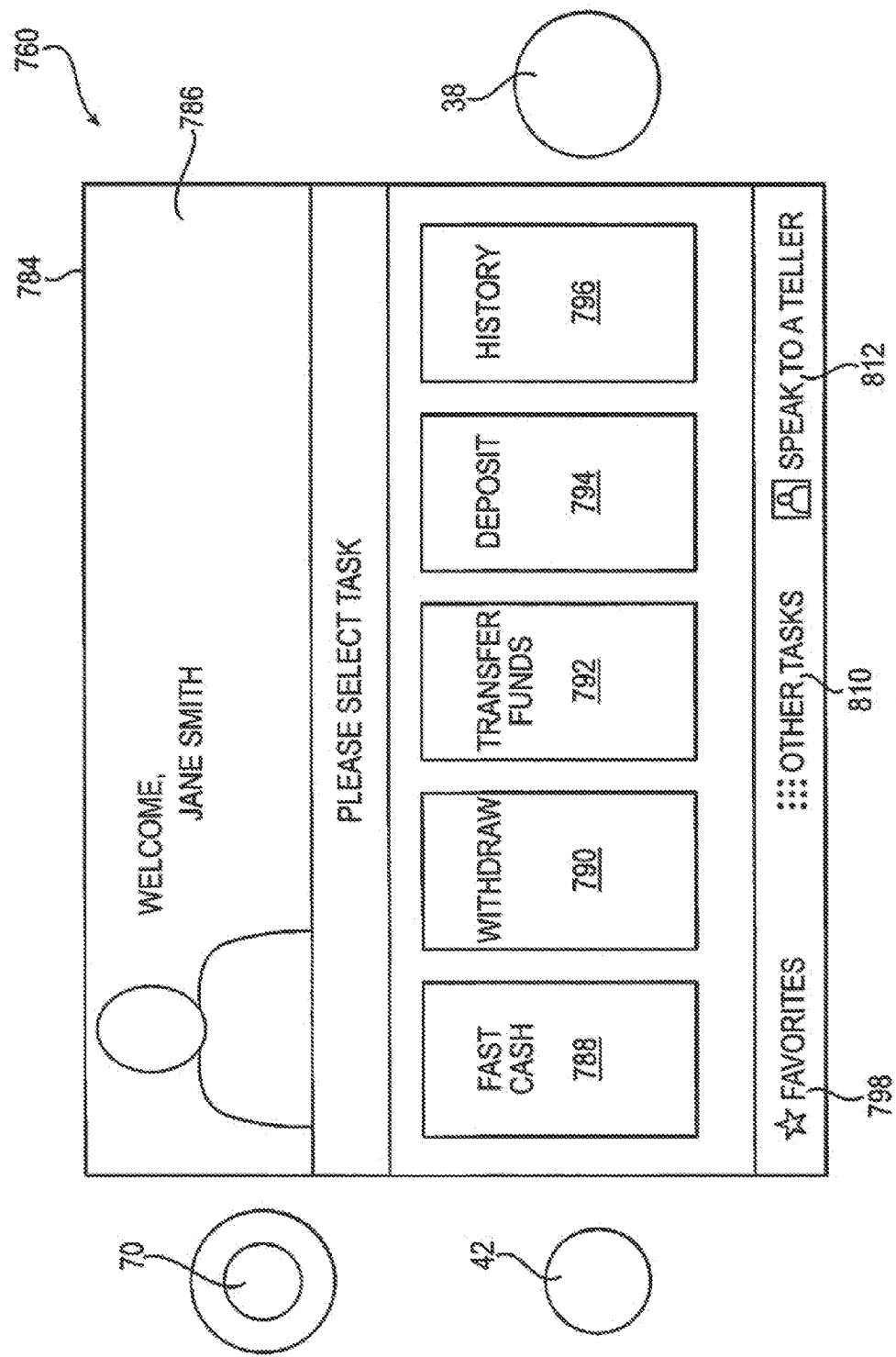
FIG. 30 shows a front view of a transaction screen of an automated banking machine.
Figure 31:
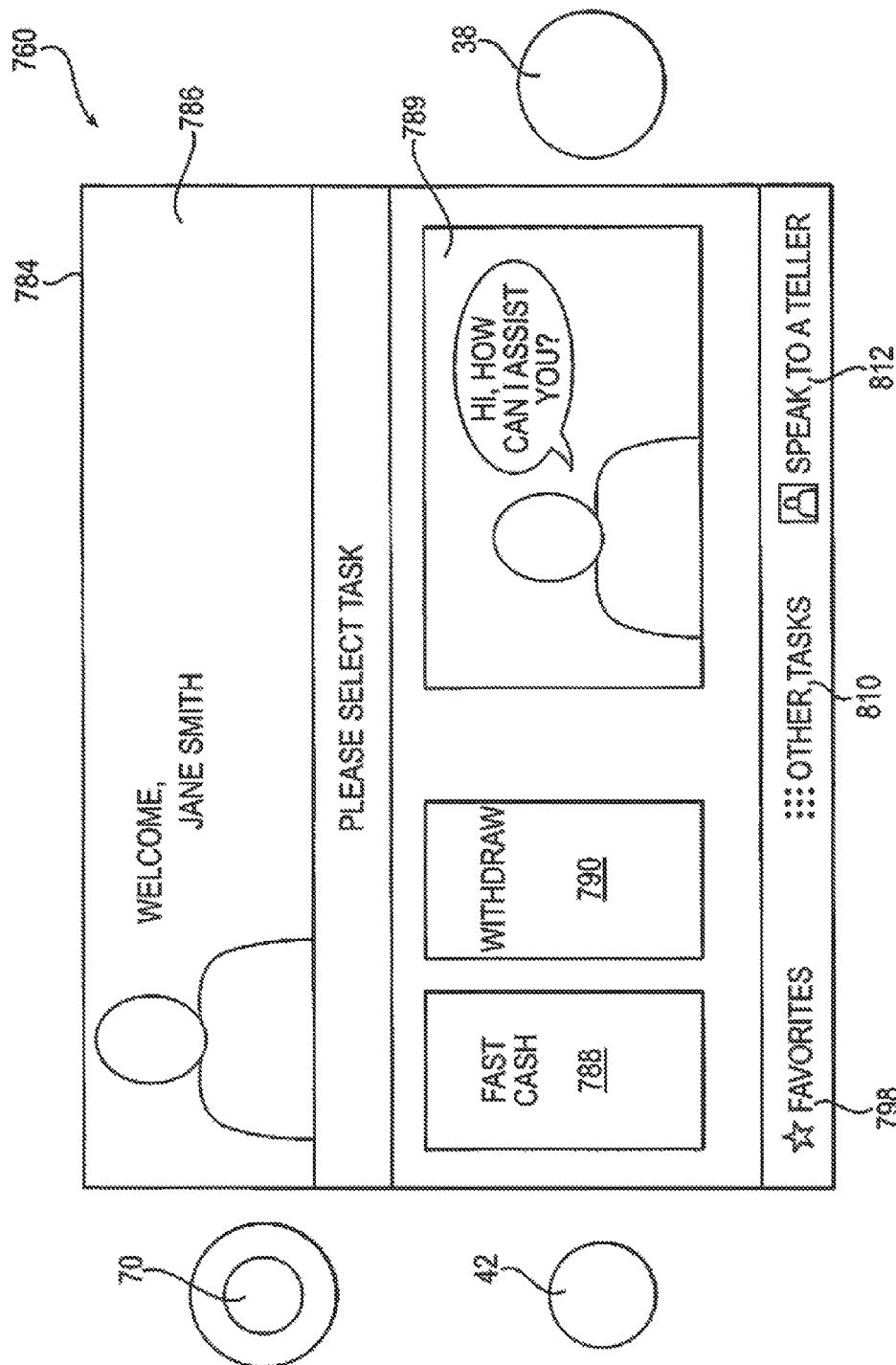
FIG. 31 shows a front view of a transaction screen of an automated banking machine.

Likewise, the teller would be able to see the user and hear the user through a microphone 42 located on or adjacent to the automated banking machine 760, as shown in FIGS. 30 and 31. Based on the user's conversation with the teller and the teller's ability to verify the status of the devices, such as the output devices 46, for example corresponding to a malfunction, the service provider could then utilize the PC Anywhere functionality from the remote computer 20 at the service provider station 22 to operate the devices as needed.

Operating the devices 46 remotely could remedy the condition. This may include, for example, cycling the devices that have a problem to clear a jam. Alternatively, if the service provider cannot clear the jam through remote operation, or the jam is such that remote operation of the particular device is not sufficient (or making software changes, such as resetting a condition that is causing a software fault) cannot correct the problem, and then the remote service provider could take steps to provide alternative solutions. Of course it should be understood that these approaches are this approach is an example, and in other embodiments other approaches may be used. The machine 760 may be operated to print a particular document that may include codes or other data. Codes or other data may provide the information that would allow another teller, or another machine, to verify that the printed document is genuine, and may also indicate what needs to be done in order to fulfill the transaction that the person was trying to conduct when the automated banking machine malfunctioned. This may include for example, dispensing cash to the user, crediting the user's account for cash or a check that they were depositing, providing the user with a money order, or doing other things. The record that is produced would include indicia that are encoded and readable by humans and/or by a machine in order to complete the transaction.

The machine user may then take this coded record to another machine 760 and have the transaction fulfilled. This fulfillment may involve the user provider some form of identification, such as a bank card, driver's license, biometric input, and the like, that may correspond with the data that was included on the record, and/or that would also be included in the data store 110 at the bank operating the automated banking machine. This data would enable the machine to provide the data and the bank system 100 to recover data included in one or more data stores 110 that indicates that this particular user has an unfulfilled transaction.

Other indicia that may be included on the record could be read through a document analysis device 93. The document analysis device 93 may be of any appropriate type of device, such as that illustrated in U.S. Pat. No. 8,141,774 which discloses cashing checks based on a user identifying themselves via a driver's license. The disclosure of U.S. Pat. No. 8,141,774 issued on Mar. 27, 2012 is hereby incorporated by reference in its entirety. The analysis device may read the indicia off of the record that was printed by the other machine. The document analysis device 93 may also be a device that may be used to analyze data on checks and/or currency bills.

The information from the record may then be interpreted and messages may be sent by the machine 760 to the remote computer 20 that may compare the indicia, which may correspond to what is required to fulfill the transaction, such as corresponding to data stored in one or more data stores 110. If the fulfillment data is appropriate for the particular user and corresponds to what is on the record, the remote computer 20 may then send the appropriate messages to the automated banking machine 760 to cause the fulfillment of the transaction, providing the user with the particular things, such as dispensing cash or crediting the user's account, and the like, that they should have received in the original transaction. Of course it should be understood that these approaches are this approach is an example, and in other embodiments other approaches may be used.

In some embodiments, the receipt of a fulfillment request may necessarily result in notification to a human service provider, such as a remote teller 22, who observes and/or controls the operation of the devices to avoid any fraud in connection with the completion of the transaction. Alternatively, a system 100 of this type may enable the machine 760 to complete the fulfillment automatically, provided that the data from the record and the data in the bank's database 110 regarding what is required for fulfillment of the transaction correspond to one another.

In addition, another aspect of this approach may be that if part of the automated banking machine 760 has malfunctioned in a way that cannot be easily fixed, the remote service provider 22 may use the remote control software and an appropriate interface to make any appropriate number of changes at the machine so as to allow the automated banking machine 760 to continue operating with limited functionality. This may include, for example, disabling certain software routines in the machine application that are associated with functions that can no longer be performed due to those devices 46 being broken.

Alternatively, the remote service provider may initiate screen changes concerning outputs from the display 44. These screen changes may be operative to indicate to a user approaching the machine 760 that particular transactions cannot be performed using this machine at the present time. In addition, the service provider from their service provider terminal 22 may send data corresponding to different software and different screens 786 down to the terminal 760 that causes machine operation in ways that do not involve the devices that have currently malfunctioned. This might be done in any appropriate manner, such as those disclosed in U.S. patent application Ser. No. 12/844,377 filed Jul. 27, 2010 and/or Ser. No. 12/931,266 filed Jan. 27, 2011, the disclosures of each of which are incorporated herein by reference in their entirety.

The remote service provider 22 may use his input devices and remote computer 20 to download new states and screens or new programs that may control the machine operation and send new display data 786 to the terminal to address the malfunction. The information provided by the remote service provider 22 to achieve fulfillment of the user's transaction may also be utilized by the remote computer to determine a different set of screens 786 and software for the particular machine, and automatically cause these screens to be sent down to the machine 760 so that the machine 760 may continue to operate using that software and those screen outputs until the machine 760 is restored to full service.

It is to be understood that in different embodiments the downloading may be in the nature of completely new software routines. Alternatively, the downloading may be in the nature of configuration changes, such as is disclosed in U.S. Pat. No. 8,123,120, the disclosure of which is incorporated herein by reference in its entirety. Downloading configuration data may generally involve downloading code and some markup language documents that may essentially establish relationships between the various functions of the devices so that the transaction flow may be modified. Of course it should be understood that these approaches are this approach is an example, and in other embodiments other approaches may be used.

Another aspect of this embodiment may be that once the machine 760 has been repaired, the original configuration settings and software may be restored on the machine. This may be done in any appropriate manner. For example, the original terminal software and configuration settings may be stored in a partition on the hard drive of the automated banking machine, which is disclosed in U.S. patent application Ser. No. 13/335,017 filed on Dec. 22, 2011 and/or Ser. No. 13/134,592 filed on Jun. 10, 2011, the disclosures of each of which are incorporated herein by reference in their entirety. These cases disclose how the automated banking machine may store its last software load in a separate partition for the purposes of recovery.

At the completion of the servicing operations, the servicer may then provide inputs that may cause the restoration of the stored last software and configuration data, which would return the machine to full service based on data stored 110 at the machine 760. Alternatively or in addition, the servicer may also provide one or more inputs that may cause a message to be sent to a remote computer 20. The remote computer may then recover the software and configuration data and download appropriate configuration data and software to the machine that corresponds to what was in place on the machine, such as the original software load, before the malfunction occurred so that the machine may now be in operational condition.

There are many additional functions and transaction types that may be carried out with the assistance of a remote teller or other service provider such as transactions that are carried out through a video connection 789 with the remote teller. Many teller transactions may be automated through operation of an automated banking machine 760. An example includes cash withdrawal requests that are larger than is authorized through automated systems. For example, many banks have established policies that they will not authorize daily cash withdrawals from automated banking machines greater than a threshold. Typically if a customer wanted to make a withdrawal from their account for an amount at least as great as the threshold, the customer would be required to enter the banking facility and carry out the transaction with a live teller. In some example embodiments hereinafter discussed, the customer may be authorized to carry out such transactions at the machine.

In an this approach is an example arrangement the remote teller may become involved in transactions only where necessary and as briefly as possible. This will maximize the benefits of the involvement of the remote teller who communicates with the customer at the machine via two-way audio and video to only those situations where their assistance is needed. However, in this approach is an example arrangements if a customer at an automated banking machine requests teller involvement, the remote teller may provide assistance for multiple transaction steps or multiple transactions being carried out by the customer.

In the example arrangement additional capabilities for operation of automated banking machines may be accomplished by computer software operating in one or more servers. The servers are in operative communication with at least one automated banking machine, at least one computer including a teller station terminal, and other computers. The at least one server and associated software may be included in a services cloud 113 which provides transaction functions that facilitate the carrying out of transactions at the automated banking machine. The computers included in the services cloud may also make determinations concerning how to process certain transactions and may also provide communications between teller station terminals and the machines. In the example arrangement the computers included in the services cloud may operate to determine the nature of a requested transaction and determine how to generate messages or otherwise handle the transactions based on stored policy data or other information. In some example arrangements transactions may be allowed or denied based on the system configuration. This may be done in a manner such as that disclosed in U.S. Pat. Nos. 7,861,924; 7,946,480; and/or in U.S. patent application Ser.

No. 13/068,461 filed May 11, 2011; and/or Ser. No. 12/803,255 filed Jun. 22, 2010 the disclosures of each of which patents and applications are incorporated herein by reference in their entirety. Of course it should be understood that these approaches are this approach is an example and in other embodiments other approaches may be used.

In one example transaction carried out in an example embodiment a customer may request a $200 cash withdrawal from the automated banking machine. In this example transaction a user may input their card, PIN and/or other identifying data into the machine. The machine computer operates in accordance with its programming to generate one or more messages corresponding to the user's request. In this approach is an example arrangement the one or more messages corresponding to the user's cash withdrawal request are routed to at least one server computer included in the services cloud 113. The computer software operating in at least one computer of the services cloud operates to determine that this requested transaction is within the normal permitted withdrawal limits for such transactions. That is, it is below the threshold that has been established and is authorized to be automatically carried out provided that the approval criteria are met. The computer of the services cloud then operates in accordance with its programming to cause messages corresponding to those from the machine to be communicated to a transaction processing host which serves as a transaction authorizing computer. The transaction processing host includes one or more computers that operate to determine if the requested transaction should be authorized. The transaction processing host operates to determine if the account identifying data corresponds to an account that is authorized to conduct a transaction through the machine, and whether the input PIN or other data corresponds to an authorized user of that account. The transaction processing host also determines whether the account includes sufficient funds to provide the requested $200 withdrawal request. If the identifying data is appropriate and the account has sufficient funds, the transaction processing host operates to generate at least one message which indicates that the transaction is authorized.

In the example arrangement the one or more messages from the transaction processing host are communicated to the computer included in the services cloud. The computer of the services cloud then generates messages to the automated banking machine that correspond to the messages from the host which indicate the transaction is authorized. The automated banking machine then operates responsive to these messages to cause the requested cash to be dispensed. The transaction processing host in this example also generates data in its messages that authorize the transaction that causes a printer in the automated banking machine to automatically print a receipt for the transaction and deliver it to the customer at the machine. The dispense of cash successfully from the machine causes the machine to print the receipt and to send one or more messages which indicate that the cash was successfully dispensed and the customer's account should be assessed an amount corresponding to the value of the cash dispensed. In this example arrangement the messages from the machine are sent to one or more computers in the services cloud. The computer of the services cloud operates in accordance with its programming to cause messages with corresponding data to be sent to the transaction processing host. The transaction processing host operates in accordance with its programming to cause the customer's account to be assessed for the value of the cash that was dispensed to the customer.

Of course it should be understood that if the transaction processing host determines that the identifying data associated with the account or the customer does not correspond to an account or a customer authorized to conduct a transaction at the machine, and/or if the customer's account does not have sufficient funds to satisfy the withdrawal request, the host operates to send one or more messages that decline the transaction. These messages are sent to the computer in the services cloud which operates in accordance with its programming to cause messages to be sent to the machine. The machine computer operates to cause the machine to provide at least one output that informs the customer that their transaction cannot be processed. Of course these approaches are this approach is an example and in other arrangements other approaches may be used. This may include, for example, the computers in the services cloud operating to cause the automated banking machine to communicate messages directly with the transaction processing host. This might be done, for example, by the automated banking machine communicating with the one or more computers in the services cloud to identify the nature and amount of a currently requested transaction. The computer in the services cloud may then operate in accordance with its programming to cause one or more messages to be sent to the machine which causes the machine to route its messages directly to the transaction processing host. Of course this approach is an example and in other arrangements other message flows may be used.

In another example transaction the customer requests an $800 cash withdrawal from the machine 760. In this example transaction the customer inputs their card data through a card reader and PIN through a keypad and/or other identifying data, as well as the amount of the requested withdrawal. In this example transaction the amount of the withdrawal requested is above the threshold. In this approach is an example arrangement the automated banking machine operates to generate one or more messages corresponding to the request. The request is routed to one or more computers included in the services cloud 113. The computers in the services cloud operate in accordance with their programming to determine that the requested transaction is at least as great as the daily permitted cash withdrawal limit which is capped at $500 (in this case $501 per day would be the threshold).

Based on the determination made by the at least one computer in the services cloud that receives this message, the at least one computer operates in accordance with its programming to cause this transaction to be evaluated and if appropriate fulfilled through the involvement of a remote service provider at a remote teller terminal.

In the example embodiment the at least one computer in the services cloud operates in accordance with its programming responsive to the one or more messages from the automated banking machine to generate at least one message to the host processing computer that corresponds to the customer's request. In the example arrangement the services cloud computer operates to generate one or more messages to the host computer that includes data corresponding to the machine user input card and PIN data but with amount data that is below the daily cash withdrawal threshold. In the example transaction the amount is caused by the computer to be replaced with the maximum whole dollar amount below the threshold that can be automatically authorized through operation of the transaction processing host. In this example the substituted amount is $500. The computer in the services cloud causes the messages to be routed to the transaction processing host, and the host operates in accordance with its programming to determine if the requested transaction for the maximum daily amount is authorized. The transaction processing host then operates in accordance with its programming to cause one or more messages to be returned to the computer in the transaction services cloud which indicate whether a transaction below the threshold would be authorized. If the transaction processing host determines that the card and PIN data input by the user correspond to an authorized account and user, the computer included in the services cloud operates in accordance with its programming to cause a notification to be sent to a computer included remote teller workstation 22 (also referred to herein as a terminal) that is in operative connection with the services cloud. The selected workstation to which the transaction is routed may be determined by one or more computers in the services cloud based on the current availability of the service provider associated with the terminal to perform the transaction, and work load sharing software that operates in one or more computers of the services cloud. The remote teller workstation includes a computer that executes software instructions and has other data so as to carry out transaction functions. The computer in the services cloud then operates to cause one or more messages to the teller workstation operating services cloud client software to indicate to the human remote teller at the terminal through output devices connected to the terminal the nature of the request, the account involved, that the identifying data required to be input to the machine corresponds to an authorized account and users and if appropriate, the amount that the transaction processing host has already authorized as available to be dispensed from the machine.

In this example transaction, the remote teller operates their workstation to determine if the customer's account has a sufficient account balance to cover the entire cash withdrawal request. The teller does this by operating the client application on their workstation to communicate with the computer that operates the bank's accounting system and includes data which indicates the balance in the customer's account. After the teller operates their workstation to determine that the customer's account balance is sufficient to cover the requested withdrawal, the teller operates their workstation by providing inputs through input devices operatively connected to the workstation computer to indicate that the transaction should be permitted. The teller's workstation computer operates to cause messages to be sent from the workstation through the services cloud so as to cause the machine to dispense the requested amount. Messages from the workstation also cause the machine printer to operate in accordance with its programming to print a receipt for the transaction. Messages are received through the machine which operates in accordance with its programming to cause the requested cash to be dispensed.

In this example arrangement the application operating on the computer of the teller station terminal also operates to cause one or more messages to be sent through the computers included in the services cloud to the transaction processing host. These messages sent to the transaction host are operative to cause the original request for the $500 cash withdrawal transaction to be cancelled or otherwise nullified. The teller also operates the application on their terminal in response to teller inputs through at least one input device to cause the customer's account to be assessed for the $800 withdrawal. This is done through communication between a computer operating in the teller station terminal and the one or more computers that operate to maintain the accounting records of the bank concerning customer accounts.

In alternative example arrangements the teller application that operates on the teller terminal may operate to cause the transaction response from the host processing computer (which will cause the machine to dispense $500) to cause a completed transaction at the machine. This is carried out in the example embodiment by the computers included in the services cloud causing messages to be sent to the machine that will cause the machine to dispense the $500. In this example arrangement the teller operates input devices of the teller station terminal to cause the machine to dispense the additional $300. In some example arrangements the remote teller may operate their terminal to communicate with the user at the machine so that the user is advised through the display and/or an audio output device that the requested funds will be provided to them through two separate dispenses from the machine.

Further in this example arrangement the host processing computer operates to cause the user's account to be assessed $500 while the remote teller operates their teller terminal to cause the user's account to be assessed for an additional $300. In this example arrangement the automated banking machine operates to send one or more messages to indicate that each cash dispense was completed successfully. The messages are routed and/or data sent through the operation of the computers in the services cloud to cause such messages to be sent to the host computer and the teller terminal.

Further in this example arrangement the remote teller may also operate their station terminal computer providing inputs through associated input devices thereof to cause a receipt to be issued to the customer at the automated banking machine. This is accomplished by the teller station terminal and/or the computers included in the services cloud operating to generate messages which cause operation of a printer included in the automated banking machine. The computer in the automated banking machine operates to print a receipt for the transaction and deliver it to the user. In some arrangements where the host authorized a portion of the total dispense and the teller authorized another portion the machine may issue two receipts, one based on data from the host and another based on data from the teller terminal. In other arrangements the receipt may be provided responsive only to the teller terminal. Of course it should be understood that these approaches are this approach is an example and in other embodiments other approaches may be used.

In some this approach is an example arrangements the bank 200 which operates the system may operate computer software such as Diebold Campaign Office™. Campaign Office™ may be of the type described in U.S. patent application Ser. No. 12/844,377 filed Jul. 27, 2010, the disclosure of which is incorporated herein by reference in its entirety. The Campaign Office™ software may operate to cause one or more computers of the services cloud or otherwise to receive customer identifying data such as the user's account number and determine particular promotional offers or other information that may be appropriate to present to the customer as a promotion. The Campaign Office™ software may operate to cause the computer included in the teller station or other computer of the system, to send one or more messages to the automated banking machine that causes the promotional messages to be output from output devices of the machine to the customer. Alternatively or in addition the Campaign Office™ software may provide an output prompt to the remote teller who may operate their teller terminal to communicate with the customer at the automated banking machine to provide the customer with the promotional messages through video and/or audio communication.

In this way the customer at the terminal may receive beneficial information of a type that they might receive from a local teller. Such information might include, for example, that the customer may renew or purchase a CD now at a promotional rate and/or receive a home equity loan at particular rates. In addition the personal audio and video communication provided directly with the remote teller may also give the customer the opportunity to ask any questions that they may have. Thus in this example arrangement the customer is enabled to carry out a transaction that would normally require visiting a branch bank and using the services of a local live teller to be carried out through operation of the automated banking machine.

In another example transaction a customer may desire to make a cash withdrawal of a larger amount such as $1500 from the automated banking machine 760. Such a transaction may be carried out in a manner similar to that previously described in connection with the $800 cash withdrawal. However, in some systems there may be a requirement that withdrawals of a greater size require that the customer present an additional form of identification in order to receive the cash withdrawal. This additional form of identification may include for example a valid driver's license. Because in this example arrangement the automated banking machine includes a driver's license scanner 57 or other imaging device as illustrated in FIG. 29, the transaction can be carried out through the example system.

In this example embodiment a request for the withdrawal of the amount of $1500 is received through the automated banking machine. The request includes the customer providing their card, PIN and/or other identifying data. The machine operates in accordance with its programming to generate one or more messages which correspond to the request. The messages generated by the machine are received through operation of the one or more computers included in the services cloud. The computers of the services cloud operate in accordance with their programming to determine that the involvement of a remote teller at a terminal 22 will be required and further that review of the customer's driver's license will be needed, in addition to the PIN and card validation which can be carried out through operation of the transaction processing host or in some arrangements through the teller terminal.

Responsive to the determination by the computer in the services cloud that a driver's license scan will be required, the one or more computers in the services cloud cause messages to be sent to the automated banking machine 760. These messages cause the machine to output a prompt to the customer through one or more output devices to present their driver's license to be scanned through operation of the driver's license scanner. The computer associated with the automated banking machine operates in accordance with its programming to generate images of the driver's license. In some embodiments this may include a scan of one or both sides of the license. It may also include reading or detecting other features on the license including magnetic stripe data, holograms, bar codes or other data which is usable to verify the authenticity of the license and/or to identify the user. The approach that is used will depend on the particular system and the requirements associated with carrying out the transaction.

In the example embodiment the license images of the front and back of the license and/or other data are sent through operation of the automated banking machine to at least one computer of the services cloud 113. The computer of the services cloud then operates in accordance with its programming to operate one or more applications to determine if the driver's license is valid. This may include, for example, evaluating authenticity features of the license to determine if it is genuine. Alternatively or in addition, the at least one computer may operate to cause messages to be sent to an external system that include data resolved by the computer from the images of a driver's license. This data resolved from the images through operation of the computer can be compared to data associated with the issued driver's licenses stored in one or more data stores to determine if the data that is read corresponds to an authorized valid driver's license and also to the particular customer that appears to be present at the machine. The remote system may provide one or more messages indicating whether the data corresponds to an authorized driver's license user.

Alternatively or in addition in other embodiments one or more computers of the services cloud may operate in accordance with their programming to operate facial recognition software. Such facial recognition software may analyze image data included on the driver's license particularly the picture of the user included thereon to determine if it corresponds to data stored in a data store that corresponds to the particular customer. Alternatively image analysis may be conducted through operation of one or more computers to check whether seals, holograms or other visible indicia in an image of a driver's license corresponds to a genuine feature.

Alternatively or in addition a camera connected to one or more computers of the automated banking machine may capture images of the customer at the machine. These images may include the customer's facial features. Such facial features may be compared to data derived from images included on the driver's license to determine if the image data on the driver's license corresponds to the face of the user at the machine. Alternatively or in addition the image data from the camera may be compared to data stored in one or more data stores to determine if it corresponds to the indicated customer at the automated banking machine. Of course it should be understood that such comparisons will generally not be able to indicate a 100% verification and the resolved level of correspondence will generally be indicated as a probability, level of confidence or other similar number indicative of a level of correspondence. The computer of the services cloud system may operate in accordance with its programming to compare the level of correspondence to a threshold and to provide one or more indications as to whether the level of correspondence is at or above the threshold which is deemed sufficient to identify the particular user.

In this example transaction the one or more computers of the services cloud may also operate in accordance with their programming to cause identifying data such as account number data, PIN data or other user identifying information that is input to the machine to be included in messages to the transaction authorization host. The messages to the transaction authorization host generated through operation of a computer in the services cloud may include a request for a cash withdrawal that is within the authorization limits of the host as previously discussed. The transaction authorization host may operate in accordance with its programming to return one or more messages to the computer in the services cloud to indicate whether the data input at the machine corresponds to an authorized user and also whether the transaction would be authorized for the amount included in the request messages to the host that is generated through operation of the services cloud.

In the example embodiment one or more computers of the services cloud is operative to make available at the remote teller workstation 22 information regarding the cash withdrawal transaction request. This will include, for example, the amount of the request, the account involved, the driver's license images and the results of facial recognition or other tests that are carried out through operation of the one or more computers. In addition the teller workstation will also receive an indication that the identifying user data such as card and PIN data was determined to be authorized through operation of the transaction host. If the transaction data corresponds to an authorized user, the remote teller may operate their transaction terminal to determine if the customer's account includes the requested amount of funds. If the customer's account includes the requested amount of funds, the teller may operate their terminal by providing inputs through associated input devices in a manner previously discussed to cause the automated banking machine to dispense the cash requested. In some arrangements this may include authorizing a dispense of an amount in excess of an automatic authorization by a transaction host and in other arrangements the human inputs to the teller terminal may cause the entire cash dispense. The teller may also operate their terminal to cause the account to be assessed the amount of the transaction (or in some cases an assessment beyond that automatically accessed via operation of the host). The teller may also operate their terminal to cause a receipt to be issued from the terminal to the customer. Of course as can be appreciated, the teller (alternatively referred to herein as a service provider) may also operate their terminal to provide video and/or audio communication with the customer at the machine to facilitate carrying out the transaction and/or to provide promotional information or answer questions that the customer may have. Of course these approaches are examples Alternatively in some arrangements if the facial recognition software produced a level of correspondence between either stored data and/or captured data and the driver's license image is below the threshold considered to be acceptable, the remote teller may operate their terminal to take additional steps. Such steps may include capturing additional images of the user for purposes of comparing the captured image data to the driver's license image or other data. Alternatively or in addition, the remote teller may establish video and/or audio communication with the user through output and input devices at the machine and the teller terminal to attempt to determine whether the user is the customer that corresponds to the account data that has been input. This may be done for example by making inquiries of the customer the answers to which only the authorized customer would be expected to be able to accurately answer. The teller may receive the answers and make a determination whether the transaction requested should be authorized. Alternatively or in addition the teller may operate their teller terminal to have the computer therein or other computers make records of the transaction such as a recorded video and audio of the communications with the customer, and image or electronic records of other data so as to document the transaction. Of course it should be understood that these approaches are this approach is an example and in other embodiments other approaches may be used.

In this approach is an example arrangements the automated banking machine, computers included in the services cloud, the remote teller workstation computer and other computers may communicate through appropriate networks. These networks may include public and/or private networks which have the appropriate bandwidth for providing the messages that are communicated between the different computers. Further in some arrangements communications may be via wireless networks. In other arrangements communications may be via open public networks such as the Internet. Messages may be transmitted among and between different networks so as to provide the necessary data communication as well as communications of video and audio data as required for operation of the system. As can be appreciated in other example arrangements the services cloud may include computers that are programmed to evaluate the different communications that are received from automated banking machines in connection therewith. The computers in the example services cloud operate in accordance with their programming to determine the nature of the transaction or condition that is occurring at the machine and generate messages to the machine that cause the machine to respond appropriately or to route the data based thereon to the appropriate computer that can handle the requested transaction or condition. For example certain transaction types that are requested at the automated banking machine can be identified and communications routed to one or more appropriate computers that can automatically respond to fulfill the transaction.

Other transactions may be identified as those requiring the involvement of a human service provider, and result in communication sessions between machine users and appropriate teller workstations of service providers that can deal with the type of transaction involved. As can be appreciated the data may indicate that some transaction types may be handled by service providers who are capable of dealing with a wide variety of financial transactions while other transaction types will be routed to persons who are specialists. The services cloud may operate to route the messages to the workstations of service providers based on stored data which indicates the authority or capabilities of the workstation and/or the person currently signed on as the operator thereof.

In addition in some example embodiments one or more computers of the services cloud may operate in accordance with its programming to route the transaction messages to different remote teller terminals depending on other factors such as the time of day. Thus if a consumer is conducting a transaction at an automated banking machine during normal business hours in the area where the machine is located, the services cloud may operate to route messages from the machine to and from service provider terminals operated by remote tellers at a facility located in the same or in an adjacent time zone. Alternatively if the consumer is requesting a transaction outside of normal business hours the services cloud will operate in accordance with the associated programming to cause messages from the automated banking machine to be routed to teller terminals located at a facility in another location where remote tellers are currently working and available. Thus the example arrangements have the capabilities for assuring that if a session with a teller is required, computers of the services cloud can provide the connection to an appropriate service provider during those times that the operator of the system wishes to provide the human teller assistance.

It should be understood that in other arrangements, the services cloud may provide for the generation and sending of messages to remote teller workstations that may be located at dispersed locations, such as in an individual's residence. Thus in some arrangements the services client software may be operated on a service provider PC terminal located at their residence so that service providers may work from the comfort and convenience of their homes. The computers of the services cloud may operate to have a plurality of remote tellers available on standby to which associated terminals messages and communications from automated banking machines can be routed. The services cloud may operate to check the status of the different service provider workstations to determine which ones are currently available to receive a transaction and to route the necessary data thereto. Further the example computers of the services cloud may operate in accordance with their programming to distribute the customer sessions among the plurality of remote tellers who are currently available to handle such calls. This will avoid any one particular teller from being required to handle a significantly larger number of customer transactions than other tellers. Further the computers in the services cloud may operate in accordance with their programming to route customer calls to other available remote teller stations if the current available group of teller stations are all occupied.

This may be, for example, routing the consumer session that cannot be immediately handled because all of the remote tellers are busy, to a remote call center in another region or to another group of available standby service providers. Alternatively or in addition, computers of the services cloud may operate in accordance with their programming to place a consumer session on "hold" in a queue for a next available service provider when all of the service providers are busy. In these circumstances computers of the services cloud may operate to send appropriate messages to the customer at the automated banking machine to indicate to them that there will be a brief wait for a services provider. The computers may also operate in accordance with their programming to indicate to the customer at the automated banking machine the expected wait time that they will incur until they will be in contact with the human service provider. Of course these approaches are this approach is an example and in other arrangements different or additional features may be used. In other example arrangements an automated banking machine 760 may include the capability to allow a remote service provider at a terminal 22 to be able to cause the operation of devices 46 in the machine in the event that there is a machine malfunction and the device cannot be operated in the normal manner. For example a remote teller may have the capability to determine the identity of a user at the machine in situations where the card reader and/or encrypting PIN pad (EPP) 32 are not operative.

For example in some this approach is an example arrangements, the remote teller may gather identifying information from a customer through video and audio communication with the customer of the machine or by operating devices that are included on the machine. For example if a card reader 92 is broken the remote teller may communicate with the machine via audio output and input devices or via an output from the machine display and advise the customer to place their card adjacent to a camera such as camera 70 that is on or adjacent to the machine. Camera 70 may provide video communication and/or be operative to capture images of the card. In this situation the remote teller may view the card through the display of their teller terminal including the account number and user name thereon. In addition in some situations the remote service provider may request through video and audio communication with the customer at the machine that the customer display the rear of the card to the camera. This enables the remote teller to check the written name of the person on the back of the card and to also view and check the verification code that is included on the rear of the card. In addition in this arrangement the remote teller may also observe identifying features that are included on the card such as holograms or clear plastic windows that are included on some cards in order to make the cards more difficult to counterfeit.

In some example arrangements the remote service provider may operate their teller terminal to provide input data corresponding to the card. For example in the case of a card reader malfunction at the automated banking machine the remote teller could point their terminal to provide inputs that are received by the automated banking machine that correspond to the card number. This might be done using remote control software such as PC Anywhere™ or other types of software that enable the remote control of a computer from another authorized computer. By having the remote service provider input the card data that would otherwise be read by the card reader 92, the automated banking machine may then operate in accordance with its programming to handle the transaction in accordance with the usual manner. For example once the card data has been entered into the machine, the programming of the automated banking machine may then prompt a user to provide their PIN through inputs through the EPP 32 on the machine. The automated banking machine then operates in the normal manner in accordance with its programming to conduct the requested transaction.

Alternatively in situations where the machine includes a driver's license reader 57, the remote teller may have the capability to operate their terminal to cause operation of the machine to operate the driver's license reader. The remote teller may instruct the user to place their bank card into the driver's license reader which may capture the data from the front face of the card, or if the driver's license reader has a stripe reader, the magnetic stripe thereof. The remote teller may then cause the captured data to be transmitted to the appropriate software process operating within the automated banking machine associated computer to enable the transaction to move forward in a manner comparable to that that would be accomplished if the card data had been read through the reader that is normally used for reading card data from bank cards.

Alternatively or in addition, the remote teller may receive identifying data such as from a driver's license, and operate their teller terminal to determine account number data or other data from a data store such as may be associated with the financial institution's account data. The remote teller may then operate to cause the needed account data to be sent to the machine for purposes of carrying out the transaction in the normal manner. Of course these approaches are this approach is an example and in other arrangements, other approaches may be used.

In an alternative arrangement, the keypad on the machine, such as EPP 32 may experience a malfunction. An EPP malfunction may present additional challenges due to requirements that the user's PIN is generally required to be maintained in secrecy. In this scenario if the automated banking machine is of a type that has an associated handset, the machine may operate in accordance with its programming to indicate to users that if they wish to conduct a transaction they need to request a teller session with a remote video teller. In this arrangement in the audio/video communication that is initiated with the teller informs the customer at the machine of the need to provide their PIN data audibly via the handset on the machine. The audio connection may be sent via encrypted audio signals to reduce the risk of interception. In this arrangement the remote teller may then receive the user's PIN data confidentially through the handset. The remote teller can then provide inputs through the teller terminal that correspond to the user's PIN. The teller may then provide inputs to the teller station computer and cause data corresponding to the PIN data to be included in an appropriate transaction message.

For example in some arrangements the PIN data may be encrypted through operation of the teller terminal and/or the computers included in the services cloud and sent to the automated banking machine. The machine then may operate to include this data in the appropriate messages which are built by the computer associated with the automated banking machine and then sent to a transaction host to allow the transaction to be carried out in a normal manner therethrough. Alternatively in some arrangements the teller terminal may operate to receive the account number data, card number data and/or transaction type and amount information from the consumer via the handset. In this arrangement the teller terminal may operate to send the data provided by the customer in appropriate transaction messages that are sent to a transaction authorizing host. Computers in the services cloud may then operate to cause the response messages (or data corresponding thereto) from the transaction authorizing host to be sent to the automated banking machine so as to enable the machine to carry out the dispensing of cash or other appropriate transaction functions automatically in response thereto.

In another alternative arrangement, in the event that an EPP of the automated banking machine is broken the machine may operate in accordance with its programming to instruct the user to input PIN data or other information through a secure touch screen display module. Such a secure touch screen display module may operate to cause touch inputs thereto to be encrypted in a manner like that shown in U.S. patent application Ser. No. 13/421,107 filed Mar. 15, 2012 the disclosure of which is incorporated herein by reference in its entirety. In automated banking machines that include both an EPP and a secure touch screen display module, the teller terminal application operated by the remote teller may modify the operation of the automated banking machine through messages sent from the teller terminal. Such modification may include changing the programming of the computer associated with the automated banking machine so that the user is prompted to provide their PIN through the touch screen display module. The change in programming may then operate to cause the PIN data to be included in transaction messages that are sent to the transaction authorizing host in the manner than would normally be done if the EPP were operational. Upon repair of the EPP the remote service provider or other entity with the capability of accessing the system may then communicate with the automated banking machine to cause it to return to its operation so that it receives PIN data in the normal manner. Of course it should be understood that similar approaches may be applied to other types of devices that are included in an automated banking machine. For example other types of input devices and output devices may become non-functional but the terminal may still be utilized to accomplish transactions through the efforts of the remote service provider. This may include providing communications with users of the machine to provide alternative ways to exchange information and/or to change the operating characteristics of the machine on a temporary basis so that the customer's requested transactions can be accomplished. Of course it should be understood that these approaches are this approach is an example and in other embodiments other approaches may be used.

In other example embodiments one or more computers associated with the automated banking machine 760 may be operated to carry out a digital video recorder function. In this example arrangement the programming of at least one computer may be operated to store data corresponding to video and audio that is sent to and/or from the machine. Alternatively in other arrangements such data may be transmitted from the machine to a computer associated with computer associated with remote data store 110. Further in other arrangements the function of providing the digital video recorder may be accomplished by a remote computer in operative connection with the audio input devices and camera at the machine (and in some cases the devices of the remote teller terminal), or the computers of the services cloud. This may be accomplished in a manner such as that disclosed in U.S. Pat. No. 7,984,847 the disclosure of which is incorporated herein by reference in its entirety. As a result in this approach is an example systems video and/or audio data corresponding to teller assisted transactions or all transactions may be recorded and maintained through operation of the system.

In example embodiments a remote service provider may utilize their teller terminal to communicate with the automated banking machine and identify any device malfunctions which have occurred. This may be done, for example, through remote communication software or other communication software which can communicate with the machine and obtain status data stored therein or derived therefrom that indicates that there is a malfunctioning device. Alternatively one or more of the computers included in the services cloud may operate in accordance with their programming to periodically verify the proper operation of devices in automated banking machines and identify instances where devices or other capabilities are not operational. In response to determining a malfunctioning device or inoperative banking machine function, the service provider may through inputs through their teller terminal, or one or more computers in the services cloud, may cause a change in the machine programming and/or the handling of messages from the automated banking machine so that the transaction functions may still be carried out at the machine even though the machine has experienced a malfunction.

For example in some arrangements machines may include a check scanner 33 such as disclosed in U.S. Pat. Nos. 7,931,193; 8,052,045; and/or 8,052,046, the disclosures of each of which are incorporated herein by reference in their entirety. In the example arrangement check analysis device 33 alternatively referred to herein as a check acceptor, (or a combined check and cash analysis device) may operate to capture images of the check or sheet, determine MICR data (or other magnetic data) on the check or sheet and resolve other values that may be included on the check or sheet. The automated banking machine may also operate in accordance with its programming to store images of checks or sheets that have been received in transactions at the machine. Such images may also be sent by the machine along with other data regarding the transaction in which the check or sheet was received through a remote computer associated with a check or other processing system. This remote computer may operate to cause a check to be processed for payment as an image and sent for presentment to the financial institution on which it is drawn so that the check can be paid, or if the check is invalid to provide an indication that the check will not be paid.

In some this approach is an example arrangements automated banking machines may be operated by the users whose accounts are identified through their card data or other appropriate identifying data, to deposit and/or cash checks. In such arrangements the computer in the automated banking machine may operate to accept the check from a user and capture images of the front and back of the check. The computer of the automated banking machine may operate to resolve data from the captured images such as the MICR line data, the courtesy amount written on the check, the legal amount on the check and/or other data that indicates the amount of the check, the account and institution on which it is drawn and/or other data. The automated banking machine may operate to resolve this data and to credit the user's account or otherwise conduct a transaction related to the check based on being able to resolve such data during normal operation of the machine. When such data has been resolved, the automated banking machine communicates with the transaction processing host and/or a check processing computer so as to process the received check from the identified customer. In situations where data is required for the transaction that cannot be resolved from the check, the automated banking machine may operate in accordance with its programming to decline the check processing transaction and return the check to the user.

In example arrangements one or more computers in the services cloud may operate to monitor automated banking machines for transactions involving the receipt of checks where the transaction would be declined due to the inability of the machine to accurately read indicia with a suitable level of confidence or adequately resolve or validate one or more items of data from the check. This may be done, for example, by a computer in the services cloud receiving a notification message from an automated banking machine of such a transaction. Alternatively such a transaction condition may be determined through operation of a computer in the services cloud by passing the transaction messages between the automated banking machine and a transaction processing host or other computer that is involved in approving or denying the transaction at the machine.

In response to a computer in the services cloud receiving an indication that a check processing transaction cannot be carried out for a user, the computer may operate to cause one or more messages to be sent to a remote teller terminal. Messages to the teller terminal may operate to inform the service provider of the condition and the reason that such transaction would otherwise be denied. In response to receipt of these messages, the remote service provider may operate their terminal 22 to access the computer in the automated banking machine 760. The remote service provider may also engage in video and/or audio communication with the customer at the machine. The remote service provider may operate their service provider terminal to review on a display the check images that have been captured by the machine and make a human judgment concerning data included on the check that could not be resolved automatically through image analysis operation of the machine. This might include, for example, resolving visually the amount data, MICR line data or other data on the check. In response to a determination by the remote teller of the data that the machine could not resolve, the remote teller may input the data through an input device of the teller terminal. The teller terminal may operate in accordance with its programming to send the data to the automated banking machine so as to allow the transaction to be completed automatically. Alternatively in some arrangements the remote teller may operate the automated banking machine through their teller terminal and/or provide for communications with other computers in the system so as to complete the transaction for the customer at the machine.

In other situations audio/video communication may be held between the remote teller and the customer. For example in circumstances where the check document has been returned to the customer and the captured image is not of sufficient quality for the remote teller to conduct an analysis thereof, the teller may instruct the customer to re-input the check to the check acceptor so that a scanner 33 may capture at least one other image of the check. This might be done for example if the original image was not legible, skewed or otherwise unacceptable due to machine malfunction. In these circumstances the teller may operate the terminal to cause the machine to capture another image of the check which the teller can then review and evaluate for purposes of completing the transaction. Of course it should be understood that this approach may also be used with bills and other types of sheets.

In still other alternative arrangements audio communication between the remote teller and the customer may be used to instruct the customer to hold the check within the field of view of a camera 70 associated with the machine 760 so that the service provider can visibly read information from the check through a display at their teller terminal. If the remote service provider can read the check data, they may input the data through input devices at the remote terminal for purposes of conducting the transaction. The remote teller may then instruct the customer to input the check again into the check acceptor of the machine and the remote teller may operate the machine to move the check into the machine and store it therein. The remote teller may then operate their teller terminal so as to cause the check processing transaction to complete. This may include, for example, communicating with the transaction processing host, the bank's back office computer accounting system or other required computers so as to process the check and cause an image thereof to be sent for presentment to the bank on which the check is drawn. In still other example transaction situations, the automated banking machine may accept checks from users who may not have card based financial accounts and/or whose accounts are associated with a different institution than the one that operates the automated banking machine. In such situations the processing of a check or check cashing or other type transactions may require that payee data written on the check be compared to a driver's license or other identifying data associated with the user. This may be done in a manner like that discussed in U.S. patent application Ser. No. 13/428,007 filed Mar. 23, 2012, the disclosure of which is incorporated herein by reference in its entirety. In such arrangements the automated banking machine may operate in accordance with its programming to analyze the image portion corresponding to the payee name which is included on the check, through character recognition software that operates in one or more computers. The resolved payee name from the check may then be compared to data that is resolved from a scanned image read by a driver's license reader or similar device included in the machine. Alternatively the driver's license reader may operate to read magnetic stripe encoded data and/or bar code encoded oath that corresponds to the user name on the license. The machine may then operate to compare data captured through operation of the driver's license reader and the payee name on the check to determine if they correspond. In response to such correspondence, the automated banking machine may operate in accordance with its programming, and in response to other factors to accept the check and to either dispense cash or otherwise grant the customer a form of value for the check. Such a form of value may include in some embodiments operating to store value in an account associated with a reloadable stored value card, issuing money orders, placing value in a mobile wallet account associated with a smart phone or other form of value.

In this approach is an example arrangements if the payee name is resolved from the check and driver's license data cannot be resolved with a suitable level of confidence as corresponding to the same person through operation of the computer associated with the automated banking machine, one or more remote computers such as a computer the services cloud may be notified of the condition. Alternatively one or more remote computers may resolve that such a condition has arisen at the machine through the analysis of messages which are controlled and routed through the services cloud. In response to notification that this condition has arisen, the one or more computers may cause messages to be sent to a remote teller station notifying the remote teller of the condition. The remote teller may operate their terminal in response to the notifications to cause video and audio communication to be held with the customer at the machine. The remote teller may then review the available data from the check, the driver's license reader or data that can otherwise be obtained from the customer at the machine to determine if the driver's license data and payee data correspond or there is a suitable reason to allow the transaction to proceed. If so, the remote teller may provide inputs through their teller terminal that operate to cause the check accepting transaction to be completed.

Alternatively or in addition in circumstances where there is a question concerning the payee data and the identity of the customer, the remote teller may also conduct video and audio communication to gather from the customer information that corresponds to other forms of identification. Such other forms of identification may include other forms of identification cards, biometric data or other data associated with a user or a device associated with the user that can be used to identify the particular customer. Such other forms of identification could be viewed by the remote teller through operation of the camera 70. Alternatively cards or other items could be read through operation of the driver's license reader 57, the check acceptor 33 or the card reader of the machine. In response to reviewing the data associated with the additional forms of identification the remote teller may operate their terminal to either allow the transaction or to deny it.

In some this approach is an example arrangements the remote service provider may become involved in a transaction that is being denied, only if the involvement requested by the customer. For example the programming associated with the computer of the automated banking machine may operate to indicate to a customer that a requested transaction has been denied. However, the machine may also provide an output that indicates to a customer that if they wish to attempt a transaction with the help of a teller, they can provide one or more inputs through input devices of the machine which causes the machine to operate to make contact with the remote teller so that the remote teller can assist in trying to complete the transaction. Of course these approaches are this approach is an example and in other arrangements other approaches may be used.

In other example arrangements systems operated in connection with automated banking machines may operate to enable service provider involvement to suspend or stop transactions that are otherwise occurring automatically at the machine. For example this may be done in cases where programming associated with a computer in the automated banking machine, a computer associated with a services cloud, or otherwise connected in the system, identifies one or more factors that indicate that a transaction is suspect or otherwise should be subject to review. This might occur, for example, if data associated with a check is suitable for validation but is very close to a threshold which suggests that data may not have been read accurately.

Alternatively, properties associated with the check may suggest that the check might be somehow fraudulent. This might include, for example, data from thickness sensors, ultrasonic sensors, magnetic sensors or other sensors that are used in analyzing the check which indicate that the check may be suspect in some respect compared to normal checks. Alternatively or in addition this might be done where amounts involved in the transaction are at or above a particular level or which in some way are beyond certain parameters that have been established where no remote teller oversight is required. Such transaction circumstances may be based on a single parameter or a combination of multiple parameters that are associated with the transaction.

In some example embodiments, even though the automated banking machine 760 would normally proceed to operate to complete the transaction, the automated banking machine computer, a computer in the services cloud, or another computer associated with the system may operate to cause the transaction to be identified as one that requires remote teller review. In such circumstances the automated banking machine may be operated to suspend one or more transaction steps prior to the completion of the transaction until the remote teller is notified and reviews the conditions that make the transaction suspect through the remote terminal 22. In response to such conditions the remote teller may through inputs through their teller terminal evaluate the parameters and either provide an input authorizing completion or may provide inputs so as to deny the transaction. Alternatively or in addition the remote service provider may suspend the transaction and have the customer wait while additional data or information is checked from other systems. This may include, for example, checking data in archive systems to determine if the check data corresponds to a check already processed through other channels and/or whether the driver's license or other identifying data being input by a user is reported stolen or otherwise improper. In response to the determinations or information available to the remote teller, the remote teller may make a decision on whether to allow the transaction to complete or provide inputs to their terminal that deny the transaction. This ability of a remote teller to override automated determinations made by the machine 760 or other connected computers may enable a remote service provider to stop transactions based on factors that may only be discerned from data that may be available to the remote teller. For example the remote teller may be reviewing the check image and believe that it has been modified or produced as a composite of other images. Likewise the remote service provider may review the data from a driver's license, and based on a visual appearance or other factors may suspect that it is a forgery. In other circumstances the remote service provider may review this data from the machine and based on factors that the machine is unable to automatically evaluate, be suspicious that there is illegal or nefarious activity going on. In such circumstances the remote service provider may stop the transaction from being automatically completed at the machine. In response to the remote service provider stopping the transaction, the remote service provider may provide information to the customer at the machine about how to proceed to request the transaction elsewhere such as with a live teller in a branch bank. Alternatively or in addition the remote teller may operate their teller terminal to cause messages to be sent to the machine to take appropriate steps such as to return a check or other document to the customer, or otherwise send messages to other computers so as to reverse any transactions that may have been automatically set up through operation of the system. Of course these approaches are this approach is an example and in other embodiments, other approaches may be used.

In some arrangements the computer associated with the automated banking machine may record video and audio as well as other data associated with transactions conducted at the machine for later review. Alternatively a remote computer 20 operated through the service provider terminal 22 or one or more computers associated with the services cloud may operate to store in associated relation, video, audio, images, transaction and/or other data associated with transactions. In cases where automated banking machines are operated to provide check cashing capabilities, particularly check cashing transactions for customers who do not have accounts with the institution operating the machine, it may be preferable to record video, audio and other relevant transaction data in case there is later an allegation of fraud. Likewise in some arrangements where automated banking machines are set up to accept cash, it may be advisable to record transaction details and other information about the cash received for later recovery in the event it is later determined that the cash is counterfeit. This might be done, for example, in automated banking machines that dispense money orders and/or that provide the capability of electronically transferring money to stored value card or electronic wallet type applications, or to remote terminals or remote systems so as to provide payment to other individuals.

In some example embodiments one or more computers associated with the automated banking machine may include programming that establishes rules for the recording of data and audio and/or video associated with transactions and the data or other items that are to be recorded. For example in some arrangements computers may be set up to cause the recording of data associated with all transactions. In other arrangements only certain types of transactions such as check cashing, cash accepting or other transactions may have data recorded. In still other arrangements, transactions involving transfers that involve third parties may also be subject to having selected data recorded.

For example in situations where automated banking machines are operated to cash checks for customers who do not have accounts with the institution that operates the machine, it may be important to record and retain certain video, audio and other data related to each transaction.

This may be necessary so that if a dispute arises regarding whether or not the person cashing the check was an imposter or the like, all the data that was involved in determining whether to carry out the transaction will be available. This may include, for example, video and audio communications, driver's license information, identifying information, check image data or other data associated with the transaction and the decision to allow the check to be processed, can be stored and recovered in the event of a problem. In addition given that a significant number of such transactions have data that needs to be recorded and stored, one or more computers associated with the services cloud may operate in accordance with their programming to assure that the data is stored. For example in some arrangements data may originally be captured and stored in one or more computers that are associated with or within the automated banking machine. These computers may operate to periodically cause the data to be moved through communication via a network into an archive that is produced and stored in connection with another computer which stores the data on a longer term basis. Such data may be held for a sufficient period so that the data is available in the event that any challenge or issue is later raised concerning the transaction. Further in this approach is an example arrangements, the computers may operate in accordance with their programming to cause certain data to be deleted after a period of time has passed when no challenge could reasonably thereafter be expected to the particular transaction. Of course these approaches are this approach is an example and in other embodiments other approaches may be used.

In still other arrangements the capabilities of the automated banking machine 760 to enable remote video and audio communication may be used to provide communications with remote technicians to facilitate servicing the automated banking machine. For example in the event of a machine malfunction the communication capability available at the machine may enable communication with a remote server 90. Such a remote server may provide information regarding diagnostics which can be used to identify and correct the problem. Alternatively or in addition if a servicer who may not be affiliated with the machine manufacturer is seeking to conduct repairs, the servicer may obtain diagnostics and other information on how to correct any problems with the machine in exchange for payment of a fee. This may be done in a manner like that discussed in U.S. patent application Ser. No. 10/722,064 filed Nov. 25, 2003 and Ser. No. 13/405,667 filed Feb. 27, 2012, the disclosures of each of which are incorporated herein by reference in their entirety.

Further in some example environments, video and audio communication with the machine may be operatively carried out via computers of the services cloud or other network connections with a remote help desk or other remote servicing function. The individuals at the remote help desk or other individuals who can communicate to the individual at the machine may provide advice on servicing the machine and may provide instructions on service activities that can be conducted to correct malfunctions. For example for certain routine types of service, video and audio communication with a help desk may enable an unskilled clerical person or other individual who does not normally perform service activities to do so and return the machine to an operative condition. The capability of video and audio communication may include not only providing verbal instructions but also being able to stream videos, information from service manual data, images or other information that shows a person located at the machine exactly what to do in order to correct the particular problem that is detected with the automated banking machine.

Further in this approach is an example arrangements the remote servicers at the help desk or otherwise may have access to the machine through remote control software which enables them to determine the statuses of devices in the machine and to analyze status data to resolve what problems may exist. Such remote operational capability may also allow individuals at the help desk to operate devices and otherwise test the operational capabilities of the machine before the machine is placed back into service. Of course it should be understood that these capabilities may be beneficial not only in assisting individuals who may not be familiar with the servicing of automated banking machines, but also may be utilized by remote servicers who are employed for the purpose of servicing such machines. The capability to have automated banking machines remotely analyzed for malfunctions or other conditions that may exist particularly at times when a condition is detected but before a servicer can be on site, may facilitate enabling a servicer to more rapidly place a machine back into service. Further the capability to obtain instructions and information on how to repair the machine on an immediate basis can mean that the servicer need not carry a computer or other device that includes all the necessary manuals, diagnostic tools or other items that would otherwise need to be carried by such a servicer in order to repair such machines. Of course it should be understood that such approaches are this approach is an example and in other arrangements other approaches and capabilities may be used.

In other example embodiments the automated banking machine 760 may allow the customer to operate the machine to print money orders and cashier's checks. For example, a customer who does not have an account with the bank may want to conduct various transactions with the machine. The customer could then elect to do a transaction where the machine may provide value in exchange for cashing a check. The value may be in the form of several money orders or several cashier's checks at certain predetermined amounts whereby the balance may be received in cash.

In an example embodiment, if the customer wanted money orders that exceeded the value of the check that they have presented, an alternative may be to allow the customer to provide additional value through the cash acceptor 35 on the automated banking machine 760 to make up for the difference in value. For example, the customer may indicate to the machine 760 that he would like $200 in money orders or cashier's checks. The machine 760 may produce money orders or cashier's checks in any appropriate amounts or quantities. The bank, however, may have a policy that the machine 760 may only print money orders or cashier's checks in certain predetermined amounts, such as $20 and $50 amounts. The customer wants to cash his check in exchange for $200 in money orders, however the customer's check is only for $190. Therefore, the customer will need to provide the difference in amount to the machine 760 before the machine will produce the requested money orders. The machine 760 indicates to the customer that he needs to provide the additional $10 needed. The customer provides the $10 in cash by inserting the money into the cash acceptor 35 located at the machine 760. Once received and processed that the correct amount was deposited, the machine 760 then prints out the $200 in money orders in the desired quantities of predetermined amounts. For example, the customer may elect to receive the $200 in four $50 money orders. Of course it should be understood that these approaches are this approach is an example, and in other embodiments other approaches may be used.

Similarly, the customer may request and receive a cashier's check in the same manner at the machine 760. The capability for the automated banking machine to issue a check to a particular person is discussed in U.S. Pat. No. 8,186,576 issued on May 29, 2012, the disclosure of which is incorporated herein by reference in its entirety.

FIG. 17 shows a side view of a shared station 250 having a configuration that includes dual touch screens and a stand 252. A service provider touch screen 254 is on one side of the configuration and the customer touch screen 256 is on another side (e.g., opposite side or an adjacent side). The screens can have the same dimensional size. The arrangement allows for the customer and the service provider to be situated at the same table 258. The relative closeness allows direct visual and audible conversation between the parties. Alternatively, the shared station 250 can be built into a (dividing) wall, with the different screens 254, 256 located in different rooms.

In another embodiment, a shared station may have only one display touch screen. For example, the display screen may be a display surface of a surface computer arrangement. The service provider can provide touch screen input that causes the screen output to be rotated 180 degrees. This feature allows a document to be flipped back and forth for reading between the service provider and the customer.

Figure 18:
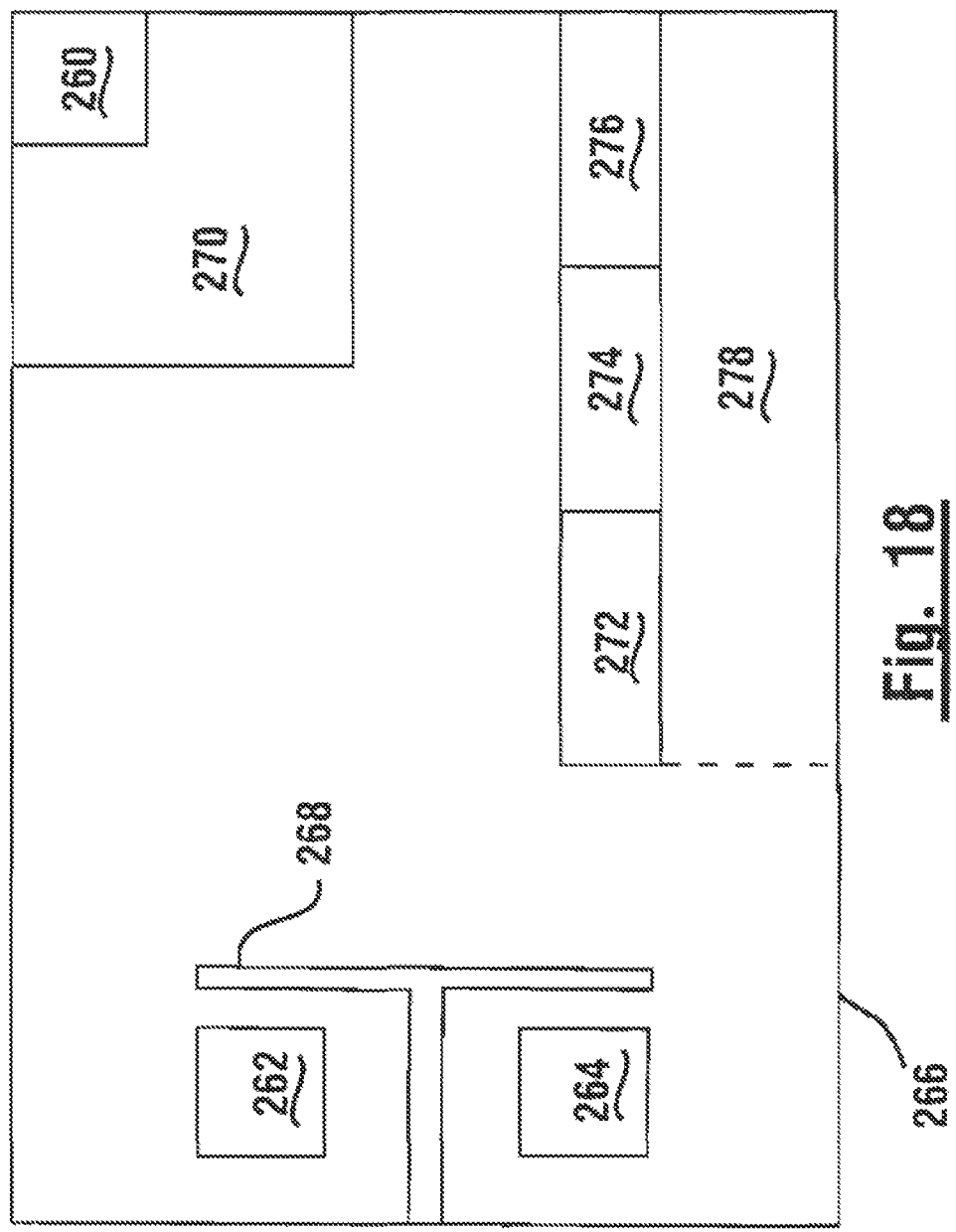
FIG. 18 shows a top view of a bank that houses a bank teller station, bank customer stations, and a bank teller area.

FIG. 18 a top view of customer stations 262, 264 that are separated yet locally positioned with a common service provider station 260. The touch screens 262, 264 are located in the same building facility (e.g., a bank) 266. The customer stations are provided with a privacy screen 268. The service provider touch screen 260 is in operative connection with the customer touch screens 262, 264. The service provider station is in a room 270 which is secure from bank customers. The security room provides physical safety to the human service provider (e.g., the assisting bank employee). The arrangement allows the bank employee to simultaneously provide assistance to (and safely communicate with) a plurality of local bank customers. Bank customers can also walk up to bank teller windows 272, 274, 276 to receive assistance from tellers located in a teller area 278.

FIG. 19 shows a plurality of customer stations 282, 284, 286, 288 remotely located from a service provider station 280. The service provider touch screen is in operative connection with each of the customer touch screens. The arrangement allows for the same service provider touch screen 280 to respectively remotely communicate with each of the customer touch screens 282, 284, 286, 288. The customer stations are geographically remotely located from each other. The service provider may be physically located in a foreign country relative to the customers.

The service assistance provided can use several different communication formats, including wireless 290, Internet 292, and/or satellite 294 communication. As previously discussed, a customer touch screen can be part of a personal portable computing device 288, such as a smart phone owned by a customer. Alternatively, a customer touch screen can be part a device not owned by the customer. For example, an automated banking machine 282 can include the customer touch screen. Thus, the embodiment allows both a phone owner and an automated banking machine customer to receive similar on-screen assistance from a same remote service provider.

FIG. 20 illustrates a top view of a banking area 750. The banking area 750 may be located in a banking facility 200 as discussed herein and illustrated in FIG. 2. The banking area 750 may include a teller area 752 with teller windows 754. The banking area 750 may also include an enclosure 756. In some example embodiments, a terminal 760 may be located within the vestibule, housing or enclosure 756. The terminals may be operatively connected to the network 102. The terminals may include computers with associated input and output devices or other devices that are operative to run software programs locally and may be connected to data storage devices 110. The example terminal may comprise a thin client software architecture in operative connection with a server running applications requested by the terminal. Alternatively the terminal may comprise a computer operative to run some applications locally therein while accessing other applications that are run remotely on another computer such as a server 90. In some example embodiments terminals comprise automated banking machines. In the example system, one or more banking computers 20 may be operatively connected to the example network 102. A banking computer 20 may comprise one of various forms of computers, including for example, a laptop, surface computer, desktop computer, embedded computer, self-service terminal, automated banking machine, or handheld device operative to run applications useful in banking transactions.

In an alternative embodiment, the terminal 760 may be integrated with a housing or enclosure. This enclosure may be located inside or outside of the bank or at a location remote to the bank. This enclosure may provide an additional level of privacy, security and comfort for the customer before, during and after the transaction. In addition, the customer may be more comfortable talking to a terminal during a transaction because their chances of being overheard are lessened. In an example embodiment, the enclosure 756 may include a door 758.

The automated banking machine 760 may limit audio streams to prevent rogue audio channels from playing during use, which may prevent the installation of rogue applications on the machine and/or rogue connections to the machine that may be used for purposes of getting a machine user to provide inputs that may then be intercepted and used by criminals.

The automated banking machine programming may include internal audio visual files that may be played to a machine user in order to prompt them to provide inputs into the machine. These automated banking machine resident applications may then be authenticated as genuine by the processor on the automated banking machine. This may be done by measuring the particular application when it is known to be a trusted application, and the processor may only execute that application if the current measurements correspond. These types of features are illustrated in U.S. Pat. No. 8,100,323 issued on Jan. 4, 2012, the disclosure of which is incorporated herein by reference in its entirety.

In the case of remote audio and video, only a single audio and video channel may be communicated at once. The machine may utilize a switching capability that may allow a remote audio and/or video connection into the operating system that may provide the audio and video outputs from the machine based on authenticating the signal source. This may be done by having a particular process in the application that may authenticate data coming from an authorized source. Being able to authenticate the data may cause software in the XPS software layer to allow video and audio signals from the remote source to pass into the channel that causes it to be played at the automated banking machine.

Before the video and audio data may be sent from the remote source, a message may be sent to the machine 760 that may be authenticated as genuine based on time variant data, certificates, signatures or other verifying information. A secure message sent to the machine may then cause the switching within the application to allow data received on a particular port to be directed to the video and audio output devices. Likewise, switching would be needed to open the video and audio communication from the user at the machine to the remote provider system.

Alternatively, the machine 760 may receive a message from a different source that may operate to cause the machine to open the video and audio channel from another source. For example, the machine may receive a message from a particular secure server 90 that may be associated with the remote service provider station. It is through the server 90 that could be authenticated that causes a switching function to connect the audio and video channel. It may also provide the machine 760 with a particular code or other digital authenticator that needs to be present in the video or audio signal in order to allow the output through the machine.

The operation of the computer 20 in conjunction with this server 90 would then cause that particular authenticating signal to be included in the video and audio signals in the next transmission so that it is assured that the signals are coming from the authorized source, rather than some rogue source. The next time a connection was needed to be established, however, a different authenticator could be given to the machine and included in the particular signals in order to allow those to be output.

The machine 760 may utilize a switching capability that may allow a remote audio and/or video connection into the operating system that may provide the audio and video outputs from the machine based on authenticating the signal source. This may be done by having a particular process in the application that may authenticate data coming from an authorized source. Being able to authenticate the data may cause software in the XPS software layer to allow video and audio signals from the remote source to pass into the channel that causes it to be played at the automated banking machine.

Alternatively, the video and audio source may be authenticated before streaming from a source. The software may authenticate a URL associated with the server that it is receiving the video from with a hand shaking protocol, such as SSL from the encrypted source that the website is authenticated with certificates. The stream could be authenticated between the server and the recipient. For example, a secure session may be set up with a remote server that supports video, such as SSL or VPN, then setup a connection between the server and the machine that could authenticate the audio feeds and the video could be encrypted with a shared key between the two.

Similar principles may be applied to audio and video coming from the machine 760 so that it is assured that this data is coming from an authorized source. For example, the signals coming from the machine may include an authenticator that may be based on the machine, time variant values, values sent to the machine by the service provider system to open the audio and video connection, or some other source to assure to the service provider system that the messages from the particular machine are not being spoofed.

Whether the terminal 760 is located within or integrated with an enclosure, the enclosure may include additional privacy panels or walls 762, such as glass walls. For example, the glass wall(s) 762 of the enclosure 756 may include a liquid crystal material, electrochromic device, suspended particle device and the like, whereby the glass walls may be turned from clear to frosted or opaque while a customer is making a transaction within the enclosure. These glass walls may include electrically switchable glass or glazing that changes light transmission property when voltage is applied. The glass walls may be operated by a remote control, movement sensor, the flip of a switch, press of a button or by the closing or the locking of a door 758, which may complete an electrical circuit. For example, when an electrical supply is switched on, the liquid crystal molecules align and light may pass through the glass wall. When the power is switched off, the liquid crystal molecules may be randomly oriented thereby scattering light and the glass wall becomes opaque.

The enclosure may further include soundproof walls 762. For example, the enclosure 756 may include soundproof glass walls or the walls may be fabricated out of another material, such as sound insulating fabric, felt of the like that may dampen the outside sounds and prevent others from being able to hear what is occurring within the enclosure. Thus, the customer may complete their banking transaction in quiet while possibly being in noisy surroundings. In an alternative embodiment, the enclosure 756 may utilize a film-coated glass, whereby advertising may be projected on the glass or messages indicating that the enclosure is occupied when a person is conducting a transaction within.

FIG. 21 illustrates a top view of an enclosure 756 housing a terminal 760 therein. FIG. 22 illustrates a top view of an enclosure 756 where an interactive surface computer 766 may be utilized and housed therein. In some example embodiments, the surface computer 766 may comprise or be located on a wall. This surface computer wall may be one side, section or portion of an enclosed space or enclosure, such as any appropriate geometric shape. For example, the surface computer may be one side of a three or four-sided structure, such as a triangle, square or rectangle. The other two or three sides of that structure may comprise glass walls (that may switch between clear and opaque), whereby the terminal and enclosure will simply be a three or four sided structure that the customer can enter and exit via one of the walls that may act as a door. Any transaction involving a monetary exchange or transfer may be completed via NFC technology from the interactive surface computer wall to the customer's mobile device. Alternatively, instead of one wall being an interactive surface computer, the customer may be presented with a video or holographic image of a teller on one of the walls and proceed with the transaction in a verbal manner without the requirement for any physical actions.

The terminal 760, surface computer 766 and/or the enclosure 756 that encompasses the terminal 760 may include multiple cameras 768 or gesture recognition software that may interpret human gestures. Responsive to having determined that the particular customer is at the surface computer or terminal, one or more computers may be operative to cause the terminal to provide outputs appropriate for the particular user. The user may interact with the terminal by pointing a finger at the display screen to instruct a pointer or cursor, for example, to move accordingly. For example, gesture recognition software may be beneficial for customers who speak sign language. In other example embodiments, the surface computer and/or the shelf as described herein, may allow for multiple users to interact with the surface computer simultaneously. For example, an adult couple may complete separate banking transactions at the same time to speed up the transaction time, whereby one member of the couple may deposit money and the other member may be checking the status of a different account, withdrawing money, or initiating a loan process. In another example, a parent may be completing a banking transaction while a child or children may be coloring a picture, playing a game or watching a cartoon on the surface computer to entertain themselves until their parent is finished.

The enclosure 756 may have an associated ambient intelligence, whereby the enclosure may be sensitive and responsive to the presence of individual users and their preferences. The enclosure may be in operative connection with one or more computers that receive inputs usable to recognize individual users and provide outputs that cause the enclosure to be tailored to each user's needs as well as change in response to each user. Responsive to having determined that the particular customer is located within the enclosure, one or more computers may be operative to cause the terminal or surface computer to provide outputs appropriate for the particular user. For example, the database of customer preferences may also include preferences related to a desired indoor climate, whereby the enclosure may respond by adjusting the temperature within the enclosure to suit the customer's preferences.

This environmental adjustment response may be activated by a voice-activated control, wall control or by the identification of the customer by any appropriate manner, such as those described herein. For example, the environmental adjustment may be activated by an RFID chip or NFC device on the user's identification card, in the user's mobile device 764, on the user's person and the like. Similarly to adjusting the temperature, the enclosure may also adjust the lighting within the enclosure to suit the customer's needs and preferences. In summary, the enclosure may adapt its interior to the needs of each particular user, such as by personalized lighting, audio volume, background music, temperature setting and the like.

In some example embodiments, the terminal 760 and/or enclosure 756 may include an artificial sensate skin device that may mimic the characteristics and functions of its analogous living tissue. The skin may be mechanically flexible. The terminal may include an exterior that is pleasant to touch. For example, the terminal may be entirely covered with or have portions that are covered with a material that customers may touch or interact with that feels like warm skin, velvet, cotton or the like. The covering may act as a responsive architecture, whereby the covering may be mechanically flexible and scalable. The covering may measure actual environmental conditions, such as via sensors, to enable the covering to adapt its form, shape, color, or character responsively, such as via actuators. The covering may be able to alter its form to continually reflect the environmental conditions that surround it.

Alternatively, the covering may be of a large size that may act as an enclosure to the terminal. For example, the covering may physically configure itself to each particular user and/or environment to meet changing needs or desires for varying situations. The covering may function as an evolving organism that learns and adapts to the user and environment. In a situation where the covering acts as an enclosure to the terminal, the covering may enlarge itself or make itself smaller depending upon how large of an area is needed. For example, if the covering is acting as an enclosure for the terminal, the enclosure may react to change its size depending upon how many people are standing at the terminal, such as if a parent has a child or multiple children with them or if a couple is standing at the terminal together, which may provide a more comfortable environment for the user and the user's companions while also providing additional security during the transaction.

This covering may inherit the characteristics of human skin and move either in response to vocal outputs by the user or just provide soothing periodic movement. This covering may be an electronic sensate skin that may include many sensing or sensory nodes or inputs and be pressure sensitive. Each node may measure strain, pressure, ambient light, sound and the like, whereby the covering may adapt to external stimuli by modifying its behavior in response to its environment and/or the user. These nodes may be in communication with one or more of the computers in the banking network 102.

The covering may provide a computer driven physical responsive surface that may be reactive or reflexive to supplied stimuli. The nodes may be densely distributed over a surface or throughout a material and be able to emulate the functionality and characteristics of a biological skin. This covering may be able to vary in temperature. For example, during the warmer summer months the covering may be able to feel cooler to the touch. Conversely, during the cooler winter months the covering may be able to feel warmer to the touch. Alternatively, once the terminal identifies the current user, the covering may respond to instructions from a database and project a certain predetermined temperature that the specific user prefers.

It should be understood that the arrangements shown are this approach is an example, and that other arrangements and embodiments can be used. For example, other arrangements can include a plurality of service provider stations as needed to assist a large number of customer stations. The service provider stations can be located at a common location, where each service provider station is able to communicate with each customer station. The arrangement allows the next available service provider to then assist the next customer waiting in a holding queue. Other embodiments enable the next available service provider to quickly assist any waiting VIPs.

Thus the new apparatus, systems, and methods of the example embodiments described may achieve one or more of the above stated objectives, eliminate difficulties encountered in the use of prior devices and systems, solve problems and attain desirable results as described herein. In the foregoing description certain terms have been used for brevity, clarity and understanding, however no unnecessary limitations are to be implied therefrom because such terms are for descriptive purposes and are intended to be broadly construed. Moreover, the descriptions and illustrations given herein are by way of examples and the invention is not limited to the details shown and described.

In the following claims any feature described as a means for performing a function shall be construed as encompassing any means known to those skilled in the art as being capable of performing the recited function, and shall not be limited to the features shown in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

The invention claimed is:

1. A tangible, non-transitory computer readable medium of execution with instructions encoded thereon for execution by a processor, and when executed operable to:
   determine a financial account on which transactions are authorized to be conducted automatically through an operation of an automated banking machine, wherein the automated banking machine comprises a display, a check acceptor, and a card reader;
   wherein the processor is associated with an automated banking machine;
   obtain an electronic image corresponding to one side of a user input check from a check acceptor;
   resolve check data from the electronic image, wherein the check data includes a check amount;
   request identification of a user of the automated banking machine in a form of card data responsive to the check amount being above a particular level;
   obtain the card data read through the operation of the card reader;
   verify the card data corresponds to an account holder of the financial account, the card data to be sent to a second transaction authorization computer remote from the machine that is different from a first transaction authorization computer; and
   automatically cause the check amount to be credited to the financial account through the operation of the first transaction authorization computer remote from the automated banking machine responsive at least in part to verification of the card data.

2. The tangible, non-transitory computer readable medium according to claim 1,
   wherein the automated banking machine further includes a cash dispenser;
   wherein the instructions are further operable to cause the cash dispenser to operate to dispense a cash amount corresponding to the check amount responsive at least in part to the second transaction authorization computer.

3. The tangible, non-transitory computer readable medium according to claim 2, wherein the second transaction authorization computer causes the cash dispenser operation responsive at least in part to at least one input received by the second authorization computer through an input device activated by a human service provider.

4. The tangible, non-transitory computer readable medium according to claim 1,
   wherein the card reader is configured to read data from a driver's license; and
   wherein the card data corresponds to data read from a driver's license.

5. The tangible, non-transitory computer readable medium according to claim 4,
   wherein the automated banking machine is associated with a camera, wherein the camera has a field of view adjacent the machine; and
   wherein the instructions are further operable to enable signals corresponding to video to be communicated between the second transaction authorization computer and the machine, whereby two-way video communication with a service provider at the second transaction authorization can be conducted.

6. The tangible, non-transitory computer readable medium according to claim 1,
   wherein the automated banking machine further includes a printer;
   wherein the instructions are further operable to cause the printer to print a document responsive at least in part to one of a group consisting of an automatic operation of the first transaction authorization computer, and at least one human provided input received through at least one input device in operative connection with the second transaction authorization computer.

7. The tangible, non-transitory computer readable medium according to claim 1, further comprising:
   a second card reader;
   wherein the second card reader is operable to receive a card for determining the financial account on which transactions are authorized to be conducted automatically through operation of the automated banking machine.

8. A tangible, non-transitory computer readable medium of execution with instructions encoded thereon for execution by a processor, and when executed operable to:
   determine a financial account on which transactions are authorized to be conducted automatically through an operation of an automated banking machine, wherein the automated banking machine comprises a display, a check acceptor, a card reader, and an image input device;
   wherein the processor is associated with an automated banking machine;
   obtain an electronic image corresponding to one side of a user input check from a check acceptor;

resolve check data from the electronic image, wherein the check data includes a check amount;

obtain card data read through the operation of the card reader, the card data corresponds to an account holder of the financial account and comprises an image of the account holder, the card data does not correspond to the financial account, the card data to be sent to a second transaction authorization computer remote from the machine that is different from a first transaction authorization computer;

obtain an image of a user of the automated banking machine via the image input device;

obtain verification that the image of the user matches an image of the account holder obtained from the card data from the second transaction authorization computer; and automatically cause the check amount to be credited to the financial account through the operation of the first transaction authorization computer remote from the automated banking machine responsive at least in part to verifying the image of the user matches the image of the account holder.

9. The tangible, non-transitory computer readable medium according to claim 8,
wherein the automated banking machine further includes a cash dispenser;
wherein the instructions are further operable to cause the cash dispenser to operate to dispense a cash amount corresponding to the check amount responsive at least in part to the second transaction authorization computer.

10. The tangible, non-transitory computer readable medium according to claim 9, wherein the second transaction authorization computer causes the cash dispenser operation responsive at least in part to at least one input received by the second authorization computer through an input device activated by a human service provider.

11. The tangible, non-transitory computer readable medium according to claim 8,
wherein the card reader is configured to read data from a driver's license; and
wherein the card data corresponds to data read from a driver's license.

12. The tangible, non-transitory computer readable medium according to claim 8,
wherein the automated banking machine is associated with a camera, wherein the camera has a field of view adjacent the machine; and
wherein the instructions are further operable to enable signals corresponding to video to be communicated between the second transaction authorization computer and the machine, whereby two-way video communication with a service provider at the second transaction authorization can be conducted.

13. The tangible, non-transitory computer readable medium according to claim 8, further comprising a second card reader;
wherein the second card reader is operable to receive a card for determining the financial account on which transactions are authorized to be conducted automatically through operation of the automated banking machine.

14. The tangible, non-transitory computer readable medium according to claim 13, the instructions are further operable to:
verify the image of the card holder obtained from the card data matches the image of the account holder associatively stored previously with the second transaction authorization computer; and
automatically cause the check amount to be credited to the financial account through the operation of a first transaction authorization computer remote from the automated banking machine responsive at least in part to verifying the image of the card holder obtained from the card data matches the image of the previously stored account holder.

15. A tangible, non-transitory computer readable medium of execution with instructions encoded thereon for execution by a processor, and when executed operable to:
determine a financial account on which transactions are authorized to be conducted automatically through an operation of an automated banking machine, wherein the automated banking machine comprises a display, a check acceptor, a card reader, and an image input device;
wherein the processor is associated with an automated banking machine;
obtain an electronic image corresponding to one side of a user input check from a check acceptor;
resolve check data from the electronic image, wherein the check data includes a check amount;
obtain an image of a user of the automated banking machine via the image input device;
send the image of the user to a remote, second transaction authorization computer that is different from a first transaction authorization computer;
obtain verification that the image sent to the second transaction authorization computer matches a previously stored image of the user in a data store associated with the second transaction authorization computer; and
automatically cause the check amount to be credited to the financial account through the operation of the first transaction authorization computer that is remote from the automated banking machine responsive at least in part to verifying the image of the user matches the previously stored image.

16. The tangible, non-transitory computer readable medium according to claim 15,
wherein the automated banking machine further includes a cash dispenser;
wherein the instructions are further operable to cause the cash dispenser to operate to dispense a cash amount corresponding to the check amount responsive at least in part to the second transaction authorization computer.

17. The tangible, non-transitory computer readable medium according to claim 16, wherein the second transaction authorization computer causes the cash dispenser operation responsive at least in part to at least one input received by the second authorization computer through an input device activated by a human service provider.

18. The tangible, non-transitory computer readable medium according to claim 15,
wherein the automated banking machine is associated with a camera, wherein the camera has a field of view adjacent the machine; and
wherein the instructions are further operable to enable signals corresponding to video to be communicated between the second transaction authorization computer and the machine, whereby two-way video communication with a service provider at the second transaction authorization can be conducted.

19. The tangible, non-transitory computer readable medium according to claim 15, further comprising a card reader;
 wherein the card reader is operable to receive a card for determining the financial account on which transactions are authorized to be conducted automatically through operation of the automated banking machine.

\* \* \* \* \*